(12) United States Patent
Parsons et al.

(10) Patent No.: US 7,383,721 B2
(45) Date of Patent: Jun. 10, 2008

(54) LEAK DETECTOR

(75) Inventors: Natan E. Parsons, Brookline, MA (US); Fatih Guler, Winchester, MA (US); Kay Herbert, Winthrop, MA (US)

(73) Assignee: Arichell Technologies Inc., Newton, MA (US)

( * ) Notice: Subject to any disclaimer, the term of this patent is extended or adjusted under 35 U.S.C. 154(b) by 20 days.

(21) Appl. No.: 11/318,254

(22) Filed: Dec. 23, 2005

(65) Prior Publication Data
US 2006/0202051 A1    Sep. 14, 2006

Related U.S. Application Data

(63) Continuation of application No. PCT/US2004/020504, filed on Jun. 24, 2004, which is a continuation-in-part of application No. PCT/US03/20117, filed on Jun. 24, 2003, and a continuation-in-part of application No. PCT/US02/38758, filed on Dec. 4, 2002, and a continuation-in-part of application No. PCT/US02/38757, filed on Dec. 4, 2002.

(60) Provisional application No. 60/391,284, filed on Jun. 24, 2002, provisional application No. 60/391,282, filed on Jun. 24, 2002.

(51) Int. Cl.
G01M 3/08    (2006.01)

(52) U.S. Cl. .......................................................... 73/46

(58) Field of Classification Search ...................... 73/40, 73/46, 47, 49.6
See application file for complete search history.

(56) References Cited

U.S. PATENT DOCUMENTS

| | | | |
|---|---|---|---|
| 207,482 A | 8/1878 | Blessing | 137/188 |
| 1,501,331 A | 7/1924 | Gulick | 137/245 |
| 2,438,207 A | 3/1948 | Derby | 4/304 |
| 2,471,328 A | 5/1949 | Jones | 137/403 |
| 2,507,966 A | 5/1950 | Filliung | 4/303 |
| 2,603,794 A | 7/1952 | Bokser | 4/304 |
| 2,619,122 A | 11/1952 | Hunter | 251/120 |

(Continued)

OTHER PUBLICATIONS

International Search Report issued in PCT Application PCT/US03/20117 mailed on Dec. 18, 2003 (4 pages).

*Primary Examiner*—Hezron Williams
*Assistant Examiner*—John Fitzgerald
(74) *Attorney, Agent, or Firm*—Ivan David Zitkovsky

(57) ABSTRACT

A leak detector for detecting flow of at least partially conductive fluid includes two electrodes and an electrical circuit. A valve device including an actuator is constructed to receive open and close signals for opening and closing the valve device between an input port and an outer port. The two electrodes are located on opposite sides of the valve device and are electrically isolated from each other in absence of the liquid flowing between the input port and the output port. The electrical circuit measures an electrical property between the electrodes. The leak detector is suitable for a multizone irrigation system that includes a central control unit having a central control system interfaced with a central valve and a central communication unit. The central valve regulates water flow for irrigation from a water source and can lower water pressure in the pipes at its output. The central communication unit is constructed to transmit or receive pressure based communication signals providing irrigation information. Each zone includes a sprinkler control unit having a sprinkler connected to a water pipe for irrigation.

17 Claims, 32 Drawing Sheets

U.S. PATENT DOCUMENTS

| | | | |
|---|---|---|---|
| 2,619,986 A | 12/1952 | Goepfrich et al. | 251/129.17 |
| 2,685,301 A | 8/1954 | Dreier | 137/386 |
| 2,827,073 A | 3/1958 | Owens | 137/426 |
| 2,842,400 A | 7/1958 | Booth et al. | 239/569 |
| 2,877,791 A | 3/1959 | Rich | 137/487 |
| 2,923,314 A | 2/1960 | Badger, Jr. et al. | 137/414 |
| 2,986,155 A | 5/1961 | Doyle | 137/218 |
| 2,999,191 A | 9/1961 | Muradian et al. | 361/195 |
| 3,019,453 A | 2/1962 | Radcliffe | 4/249 |
| 3,022,450 A | 2/1962 | Chase, Jr. | 361/194 |
| 3,034,151 A | 5/1962 | Filliung | 4/249 |
| 3,056,143 A | 10/1962 | Foster | 4/249 |
| 3,058,485 A | 10/1962 | McQueen | 137/403 |
| 3,098,635 A | 7/1963 | Delaporte et al. | 251/54 |
| 3,151,340 A | 10/1964 | Teshima | 251/129.04 |
| 3,242,940 A | 3/1966 | Sirotek | 137/218 |
| 3,254,664 A | 6/1966 | Delaney et al. | 137/244 |
| 3,285,261 A | 11/1966 | Chaney | 137/505.12 |
| 3,314,081 A | 4/1967 | Atkins et al. | 4/304 |
| 3,318,565 A | 5/1967 | Cutler | 251/45 |
| 3,369,205 A | 2/1968 | Hamrick | 335/177 |
| 3,373,449 A | 3/1968 | Rusnok | 4/305 |
| 3,379,214 A | 4/1968 | Weinberg | 137/625.5 |
| 3,386,462 A | 6/1968 | Walters | 137/244 |
| 3,400,731 A | 9/1968 | McCormack | 137/245 |
| 3,406,941 A | 10/1968 | Ichimori et al. | 251/129.01 |
| 3,429,333 A | 2/1969 | Schoepe et al. | |
| 3,480,787 A | 11/1969 | Johansen | 250/221 |
| 3,487,477 A | 1/1970 | Classen | 4/668 |
| 3,495,803 A | 2/1970 | Schoepe et al. | 251/25 |
| 3,495,804 A | 2/1970 | Muller et al. | 251/36 |
| 3,559,675 A | 2/1971 | Schoepe et al. | 137/436 |
| 3,575,640 A | 4/1971 | Ishikawa | 361/181 |
| 3,576,277 A | 4/1971 | Blackmon | 222/1 |
| 3,586,017 A | 6/1971 | Walters | 137/59 |
| 3,606,241 A | 9/1971 | Bornholdt | 251/52 |
| 3,638,680 A | 2/1972 | Kopp | 137/606 |
| 3,639,920 A | 2/1972 | Griffin et al. | 4/623 |
| 3,670,167 A | 6/1972 | Forbes | 250/221 |
| 3,693,649 A | 9/1972 | Gordon et al. | 137/414 |
| 3,724,001 A | 4/1973 | Ichimori et al. | 4/623 |
| 3,740,019 A | 6/1973 | Kessell et al. | 251/129.17 |
| D228,782 S | 10/1973 | Taiani | D13/153 |
| 3,763,881 A | 10/1973 | Jones | 137/414 |
| 3,778,023 A | 12/1973 | Billeter | 251/30.01 |
| 3,791,619 A | 2/1974 | Pett | 251/45 |
| 3,799,198 A | 3/1974 | Kijimoto | 137/624.11 |
| 3,802,462 A | 4/1974 | Trösch | 137/556 |
| 3,812,398 A | 5/1974 | Kozel et al. | 251/331 |
| 3,814,376 A | 6/1974 | Reinicke | 251/65 |
| 3,821,967 A | 7/1974 | Sturman et al. | 137/624.15 |
| 3,842,857 A | 10/1974 | McCornack | 137/242 |
| 3,863,196 A | 1/1975 | Hilles | 367/96 |
| 3,895,645 A | 7/1975 | Johnson | 137/403 |
| 3,951,098 A | 4/1976 | Meyers | 116/206 |
| 4,010,769 A | 3/1977 | De Lorenzo et al. | 137/312 |
| 4,065,095 A | 12/1977 | Johnson | 251/118 |
| 4,097,786 A | 6/1978 | Lund | 318/282 |
| 4,105,186 A | 8/1978 | Eby | 251/35 |
| 4,107,046 A | 8/1978 | Corder | 210/282 |
| 4,114,647 A | 9/1978 | Sturman et al. | 137/624.2 |
| 4,116,377 A | 9/1978 | Andersson et al. | 236/12.1 |
| 4,135,696 A | 1/1979 | Saarem et al. | 251/30.02 |
| 4,141,091 A | 2/1979 | Pulvari | 4/313 |
| 4,179,691 A | 12/1979 | Keller | 340/567 |
| 4,184,445 A | 1/1980 | Burrows | 116/206 |
| 4,206,901 A | 6/1980 | Williams | 251/35 |
| 4,207,466 A | 6/1980 | Drage et al. | 250/338.1 |
| 4,223,698 A | 9/1980 | Reinicke | 137/595 |
| 4,225,111 A | 9/1980 | Stahle | 251/87 |
| 4,229,811 A | 10/1980 | Salem | 367/93 |
| 4,231,287 A | 11/1980 | Smiley | 92/94 |
| 4,241,759 A | 12/1980 | Billeter | 137/636.4 |
| 4,272,052 A | 6/1981 | Gidner | 251/39 |
| 4,280,680 A | 7/1981 | Payne | 251/175 |
| 4,282,430 A | 8/1981 | Hatten et al. | 250/221 |
| 4,295,485 A | 10/1981 | Waterfield | 137/74 |
| 4,295,631 A | 10/1981 | Allen | 251/30.03 |
| 4,295,653 A | 10/1981 | Coles | 277/320 |
| 4,304,391 A | 12/1981 | Yamaguchi | 251/129.05 |
| 4,309,781 A | 1/1982 | Lissau | 4/304 |
| 4,383,234 A | 5/1983 | Yatsushiro et al. | 335/253 |
| 4,396,149 A | 8/1983 | Hirsch | 239/63 |
| 4,402,095 A | 9/1983 | Pepper | 4/623 |
| 4,408,745 A | 10/1983 | Swiers et al. | 251/357 |
| 4,457,452 A | 7/1984 | Symmons | 222/20 |
| 4,488,702 A | 12/1984 | Lapeyre | 251/46 |
| 4,505,450 A | 3/1985 | Saarem | 251/24 |
| 4,505,451 A | 3/1985 | Jonas | 251/285 |
| 4,520,516 A | 6/1985 | Parsons | 4/623 |
| 4,539,474 A | 9/1985 | Takahata | 250/221 |
| 4,543,991 A | 10/1985 | Fuchs | 137/595 |
| 4,570,272 A | 2/1986 | Kawaguchi et al. | 4/302 |
| 4,570,899 A | 2/1986 | Kingham | 251/51 |
| 4,597,895 A | 7/1986 | Bartlett | 252/392 |
| 4,604,735 A | 8/1986 | Parsons | 367/93 |
| 4,606,085 A | 8/1986 | Davies | 4/623 |
| 4,609,178 A | 9/1986 | Baumann | 251/229 |
| 4,611,356 A | 9/1986 | Lin | 4/301 |
| 4,613,764 A | 9/1986 | Lobato | 307/116 |
| 4,645,094 A | 2/1987 | Acklin et al. | 222/52 |
| 4,651,777 A | 3/1987 | Hardman | 137/487.5 |
| 4,653,534 A | 3/1987 | Chung-Shan | 137/624.12 |
| 4,662,563 A | 5/1987 | Wolfe, Jr. | 239/1 |
| 4,669,653 A | 6/1987 | Avelov | 236/12.13 |
| 4,681,141 A | 7/1987 | Wang | 137/607 |
| 4,684,920 A | 8/1987 | Reiter | 340/310.11 |
| 4,693,419 A | 9/1987 | Weintraub et al. | 239/63 |
| 4,709,427 A | 12/1987 | Laverty, Jr. | 4/427 |
| 4,709,728 A | 12/1987 | Ying-Chung | 137/636.4 |
| 4,717,237 A | 1/1988 | Austin | 385/101 |
| 4,729,342 A | 3/1988 | Loctin | 119/163 |
| 4,756,031 A | 7/1988 | Barrett | 4/407 |
| 4,767,922 A | 8/1988 | Stauffer | 250/221 |
| 4,787,411 A | 11/1988 | Moldenhauer | 137/244 |
| 4,793,588 A | 12/1988 | Laverty, Jr. | 251/30.03 |
| 4,796,654 A | 1/1989 | Simpson | 137/78.3 |
| 4,796,662 A | 1/1989 | Hoffmann et al. | 137/596.16 |
| 4,805,247 A | 2/1989 | Laverty, Jr. | 4/304 |
| 4,823,414 A | 4/1989 | Piersimoni et al. | 4/623 |
| 4,823,825 A | 4/1989 | Buchl | 137/1 |
| 4,826,129 A | 5/1989 | Fong et al. | 251/129.04 |
| 4,826,132 A | 5/1989 | Moldenhauer | 251/129.17 |
| 4,832,263 A | 5/1989 | Poynor | 239/197 |
| 4,832,582 A | 5/1989 | Buffet | 417/413.1 |
| 4,836,641 A | 6/1989 | Priaroggia | 385/100 |
| 4,839,039 A | 6/1989 | Parsons et al. | 210/143 |
| 4,887,032 A | 12/1989 | Hetrick | 324/207.16 |
| 4,891,864 A | 1/1990 | Laverty, Jr. | 91/399 |
| 4,893,645 A | 1/1990 | Augustinas et al. | 137/315.03 |
| 4,894,698 A | 1/1990 | Hijikigawa et al. | 257/254 |
| 4,894,874 A | 1/1990 | Wilson | 4/623 |
| 4,901,750 A | 2/1990 | Nicklas et al. | 137/270 |
| 4,902,887 A | 2/1990 | Everett, Jr. | 250/221 |
| 4,910,487 A | 3/1990 | Kleinhappl | 335/234 |
| 4,911,401 A | 3/1990 | Holcomb et al. | 251/30.03 |
| 4,915,347 A | 4/1990 | Iqbal et al. | 251/30.03 |
| 4,919,165 A | 4/1990 | Lloyd | 137/78.2 |
| 4,921,208 A | 5/1990 | LaMarca | 251/30.04 |
| 4,921,211 A | 5/1990 | Novak et al. | 251/129.04 |
| 4,922,433 A | 5/1990 | Mark | 700/284 |
| 4,932,430 A | 6/1990 | Fernstrom | 137/85 |
| 4,934,400 A | 6/1990 | Cuming | 137/78.3 |
| 4,938,384 A | 7/1990 | Pilolla et al. | 222/50 |

| Patent | Date | Inventor | Class |
|---|---|---|---|
| 4,941,215 A | 7/1990 | Liu | 4/406 |
| 4,941,219 A | 7/1990 | Van Marcke | 4/623 |
| 4,944,487 A | 7/1990 | Holtermann | 251/129.17 |
| 4,953,141 A | 8/1990 | Novak et al. | 367/108 |
| 4,953,236 A | 9/1990 | Lee et al. | 4/668 |
| 4,962,790 A | 10/1990 | Chou et al. | 137/599.08 |
| 4,972,070 A | 11/1990 | Laverty, Jr. | 250/221 |
| 4,977,929 A | 12/1990 | Chinnock et al. | 137/863 |
| 4,988,074 A | 1/1991 | Najmolhoda | 251/129.08 |
| 4,991,819 A | 2/1991 | Laube | 251/35 |
| 4,998,673 A | 3/1991 | Pilolla | 239/67 |
| 5,025,516 A | 6/1991 | Wilson | 4/623 |
| 5,027,850 A | 7/1991 | Peterson et al. | 137/245 |
| 5,032,812 A | 7/1991 | Banick et al. | 335/17 |
| 5,036,553 A | 8/1991 | Sanderson | 4/313 |
| 5,060,859 A | 10/1991 | Bancroft | 239/64 |
| 5,062,164 A | 11/1991 | Lee et al. | 4/677 |
| 5,062,453 A | 11/1991 | Saadi et al. | 137/624.11 |
| 5,074,520 A | 12/1991 | Lee et al. | 251/40 |
| 5,092,560 A | 3/1992 | Chen | 251/30.03 |
| 5,095,944 A | 3/1992 | Hochstrasser | 137/607 |
| 5,109,885 A | 5/1992 | Tauscher | 137/554 |
| 5,109,886 A | 5/1992 | Takata et al. | 137/596.17 |
| 5,111,846 A | 5/1992 | Hochstrasser et al. | 137/607 |
| 5,125,621 A | 6/1992 | Parsons et al. | 251/30.03 |
| 5,127,625 A | 7/1992 | Kleinhappl | 251/129.17 |
| 5,148,826 A | 9/1992 | Bakhshaei | 137/80 |
| 5,148,985 A | 9/1992 | Bancroft | 239/64 |
| 5,169,118 A | 12/1992 | Whiteside | 251/30.03 |
| 5,172,193 A | 12/1992 | Payne et al. | 356/445 |
| 5,181,538 A | 1/1993 | Manganaro | 137/607 |
| 5,188,337 A | 2/1993 | Mertens et al. | 251/129.17 |
| 5,195,720 A | 3/1993 | Nortier et al. | 251/129.04 |
| 5,202,666 A | 4/1993 | Knippscheer | 340/573.1 |
| 5,213,303 A | 5/1993 | Walker | 251/30.02 |
| 5,213,305 A | 5/1993 | Whiteside et al. | 251/40 |
| 5,224,685 A | 7/1993 | Chiang et al. | 251/129.04 |
| 5,232,194 A | 8/1993 | Saadi et al. | 251/40 |
| 5,244,179 A | 9/1993 | Wilson | 251/30.03 |
| 5,245,024 A | 9/1993 | Scarpa et al. | 536/56 |
| 5,251,188 A | 10/1993 | Parsons et al. | 367/140 |
| 5,255,398 A | 10/1993 | Flynn et al. | 4/496 |
| 5,265,594 A | 11/1993 | Olsson et al. | 128/204.18 |
| 5,265,843 A | 11/1993 | Kleinhappl | 251/129.17 |
| 5,295,654 A | 3/1994 | Laube | 251/35 |
| 5,295,655 A | 3/1994 | Wilson et al. | 251/40 |
| 5,299,592 A | 4/1994 | Swanson | 137/59 |
| 5,313,673 A | 5/1994 | Saadi et al. | 4/313 |
| 5,315,719 A | 5/1994 | Tsutsui et al. | 4/300 |
| 5,329,965 A | 7/1994 | Gordon | 137/599.07 |
| 5,335,694 A | 8/1994 | Whiteside | 137/625.37 |
| 5,339,859 A | 8/1994 | Bowman | 137/337 |
| 5,375,811 A | 12/1994 | Reinicke | 251/129.16 |
| D354,113 S | 1/1995 | Wortier et al. | D23/233 |
| D355,478 S | 2/1995 | Allen et al. | D23/249 |
| 5,408,369 A | 4/1995 | Miura et al. | 360/75 |
| D357,976 S | 5/1995 | Allen et al. | D23/249 |
| 5,412,816 A | 5/1995 | Paterson et al. | 4/623 |
| 5,427,351 A | 6/1995 | Korfgen et al. | 251/39 |
| 5,431,181 A | 7/1995 | Saadi et al. | 137/15.11 |
| 5,433,245 A | 7/1995 | Prather et al. | 137/554 |
| 5,455,971 A | 10/1995 | Sakakibara et al. | 4/313 |
| 5,456,279 A | 10/1995 | Parsons et al. | 137/245 |
| 5,456,448 A | 10/1995 | Chou | 251/230 |
| 5,464,041 A | 11/1995 | Reinicke | 137/595 |
| 5,467,799 A | 11/1995 | Buccicone et al. | 137/625.41 |
| 5,473,723 A | 12/1995 | Stockman et al. | 385/134 |
| 5,474,303 A | 12/1995 | Coles | 277/317 |
| 5,481,187 A | 1/1996 | Marcott et al. | 324/207.16 |
| 5,508,510 A | 4/1996 | Laverty et al. | 250/221 |
| 5,511,579 A | 4/1996 | Price | 137/337 |
| 5,535,781 A | 7/1996 | Paterson et al. | 137/624.11 |
| 5,539,198 A | 7/1996 | McMichael et al. | 250/221 |
| 5,548,119 A | 8/1996 | Nortier | 250/341.1 |
| 5,555,912 A | 9/1996 | Saadi et al. | 137/801 |
| 5,564,462 A | 10/1996 | Storch | 137/337 |
| 5,566,702 A | 10/1996 | Philipp | 137/1 |
| 5,570,869 A | 11/1996 | Diaz et al. | 251/129.04 |
| 5,574,617 A | 11/1996 | Shimanuki et al. | 361/154 |
| 5,583,434 A | 12/1996 | Moyers et al. | 324/207.16 |
| 5,584,465 A | 12/1996 | Ochsenreiter | 251/65 |
| 5,595,216 A | 1/1997 | Pilolla | 137/607 |
| 5,599,003 A | 2/1997 | Seemann et al. | 251/30.03 |
| 5,600,237 A | 2/1997 | Nippert | 324/207.16 |
| 5,636,601 A | 6/1997 | Moriya et al. | 123/90.11 |
| D381,008 S | 7/1997 | Parsons et al. | D13/153 |
| 5,655,747 A | 8/1997 | Pasut | 251/30.03 |
| 5,655,748 A | 8/1997 | Regelbrugge et al. | 251/54 |
| 5,668,366 A | 9/1997 | Mauerhofer | 250/221 |
| 5,680,879 A | 10/1997 | Sheih et al. | 137/240 |
| 5,708,355 A | 1/1998 | Schrey | 323/282 |
| 5,716,038 A | 2/1998 | Scarffe | 251/30.03 |
| 5,747,684 A | 5/1998 | Pace et al. | 73/119 A |
| 5,749,521 A | 5/1998 | Lattery | 239/64 |
| 5,758,688 A | 6/1998 | Hamanaka et al. | 137/624.11 |
| D396,090 S | 7/1998 | Marcichow et al. | D23/233 |
| 5,775,372 A | 7/1998 | Houlihan | 137/624.12 |
| 5,785,955 A | 7/1998 | Fischer | 424/49 |
| 5,787,915 A | 8/1998 | Byers et al. | 137/1 |
| 5,787,924 A | 8/1998 | Cewers et al. | 137/487.5 |
| 5,797,360 A | 8/1998 | Pischinger et al. | 123/90.11 |
| 5,804,962 A | 9/1998 | Kather et al. | 324/207.16 |
| 5,815,362 A | 9/1998 | Kahr et al. | 361/153 |
| 5,819,336 A | 10/1998 | Gilliam et al. | 4/623 |
| 5,836,339 A | 11/1998 | Klever et al. | 137/78.2 |
| 5,839,660 A | 11/1998 | Morgenstern et al. | 239/63 |
| 5,881,993 A | 3/1999 | Wilson et al. | 251/40 |
| 5,883,557 A | 3/1999 | Pawlak et al. | 335/179 |
| 5,887,848 A | 3/1999 | Wilson | 251/40 |
| 5,900,201 A | 5/1999 | Chatterjee et al. | 264/109 |
| 5,901,384 A | 5/1999 | Sim | 4/313 |
| 5,905,625 A | 5/1999 | Schebitz | 361/154 |
| 5,918,855 A | 7/1999 | Hamanaka et al. | 251/129.04 |
| 5,927,328 A | 7/1999 | Nelson et al. | 137/624.12 |
| 5,927,603 A | 7/1999 | McNabb | 239/63 |
| 5,941,505 A | 8/1999 | Nagel | 251/335.2 |
| 5,950,983 A | 9/1999 | Jahrling | 251/129.04 |
| 5,964,192 A | 10/1999 | Ishii | 123/90.11 |
| 5,967,182 A | 10/1999 | Wilson | 137/544 |
| 5,979,500 A | 11/1999 | Jahrling et al. | 137/624.12 |
| 5,984,262 A | 11/1999 | Parsons et al. | 251/129.04 |
| 5,996,965 A | 12/1999 | Eichholz et al. | 251/30.05 |
| 6,000,674 A | 12/1999 | Cheng | 251/26 |
| 6,003,170 A | 12/1999 | Humpert et al. | 4/623 |
| 6,024,059 A | 2/2000 | Kamimaru et al. | 123/90.11 |
| 6,039,067 A | 3/2000 | Houlihan | 137/337 |
| 6,044,699 A | 4/2000 | Greenblatt et al. | 73/170.17 |
| 6,044,814 A | 4/2000 | Fuwa | 123/90.11 |
| 6,056,261 A | 5/2000 | Aparicio et al. | 251/129.03 |
| 6,058,647 A | 5/2000 | Emalfarb | 47/1.01 R |
| 6,073,904 A | 6/2000 | Diller et al. | 251/30.03 |
| 6,085,790 A | 7/2000 | Humpert et al. | 137/801 |
| 6,123,839 A | 9/2000 | Sussman | 210/136 |
| 6,127,671 A | 10/2000 | Parsons et al. | 250/221 |
| 6,155,231 A | 12/2000 | Adachi et al. | 123/399 |
| 6,158,715 A | 12/2000 | Kirschbaum | 251/129.06 |
| 6,161,726 A | 12/2000 | Parsons et al. | 222/52 |
| 6,182,689 B1 | 2/2001 | Lauer et al. | 137/801 |
| 6,198,398 B1 | 3/2001 | Velasquez | 340/604 |
| 6,212,697 B1 | 4/2001 | Parsons et al. | 4/302 |
| 6,216,730 B1 | 4/2001 | Hall | 137/550 |
| 6,227,219 B1 | 5/2001 | Pino | 137/1 |
| 6,250,601 B1 | 6/2001 | Kolar et al. | 251/129.04 |
| 6,260,576 B1 | 7/2001 | Allen | 137/550 |
| 6,273,394 B1 | 8/2001 | Vincent et al. | 251/129.04 |
| 6,293,516 B1 | 9/2001 | Parsons et al. | 251/129.04 |

| | | | | | | |
|---|---|---|---|---|---|---|
| 6,298,872 B1 | 10/2001 | Keller ........................ 137/360 | | 6,450,478 B2 | 9/2002 | Parsons et al. ......... 251/129.04 |
| 6,299,127 B1 | 10/2001 | Wilson ........................ 251/38 | | 6,507,200 B2 | 1/2003 | Brandelik et al. ........... 324/696 |
| 6,305,662 B1 | 10/2001 | Parsons et al. .......... 251/129.04 | | 6,532,803 B2 | 3/2003 | Hutchinson et al. ............. 73/73 |
| 6,340,032 B1 | 1/2002 | Zosimadis ................... 137/552 | | 6,609,698 B1 | 8/2003 | Parsons et al. ......... 251/129.17 |
| 6,342,295 B1 | 1/2002 | Kobayashi .................. 428/323 | | 6,619,320 B2 | 9/2003 | Parsons et al. ......... 137/624.11 |
| 6,353,942 B1 | 3/2002 | Pondelick et al. ............... 4/431 | | 6,619,614 B2 | 9/2003 | Parsons et al. ......... 251/129.04 |
| 6,367,096 B1 | 4/2002 | Quintana ....................... 4/427 | | 6,643,853 B2 | 11/2003 | Wilson et al. ................... 4/249 |
| 6,382,586 B1 | 5/2002 | Wilson et al. .................. 251/40 | | 6,662,632 B1 * | 12/2003 | Parker et al. .................... 73/40 |
| 6,393,634 B1 | 5/2002 | Kodaira et al. .................. 4/623 | | 6,685,158 B2 | 2/2004 | Parsons ................... 251/30.01 |
| 6,401,530 B1 | 6/2002 | Roman .................... 73/170.21 | | 6,763,703 B2 * | 7/2004 | Krieger et al. ................ 73/49.8 |
| 6,408,881 B2 | 6/2002 | Lorenzelli et al. ...... 137/624.11 | | 7,032,435 B2 * | 4/2006 | Hassenflug .................... 73/46 |
| 6,425,415 B2 | 7/2002 | Lorenzelli et al. ...... 137/624.11 | | 2007/0051166 A1 * | 3/2007 | Baker et al. ............... 73/40.5 R |
| 6,445,565 B1 | 9/2002 | Toyoda et al. ................ 361/303 | | * cited by examiner | | |

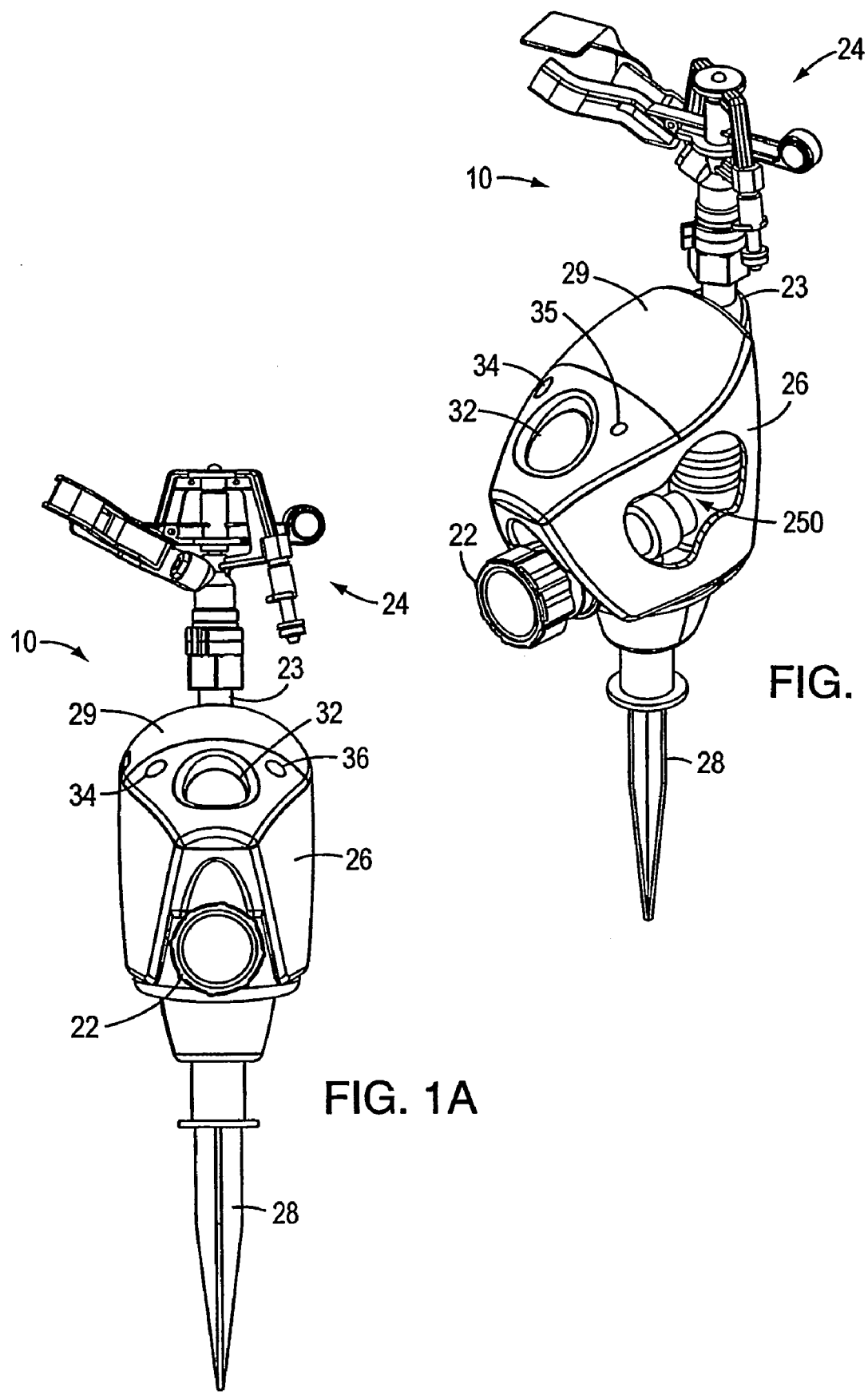

TABLE 1

| | Sprinkler Unit 1 Time Slot for Communication | Sprinkler Unit 2 Time Slot for Communication | Sprinkler Unit 3 Time Slot for Communication | Sprinkler Unit 4 Time Slot for Communication |
|---|---|---|---|---|
| Central CU transmit to SUs | | | | |
| • Central CU ready 2:00AM sends irrig. messages | Transmit 10 min. past h. (2:10-2:16AM) | Transmit 20 min. past h. (2:20-2:26AM) | Transmit 30 min. past h. (2:30-2:36AM) | Transmit 40 min. past h. (2:40-2:46AM) |
| • Sprinklers ready 2:00AM receive irrig. messages | Receive 10 min. past h. (2:10-2:16AM) | Receive 20 min. past h. (2:20-2:26AM) | Receive 30 min. past h. (2:30-2:36AM) | Receive 40 min. past h. (2:40-2:46AM) |
| • Central CU: msg. type (header/irrig. time/footer) | LSLS/LLS/LLLL Water for 2 hours | LSLS/LSLS/LLLL Water for 1 hour | LSLS/LLLS/LLLL Water for 3 hours | LSLS/LSLS/LLLLL Water for 1 hour |
| Sprinkler Unit transmit to Central CU | | | | |
| • Sprinklers time after 2:00AM send messages | Transmit 17 min. past h. (2:17-2:19AM) | Transmit 27 min. past h. (2:27-2:29AM) | Transmit 37 min. past h. (2:37-2:39AM) | Transmit 47 min. past h. (2:47-2:49AM) |
| • Central CU ready 2:00AM receive msg. | Receive 17 min. past (2:17-2:19AM) | Receive 27 min. past (2:27-2:29AM) | Receive 37 min. past (2:37-2:39AM) | Receive 47 min. past (2:47-2:49AM) |
| • Sprinkler Units: msg. type (header/received or not received/footer) | LSLS/LSL/LLLL Message received | LSLS/LSLL/LLLLL Message received | LSLS/LSLL/LLLLL Message received | LSLS/LLS/LLLLL Message was not received |

FIG. 14A

TABLE 2

| | | Sprinkler Unit 1 Time Slot for Communication | Sprinkler Unit 2 Time Slot for Communication | Sprinkler Unit 3 Time Slot for Communication | Sprinkler Unit 4 Time Slot for Communication |
|---|---|---|---|---|---|
| SUs transmit to Central CU | • Sprinkler ready 6:00AM transmit irrig. report msg. | Transmit 10 min. past h. (6:10-6:16AM) | Transmit 20 min. past h. (6:20-6:26AM) | Transmit 30 min. past h. (6:30-6:36AM) | Transmit 40 min. past h. (6:40-6:46AM) |
| | • Central CU ready 6:00AM receive irrig. report msg. | Receive 10 min. past h. (6:10-6:16AM) | Receive 20 min. past h. (6:20-6:26AM) | Receive 30 min. past h. (6:30-6:36AM) | Receive 40 min. past h. (6:40-6:46AM) |
| | • Sprinkler: msg. type (header/amt./space/reason/footer) | LSLS/LLS/SSSSS/LSL/LLLL Watered 0-20% less than rqd by CU due to humidity level | LSLS/LLLS/SSSSS/LSL/LLLL Watered 20-40% more than rqd due to soil moisture level | LSLS/LSSSSLS/SSSSS/LSLS/LLLL Watered 40-60% less than rqd by CU due to light level | LSLS/LSLS/SSSSS/LLL/LLLL Watered as much as rqd by CU due to precipitation level |
| Central CU transmit to Sprinkler | • Central CU ready 6:00AM transmit msg. | Transmit 17 min. past h. (6:17-6:19AM) | Transmit 27 min. past h. (6:27-6:29AM) | Transmit 37 min. past h. (6:37-6:39AM) | Transmit 47 min. past h. (6:47-6:49AM) |
| | • Sprinkler ready 6:00AM receive msg. | Receive 17 min. past h. (6:18-6:19AM) | Receive 27 min. past h. (6:27-6:29AM) | Receive 37 min. past h. (6:37-6:39AM) | Receive 47 min. past h. (6:47-6:49AM) |
| | • Central CU system: msg. type (header/received or not received/footer) | LSLS/LSL/LLLL Message received | LSLS/LSL/LLLL Message received | LSLS/LSL/LLLL Message received | LSLS/LLS/LLLL Message was not received |

FIG. 14B

LEAK DETECTOR

This is a continuation application of PCT application PCT/US2004/020504, filed on Jun. 24, 2004, entitled "Communication System for Multizone Irrigation," which is a continuation-in-part of PCT application PCT/US2003/020117, filed on Jun. 24, 2003, entitled "Automatic Water Delivery Systems with Feedback Control," which claims priority from U.S. Provisional Applications Nos. 60/391,282 and 60/391,284 both filed on Jun. 24, 2002, all of which are incorporated by reference. The PCT application PCT/US2004/020504 is also continuation-in part of PCT Application PCT/US2002/38757, filed on Dec. 4, 2002, and is a continuation-in-part of PCT/US02/38758, both filed on Dec. 4, 2002, which are incorporated by reference.

BACKGROUND OF THE INVENTION

The present invention relates to communications systems and methods for automated irrigation systems, which provide central and local control of delivered amounts of water.

There are various sprinkler devices for watering gardens, yards, or for agricultural uses. These devices may have a controller installed at a source of pressurized water and a remotely located sprinkler. The sprinklers include a rotatable water guide with a water nozzle. When water is ejected from the nozzle, it flows initially through the water guide piece that rotates over a full circle or over a semicircular pattern. The spraying speed is frequently determined by the water flow speed. That is, the water speed governs the rotation of the water guide piece and thus the irrigation pattern.

Many irrigation controllers are time based. The water delivery is activated over a selected period of time regardless of the temperature, air humidity, soil moisture or other vegetation growth factors. Furthermore, the water delivery may vary with the water source pressure and other factors.

Therefore, there is still a need for reliable water delivery systems and control methods capable of delivering selected or known amounts of water. There is still also a need for automated water delivery systems and methods that enable a local loop feedback control and/or can detect local malfunctions.

SUMMARY OF THE INVENTION

The present invention relates to communication systems and methods for automated irrigation systems installed in-ground or above-ground. The automated irrigation systems control and meter the amounts of water delivered from one or several irrigation zones.

One type of the communication system is used for selectively controlling multiple zones and delivering a selectable water amount (or irrigating different amounts of water from the individual zones) according to the local irrigation needs. A multizone irrigation system includes a central control unit having a central controller interfaced with a central valve and a central communication unit. The central valve regulates water flow for irrigation from a water source. The central communication unit is constructed to transmit or receive communication signals providing irrigation information. Each zone includes a sprinkler control unit including a sprinkler connected to a water pipe for irrigation of a land area. The sprinkler control unit includes a local controller interfaced with a local valve for controlling water flow to the sprinkler. The sprinkler control unit also includes a local communication unit constructed to receive communication signals from the central communication unit and provide received irrigation information to the local controller. In a bi-directional system, one or several local communication units are constructed to transmit communication signals to the central communication unit which provide received information to the central controller. The central controller thus can store specific irrigation cycles including the water amounts delivered by each sprinkler or each zone. The local controller controls operation of the local valve based on the irrigation information received from the central controller and information provided by the individual local sensors.

According to one embodiment, a communication system used in an irrigation system includes a central controller interfaced with a central valve and a central communication unit, and a number of sprinkler units each unit including a local controller interfaced with a local valve for controlling water flow to a sprinkler, and a local communication unit. The central valve regulates water flow for irrigation from a water source. The central communication unit is constructed to transmit communication signals providing irrigation information. The sprinkler units are constructed to irrigate a land area. The local communication unit is constructed to receive communication signals from the central communication unit and provide received irrigation information to the local controller. The local controller is constructed to control operation of the local valve based on the irrigation information.

The central communication unit is constructed to receive the communication signals, and the local communication unit is constructed to transmit communication signals.

The central communication unit and the local communication unit are coupled to water conduits connected to the water source and are constructed to generate pressure waves transmitted through water in the conduits. The central communication unit and the local communication unit include a pressure sensor arranged to detect the pressure waves.

The central communication unit and the local communication unit are coupled to water conduits connected to the water source and are constructed to generate pressure pulses or ultrasound waves transmitted through water in the conduits.

Furthermore, the automated systems and methods enable water delivery based on a local loop feedback control and/or control of a delivered amount of water at different water pressures. These systems can be used for watering lawns, gardens, yards, golf courses, or for agricultural uses.

According to yet another embodiment, a remotely located irrigation system includes a controller connected to receive data from a sensor, and a valve device including an actuator. The system has a water input port constructed to be coupled to a water conduit receiving water from a remotely located water source. The controller is located near the water input port and provides control signals to the actuator. The actuator initiates the on and off states of the valve device located near, and connected to, the water input port for providing water to a water delivery device such as a sprinkler or a drip irrigation device.

According to yet another aspect, an irrigation system includes a water input port constructed receiving water from a remotely located water source, and a controller located near the water input port and connected to at least one sensor. The system also includes a valve device including an actuator located near and connected to the water input port, wherein the valve device is constructed to receive control signals from the controller for providing water to a sprinkler.

Preferred embodiments may include one or more of the following features: The controller may be battery operated. The actuator is a latching actuator (as described in U.S. Pat. No. 6,293,516, which is incorporated by reference), a non-latching actuator (as described in U.S. Pat. No. 6,305,662, which is incorporated by reference), or an isolated operator (as described in PCT Application PCT/US01/51098, which is incorporated by reference).

The sensor may be a precipitation sensor, humidity sensor, a soil moisture sensor, or a temperature sensor.

The remotely located irrigation system may include an indicator associated with the controller. The remotely located irrigation system may include a wireless communication unit connected to the controller for receiving data or sending data. The remotely located irrigation system may include manual data input associated with the controller.

The controller may be constructed to provide control signals to at least two actuators, each associated with one valve device and located near and connected to the water input port, wherein the valve device is constructed to receive control signals from the controller for providing water to a water delivery unit.

The controller may be constructed as a time based controller, or as a non-time based controller.

The irrigation system may be constructed to be removably located at a selected location. The irrigation system may be constructed to be mounted on a mobile irrigation platform. The mobile irrigation platform may be self-propelled.

BRIEF DESCRIPTION OF THE DRAWINGS

FIGS. 1 and 1A are perspective views of a stationary water delivery unit.

FIGS. 14A and 14B depict Table 1 and Table 2, respectively, which illustrate communication time schedule and code for the communication system shown in FIG. 6A.

DESCRIPTION OF THE PREFERRED EMBODIMENTS

The described irrigation systems use different types of communication systems for irrigation providing controlled amounts of water or providing metered amounts of water delivered from one or several irrigation zones. The irrigation systems are either above-ground or in-ground and use different control systems, valves and sensors, as described below.

A single zone irrigation system 10 or 40 includes a remotely located controller connected to receive data from at least one local sensor, and includes a valve device actuated by an actuator. The irrigation system has a water input port constructed to be coupled to a water conduit receiving water from a remotely located water source. The controller is located near the water input port and provides control signals to the actuator. The actuator initiates the on and off states of the valve device for providing water to a sprinkler or a drip irrigation device.

A multizone irrigation system 230A includes a central control unit having a central controller interfaced with a central communication unit. There may be a central valve that regulates water flow for irrigation from a water source. The central communication unit is constructed to transmit or receive communication signals providing irrigation information, as shown in Tables 1 and 2. Each zone includes an irrigation control unit (e.g., a sprinkler control unit) constructed to control irrigation from a sprinkler, a drip irrigation device, or similar. The sprinkler control unit includes a local controller interfaced with a local valve for controlling water flow to the sprinkler. The sprinkler control unit also includes a local communication unit constructed to receive communication signals from the central communication unit and provide received irrigation information to the local controller.

In a bi-directional communication system, one or several local communication units (associated with irrigation control units) are constructed to transmit communication signals to the central communication unit, which provides the received information to the central controller. The central controller thus can store specific irrigation cycles including the water amount delivered by each sprinkler or each zone. The local controller controls operation of the local valve based on the irrigation information received from the central controller and information provided by the individual local sensors.

Figure 1B:
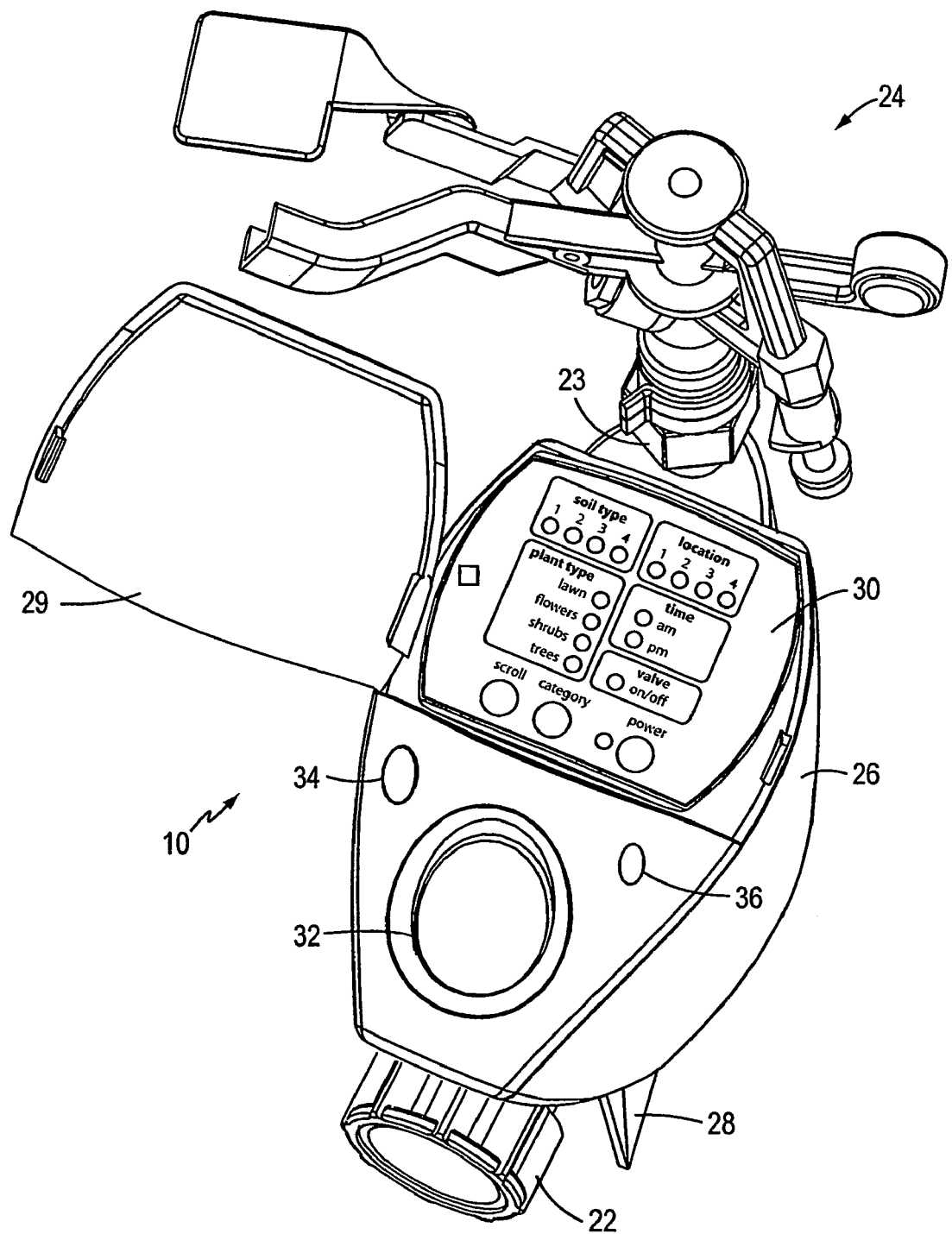
FIG. 1B is a detailed perspective view of the water delivery unit of FIG. 1 also showing various controls located therein.

FIGS. 1, 1A, and 1B show a stationary above-ground water delivery unit 10, which includes several sensors and a controller for automated delivery of selected amounts of water depending on the environmental conditions. The water delivery (irrigation) unit 10 includes water input port 22, a sprinkler 24, and an environmentally sealed body 26 supported on a stake 28. The water delivery unit 10 is located remotely from a water source (or a faucet) and is connected to a water hose (or a water pipe) at port 22. The module's body 26 includes a user interface control unit 30 sealably enclosed by door 29 to be protected from moisture and other elements. The module's body includes one or several ports for various sensors, for example, sensors 64 through 72 described in connection with FIGS. 2 through 5A. For example, module body 26 includes a port 34 with a transparent cover for a light sensor 70 (shown in diagrammatically FIGS. 2 and 7) and a port 36 providing thermally conductive coupling for a temperature sensor 72 (also shown diagrammatically in FIGS. 2 and 7).

Sprinkler 24 is controlled by a control system and an actuator, all described below in connection with FIGS. 10 through 11B. The control system controls the spray pattern of the sprinkler. The sprinkler may be located at a selected height and angle to achieve a desired coverage area, depending on the water pressure and the flow orifices. User interface and controls 30 include various input display and indicator elements described in connection with the embodiment of FIGS. 3 and 3A. Sprinkler 24 may have various embodiments described in U.S. Pat. Nos. 4,580,724; 5,031,835; 5,031,833; 5,238,188; 5,695,122; or 6,164,562 all of which are incorporated by reference.

Water delivery unit 10 is an automated system controlled by a microprocessor that executes various modes of operation. Preferably, the entire water delivery unit 10 is battery operated. Water delivery unit 10 can provide a pre-programmed water delivery without measuring the "local conditions" or by measuring the "local conditions" using one or several sensors. The sensor date may be used to override a pre-selected algorithm (such as skip one watering course after detecting rain). Alternatively, water delivery unit 10 can provide water delivery based on a local loop feedback control by measuring local conditions such as precipitation, humidity, soil moisture, temperature and/or light and using the measured data to deliver a selected amount of water at varying water pressures.

Water delivery unit 10 includes a water pressure sensor (e.g., a sensor system described in connection with FIGS. 11 through 12B), which determines the local water pressure. The local controller includes a memory with stored properties of sprinkler 24 (or another water delivery device such as a drip irrigation system). Based on the orifice size of sprinkler 24 and the control valve, a controller calculates the water delivery time for delivering a desired amount of water over the irrigated area. (This approach differs significantly from the timed water delivery of many prior art systems, where the delivered amount of water varies due to varying water pressure. This approach also differs from many prior art systems, where the water pressure or orifice sizes are not known.)

The present systems and methods are also highly suitable for watering large areas such as parks, golf courses, or agricultural fields using water delivery unit 10, where the "local" conditions vary due to an uneven terrain (e.g., small hills with dry soil or valleys where water has accumulated), and due to different soil, or different vegetation. The present systems and methods are also highly suitable for fields or orchards where different agricultural products are grown. In each case, the local controller receives data from at least one sensor and calculates the desired water amount using stored algorithms. Based on the local water pressure, water delivery unit 10 delivers the calculated water amount over the irrigated area. The design of water delivery unit 10 is also highly suitable for using "gray water" pumped or delivered from canals or water reservoirs. The present design of valves and actuators (described in connection with FIGS. 8 through 10E) doesn't get easily plugged by sand or small particles.

Figure 1C:
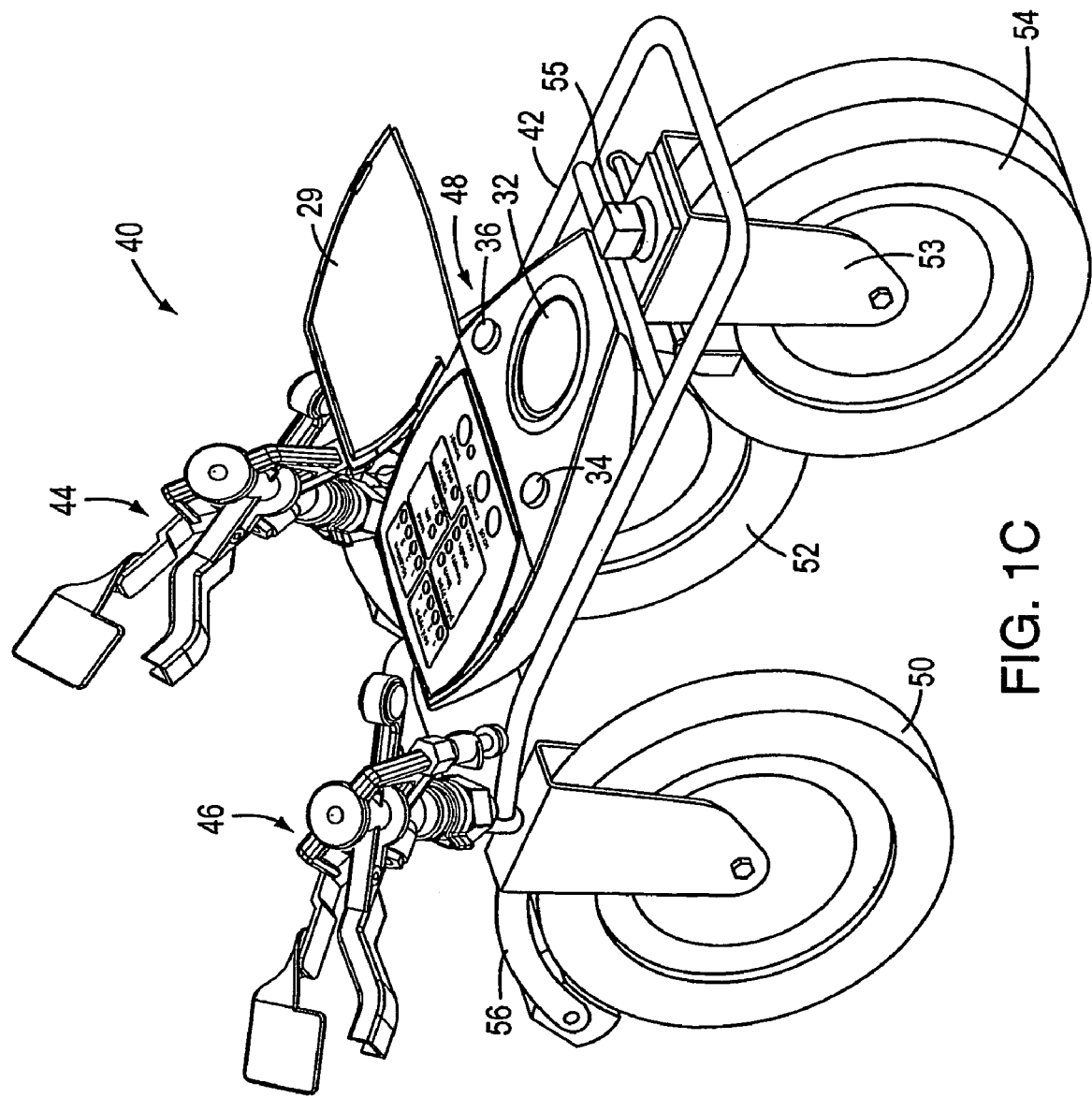
FIG. 1C is a perspective view of a mobile platform for the water delivery unit of FIG. 1.

FIG. 1C illustrates a mobile irrigation platform 40, which operates similarly to water delivery unit 10. Mobile irrigation platform 40 includes a frame 42, one or several sprinklers 44 and 46, and a body 48. Sprinklers 44 or 46 may have various embodiments described in U.S. Pat. Nos. 4,580,724; 5,031, 835; 5,031,833; 5,238,188; 5,695,122; or 6,164,562 all of which are incorporated by reference.

Mobile irrigation platform 40 also includes two rear wheels 50 and 52, both of which are independently propelled by water pressure from a water supply (not shown in FIG. 1C), and a front wheel 54. The movement of each rear wheel 50 and 52 is actuated by a solenoid valve (or another electromagnetic actuator) located at the input of each wheel so as to control its propulsion. Rear wheels 50 and 52 also include the respective brakes 56 and 58 actuated by water pressure. This arrangement provides the stopping and starting of irrigation platform 40 and enables its left-right rotation by means of shutting off the water supply to any one of wheels 50 or 52, or brakes 56 or 58. The corresponding actuators are controlled by a microcontroller located inside body 48. Body 48 also includes a local navigation device for directing or monitoring the platform's motion.

To achieve a straight-line motion with both valves to both wheels 50 and 52 open, irrigation platform 40 uses a proportional flow valve arrangement that provides a desired rate of the water supply to the propelled wheels. The proportional flow valve arrangement is placed at a location having equal distance to each wheel so as to insure equal rate of the wheel rotation. Furthermore, each wheel 50 or 52 is mounted onto frame 42 using a spring-loaded independent suspension arrangement (not shown in FIG. 1C). The spring-loaded independent suspension arrangement provides conformance to ground at different heights that may be different for each wheel at times.

Front wheel 54 is spinning free (i.e., is not self-propelling as wheels 50 and 52), but is equipped with two rotation encoders. The first rotation encoder determines the forward or reverse motion. The second rotation encoder is located inside an enclosure 55. The second rotation encoder determines the wheel's clockwise or counterclockwise rotation with respect to frame 42. That is, the second encoder measures the left or right side turns by monitoring the rotational axis of a fork 53, which secures wheel 54 to frame 42. Detailed description of the rotation encoders is provided in U.S. Provisional Application No. 60/337,112, filed on Dec. 4, 2001, entitled "Cart Management System," published as US 2003/0102969, on Jun. 5, 2003, which is incorporated by reference.

Sprinklers 44 and 46 have their spray nozzles directed at a selected angle (for example, downward with a slight outward angle so as to obtain a spray coverage to the left, right, front and rear of the frame's outline). Each sprinkler 44 or 46 is controlled by the control system and the actuator described below. The control system controls the spray pattern and the water amount. The sprinklers may be located at a selected height or may even be telescopically elevated at actuation to provide a longer trajectory and to enable watering of areas that the platform cannot access. Each sprinkler 44 and 46 may include a solenoid controlled, proportional flow valve that enables turning on/off of each individual sprinkler (or sprayer) and enables control of the spray distance and trajectory.

Mobile irrigation platform 40 includes a water inlet port (not shown) connectable to a garden hose. The water inlet port enables 360° rotation with respect to the water supply hose with further means of insuring that the platform will not override the hose by virtue of a rotating right angle rigid arm, which will extend and retain the hose beyond the platform traversing path.

Figure 2:
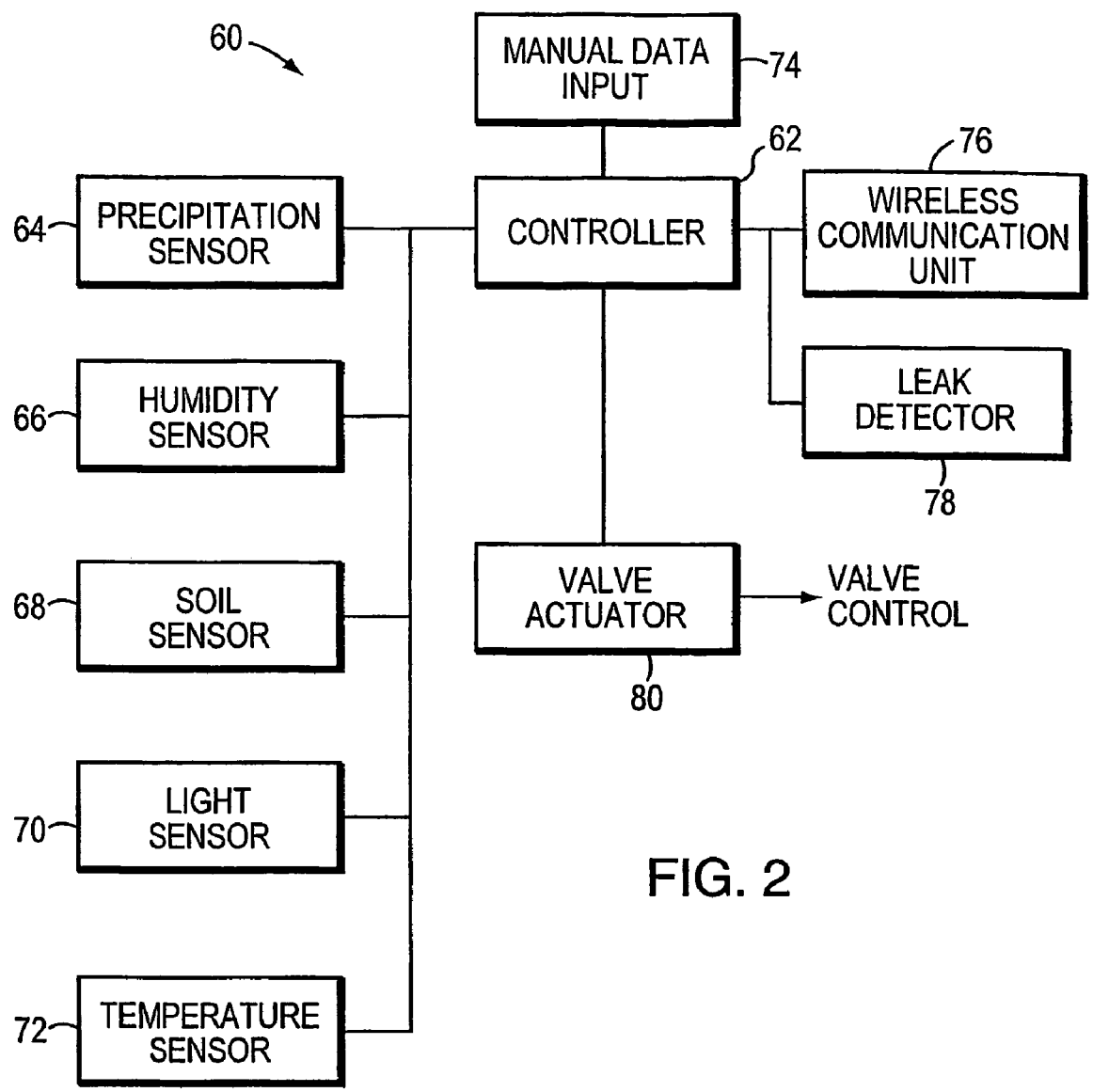
FIG. 2 is a block diagram of a sensor and control system for a single zone of the water delivery unit of FIG. 1.

FIG. 2 shows schematically the control system for a single zone irrigation platform 10. Control system includes a controller 62 for controlling operation of a valve actuator 80 constructed and arranged to control water delivery to at least one sprinkler (or another type of an irrigation device). Different types of valves, sensors, actuators and controllers are described below, all of which are preferably battery operated. Controller 62 may be connected to one, two or more sensors. For example, controller 62 is connected to a precipitation sensor 64, a humidity sensor 66, a soil moisture sensor 68, a light sensor 70 and a temperature sensor 72. Controller 62 may also be connected to a leak sensor 78 for detecting and indicating a water leak present in the water delivery unit, e.g., at a remote location, or in the ground.

Control system 60 may be connected to other external controllers, sensors, or a central operation unit using standard wires. Alternatively, control system 60 may communicate with other external units using a device described in U.S. patent application Ser. No. 09/596,251, filed on Jun. 16, 2000, and PCT Application PCT/US01/40913, entitled "Method and Apparatus for Combined Conduit/Electrical Conductor Junction Installation," which is incorporated by reference.

Alternatively, control system 60 uses a wireless communication unit 76 for sending data to or receiving data from a central communication unit, for downloading software or input data into the memory of controller 62, or for receiving remote sensor data. Controller 62 may also include one or several displays and a manual data input 74. Depending on a control algorithm and the data received from one or several sensors 64 through 72, controller 62 provides ON and OFF signals to valve actuator 80, which opens or closes water delivery. Preferably, valve actuator 80 actuates a valve device 250 described in connection with FIGS. 8 through 8B. Alternatively, valve actuator 80 may control various other types of valves, such as a diaphragm valve, a piston valve, ball valve, or any other valve known in the field.

Figure 3:
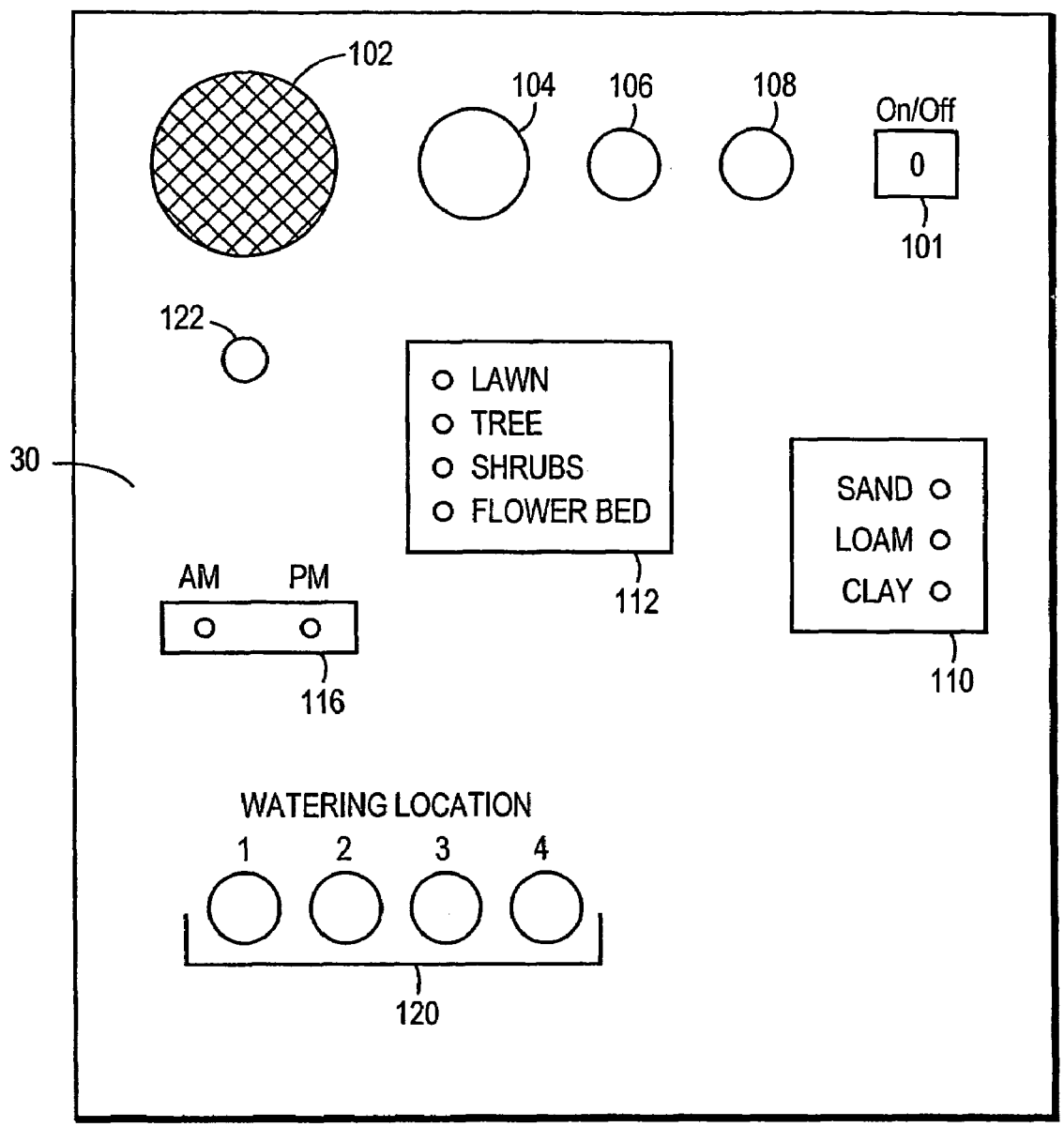
FIGS. 3 and 3A show schematically two embodiments of a control system for the water delivery unit of FIG. 1.
Figure 3A:
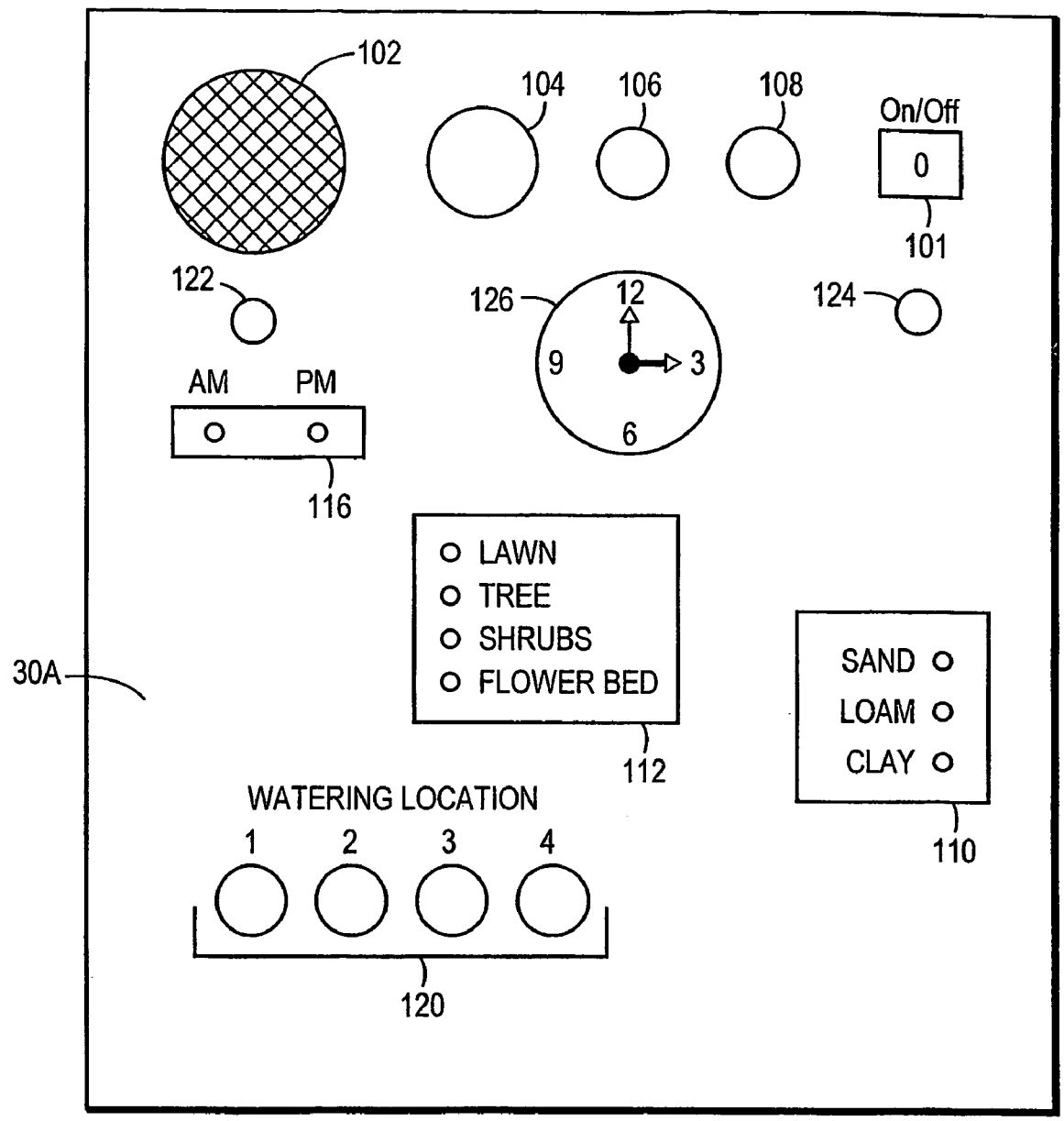

Referring to FIGS. 3 and 3A, stationary water delivery unit 10 or mobile water delivery unit 40 include user interface controls 30A. User interface controls 30 (or 30A) include several switches, selectors and indicators including a rain sensor indicator 102, a photo sensor indicator 104, a temperature sensor indicator 106, and a humidity sensor indicator 108 (whereas the module's body includes the corresponding rain sensor, the photo sensor, the temperature sensor, and the humidity sensor). User interface controls 30 (or 30A) also include a soil selector 110, a vegetation-type selector 112, and a daytime (AM, PM) selector 116, all of which may also include associated indicators. User interface controls 30 or 30A also include a watering location indicator 120 and a rain delay indicator 122, which is constructed and arranged to indicate no watering due to precipitation as detected by rain sensor 64.

The entire control and indicator system is packaged in a robust, outdoor sealed container capable of withstanding humid and hot or cold environment and also capable of withstanding mechanical shocks due to rough handling. For example, the photo-sensor is located behind a clear window, and the temperature sensor is located inside a temperature conductive conduit protecting the temperature sensor and providing good thermal coupling. Rain sensor 64 includes opening 32 covered by a removable screen and wire mesh, as described below in connection with FIG. 4. Watering time selector 116 includes two switches constructed and arranged to select daylight or night watering time and their frequency. For example, a user can select two nighttime waterings, the first one several hours after sunset and the second one half hour before sunrise. Each switch includes a built in visible indicator constructed and arranged to indicate the selected watering schedule.

Still referring to FIGS. 3 and 3A, soil selector 110 includes, for example, three switches constructed and arranged for a user to select the type of soil to be irrigated. Based on the type of soil, the microcontroller automatically adjusts the watering schedule and volume optimal for the selected type of soil and vegetation based on the vegetation type selected by selector 112. Both soil selector 110 and vegetation-type selector 112 may include a visible indicator such as a light emitting diode (LED). User interface controls 30 or 30A also include a power switch 101 and may include an RF communication module (module 76 shown in FIG. 2 or 7) constructed and arranged to receive commands related to various watering cycles.

The rain sensor detects the amount of natural precipitation and provides the corresponding signal to the microcontroller. The microcontroller may delay a watering cycle based on the amount of precipitation. The late watering cycle is displayed to a user by rain delay indicator 122. Rain delay indicator 122 includes a single color visible LED, or another indicating element. A user can manually select the vegetation type using vegetation type selector 112. The selected type of vegetation is then indicated by one of four single color visible LEDs. (Alternatively, a single multi-color or two dual color light indicators may be used.)

For example, in the embodiment where controls 30 are constructed and arranged as a hose-end controller (as shown in FIGS. 1, 1A and 1B), a user will physically move the hose-end controller, including the hose connected to a water source, to another location. Watering location indicator 120 indicates the location so that this location and prior locations will be communicated to another user (or the same user without needing to remember the locations). The selected locations may be changed, for example, once a day so that a parcel of land is watered once every three or four days depending on a selected algorithm.

FIG. 3A schematically illustrates another embodiment of the remote location control unit, that is, remote location control unit's user interface 30A. User interface controls 30A include rain sensor 102, photo sensor 104, temperature sensor 106, humidity sensor 108, watering location indicator 120, soil selector 110, and vegetation type selector 112. User interface 30A's remote location controls also include a clock 126, with an associated clock-adjust knob, and an associated AM-PM selector 116. The selected time may be stored in the memory of controller 62.

Figure 4:
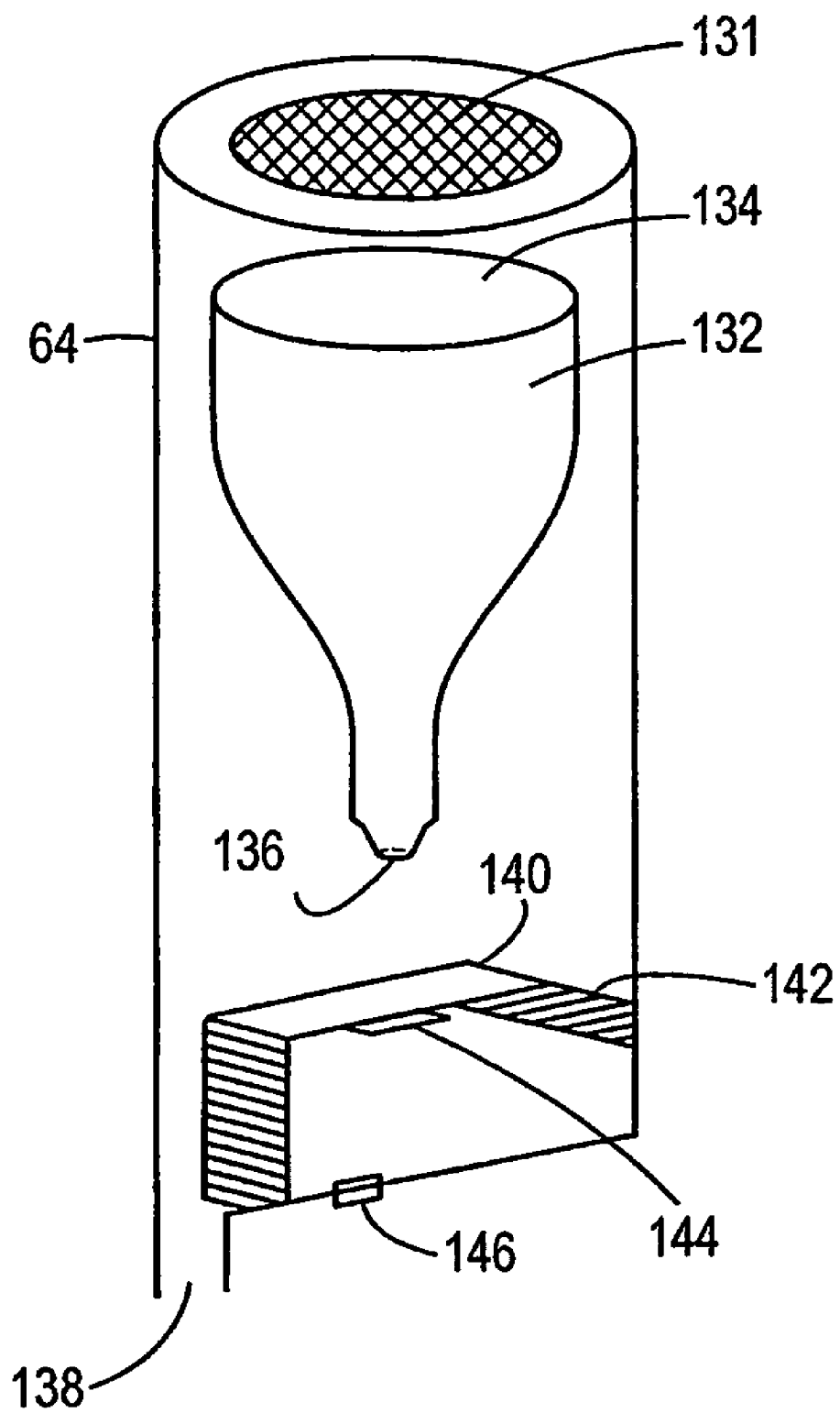
FIG. 4 shows schematically a precipitation sensor that can be used in the water delivery unit of FIG. 1.

FIG. 4 shows schematically a rain sensor (or precipitation sensor) 64. The rain sensor includes an input port 32 (seen on bodies 26 and 48), a funnel-shaped member 132, and a detector 140. The input port 32 includes a coarse convex inlet screen and a fine concave inlet screen 131 for eliminating solid contaminants and transmitting only water. Funnel-shaped member 132 includes a funnel inlet 134 and a funnel drain port 136 having a size that ensures that accumulated water will exit in forms of droplets. Detector 140 includes piezo-electric sensor 144 and electric-electric element 146. Piezo-electric disk 144 is positioned at an optimal location using positioning elements 142. Piezo-electric sensor 140 includes a sealed junction with electrical conduits exiting from the main body via one or several conduits. The droplet sensor 140 detects the size and frequency of the individual droplets exiting funnel drain port 136. The size and frequency of the droplets depends on the amount of water accumulated inside funnel-shaped member 132.

Figure 5A:
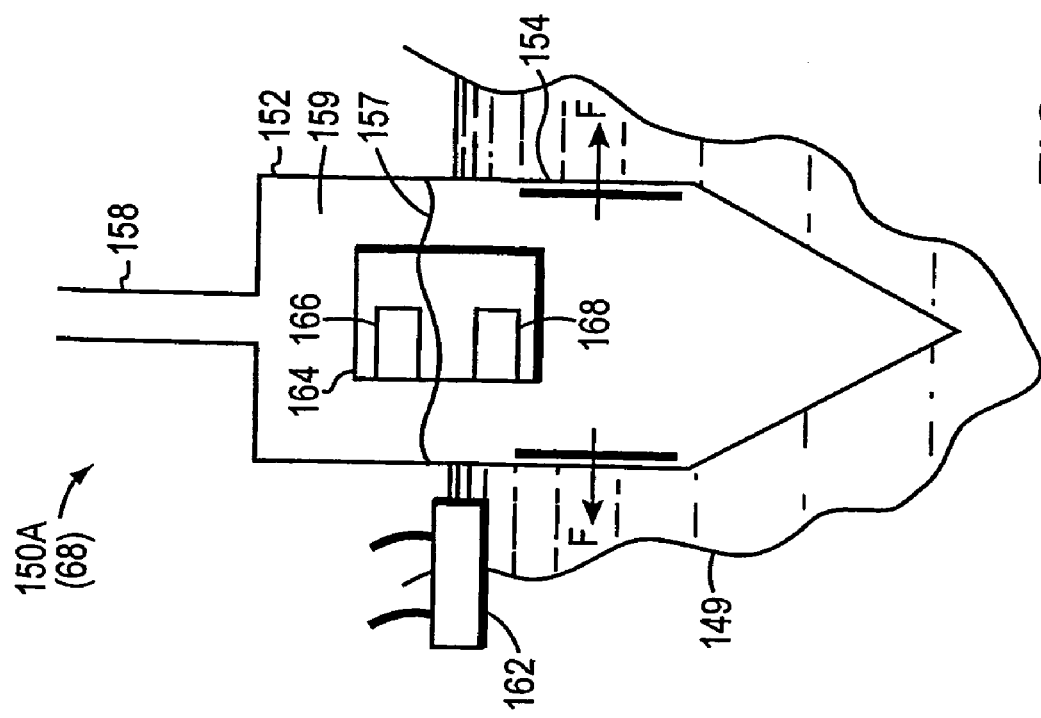
FIGS. 5 and 5A show schematically two embodiments of a soil humidity sensor that can be used in the water delivery unit of FIG. 1.
Figure 5:
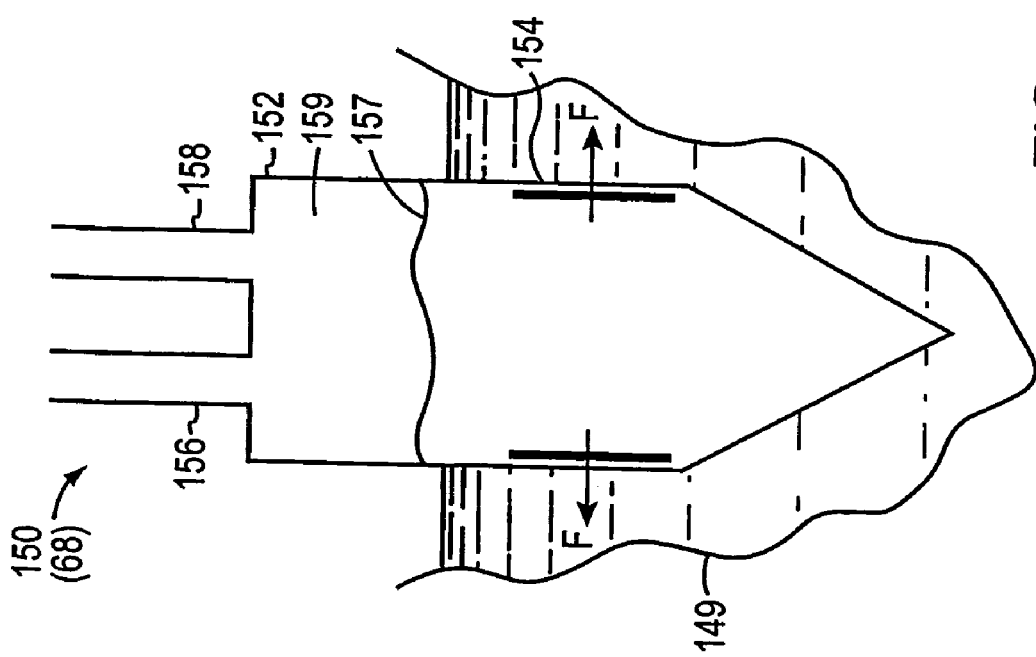

FIG. 5 shows schematically a ground moisture sensor or a soil moisture sensor 150. Soil moisture sensor 150 (i.e., soil moisture sensor 68) includes a rigid containment chamber 152 with a semi-permeable membrane 154 and two ports 156 and 158. Refill port 158 is used to deliver liquid inside rigid containment member 152, and pressure measurement port 156 is used to measure pressure above liquid level in cavity 159 inside rigid containment chamber 152. Soil moisture sensor is inserted into soil 149 so that semi-permeable membrane 154 is completely inserted inside the soil. Membrane 154 allows migration of water molecules from containment chamber 152 to the soil, wherein the migration rate depends on the hygroscopic force (F) between the soil and the liquid inside containment chamber 152. The hygroscopic force, of course, depends on the moisture content inside soil 149. Due to the water migration, there is reduced pressure in region 156, which is detected by a pressure sensor located inside body 26 (and indicated by user interface controls 30). The ground moisture sensor of FIG. 5 is relatively independent of the type of the soil because the hygroscopic force is predominantly related to the moisture content of the soil and the type of the soil plays a very small part in the algorithm. Therefore, the ground moisture sensor does not need to be calibrated each time when inserted inside soil 149.

FIG. 5A shows schematically another embodiment of the ground moisture sensor 150A (i.e., soil moisture sensor 68). Soil moisture sensor 150A includes a rigid containment chamber 152, a semi-permeable membrane 154 and a liquid fill port 158. Inside rigid containment chamber 152 there is a float 164 including two magnets 166 and 168 (generally, one or several magnets may be used). Float 164 is cooperatively arranged with a reed sensor 162 located on the external surface of, or associated with, rigid containment chamber 152.

The ground moisture sensor is filled with liquid through liquid refill port 158. Float 164 is located near or at the liquid surface, depending on its construction. Due to the hygroscopic force (F) directed from inside of rigid containment chamber 152 toward soil 149, water migrates from inside of chamber 154. As the liquid seeps out through semi-permeable membrane 154, water level drops, which changes the location (the relative height) of float 164. Reed sensor 162 detects location of magnets 166 or 168 and provides a signal to the microcontroller regarding the water level inside rigid containment chamber 152. Based on this electrical signal the ground moisture content is determined using a calibration curve. Thus the microcontroller receives information about the ground moisture from the ground moisture sensor 150 or 150A. There may be several ground moisture sensors located around the water territory and these may be hardwired to the microcontroller or may provide information using RF or other wireless coupling.

Another embodiment of soil moisture sensor 64 includes two electrodes located on a stake and insertable in the ground. The two electrodes are separated by a predetermined distance. The resistance or ion migration between the two electrodes varies depending on the ground moisture. The electrodes may be made of metals providing a different potential and thus causing migration of ions there between. A measurement circuit connected to the two electrodes measures the corresponding potential. Alternatively, the two electrodes may be made of an identical, non-corrosive metal (e.g., stainless steel 300 series) connected to an electrical circuit. The electrical circuit provides a two-point or a four-point measurement of electrical conductivity between the electrodes, which conductivity corresponds to the soil moisture. The measured conductivity data is provided to a microcontroller 62, which then determines the moisture content of the soil and determines the irrigation cycle according to a selected algorithm. Alternatively, at least one of the electrodes may include conductive and isolating regions located at different depths in the ground. Based on the conductivity value measured at different levels, the moisture sensor measures the moisture profile at different depths in the ground. Again, microcontroller 62 uses the depth moisture profile for calculating an appropriate irrigation cycle.

Alternatively, the ground moisture sensor may be a capacitive sensor having a porous dielectric. The dielectric material is in contact with the ground and water migrates between the capacitive plates by the capillary effect from the ground. Depending on the ground moisture, the dielectric constant of the capacitor varies. Thus, the capacitance value corresponds to measured moisture content of the ground.

According to another embodiment, the ground moisture sensor (i.e., the soil moisture sensor) includes a gypsum board coated with a water pearmeable film and two electrodes located inside the gypsum board and separated by a predetermined distance. The moisture sensor measures the resistance between the two electrodes, which corresponds to the ground moisture migrating into the gypsum material.

Figure 6:
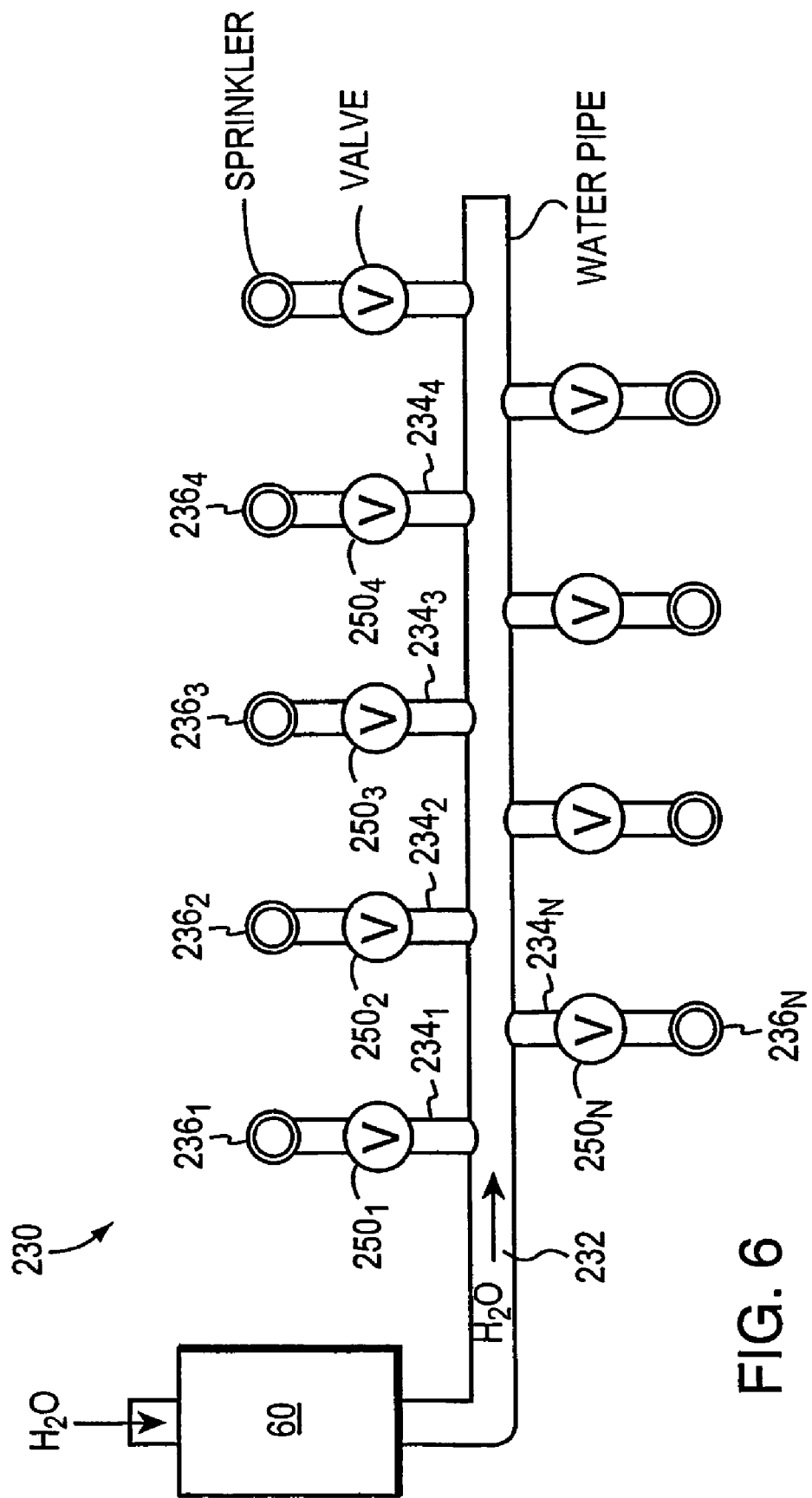
FIG. 6 shows schematically a multizone, in ground irrigation system including a multiplicity of local valves and sprinkler units.

FIG. 6 shows schematically a multizone in-ground water delivery unit 230. Water delivery unit 230 includes a control module with control system 60A and a plurality of water pipes 232 and 234 for delivering water to a number of valves 250 and a number of in-ground sprinklers, as shown in FIG. 6B. Control system 60A is shown in detail in FIG. 7.

Referring to FIG. 6B, a sprinkler system 236 includes a sealed enclosure 238 for housing a valve 250 and optionally local control system 60 (or local control system 235). Coupled to enclosure 238 is a housing 240 and a protective cover 241, all of which are located in ground 149. Housing 240 includes a pop-up element 242 having a water delivery port (or a sprinkler) located generally at a distal end 244. Pop-up element 242 also includes a vertical antenna 246 coupled to wireless communication unit 76 (FIG. 2) for wireless communication. According to another embodiment, the pop up vertical antenna is constructed independently from the sprinkler and includes a metal element raised and lowered by water pressure delivered from valve 250, or a spring-loaded metal elements raised by water pressure and retracted by a spring.

The present design may be used with various embodiments of in ground pop-up (riser) sprinklers described in U.S. Pat. Nos. 4,781,327; 4,913,351; 5,611,488; 6,050,502; 5,711,486; and US Patent Publications 2001/0032890; 2002/0092924; 2002/0153432, all of which are incorporated by reference Each valve 250 and the associated sprinkler 236 may include one control system 60 (which in this embodiment is a local control system) located inside enclosure 238 and communicating with a central control or interface system via antenna 246. Local control system 60 (shown in FIG. 2) may also be connected to leak detector 78 for detecting water leaks at valve 250. Wireless communication unit 76 may include a transmitter and a receiver, or just a receiver. At a preselected time, pop-up element 242 rises above ground 149 (by water pressure delivered from valve 250) and antenna 246 is used to establish wireless communication. Advantageously, most of the time, antenna 246 is retracted below ground thus eliminating any obstructions to people or machinery.

In general, a multizone irrigation system (e.g., irrigation system 230A shown in FIG. 6A) includes a communication system for selectively controlling different zones and delivering a selectable water amount (or delivering different amounts of water according to the local irrigation needs). The multizone irrigation system includes a central control unit 300. Each zone includes a sprinkler control unit connected to a sprinkler. Sprinkler control unit includes a local communication unit constructed to receive communication signals from the central communication unit and provide received irrigation information to the local controller. In a bi-directional system, one or several local communication units are constructed to transmit communication signals to the central communication unit, which provides received information to the central controller. The central controller thus can store specific irrigation cycles including the water amount delivered by each sprinkler or each zone. The local controller controls operation of the local valve based on the irrigation information received from the central controller and information provided by the individual local sensors.

According to another embodiment, the communication system is a wireless communication system, wherein the central communication unit includes an RF transmitter and the local communication units include an RF receiver. Alternatively, both the central communication unit and the local communication units each include an RF transceiver. The wireless communication system uses the rising antenna described above.

According to another embodiment, the communication system is a hard-wired communication system, wherein the communication wire is located along the water pipes. This embodiment is described U.S. patent application Ser. No. 09/596,251, now U.S. Pat. No. 6,748,968, and PCT Application PCT/US01/40913, entitled "Method and Apparatus for Combined Conduit/Electrical Conductor Junction Installation," both of which are incorporated by reference.

According to yet another embodiment, the communication system uses water medium in the irrigation pipes for transmitting communication messages. The messages between the central communication unit and the local communication units are transmitted using pressure waves. The communication system utilizes ultrasound waves generated by a piezoelectric elements commonly used in ultrasound systems. The central communication unit and each local communication unit include ultrasound transducers (or transducer arrays) for emitting and detecting ultrasound waves. The ultrasound transducer design, spacing and location are arranged to optimal transmission in water pipes depending on the pipe layout.

According to yet another embodiments, the communication system utilizes an acoustic/vibratory driver (electro magnetic or magnostrictive) at the central control unit. The acoustic/vibratory driver is coupled to the waterline and each local control system includes an acoustic/vibratory receiver. The acoustic/vibratory driver generates waves in the water column within the irrigation pipes and/or the piping walls. The waves carry coded information transmitted from the central controller to the local controller. For bi-directional communication, each local control system includes a driver next to the zone valve.

According to yet another embodiments, the communication system utilizes oscillating pressure waves propagating in the water conduits, which waves vary in rate, pulse width, and possibly in pulse magnitude. The pressure oscillations are attained by an oscillating pump, a two-way solenoid or another means residing at central controller unit 300. The pressure waves are detected by pressure sensors 239 (or pressure switches) associated with the sprinkler control units.

According to yet another embodiments, the communication system utilizes pressure waves generated by opening and closing a valve and propagating in the water conduits. This communication system is described in detail in connection with FIGS. 6A, 13A, 13B, 14A and 14B.

Figure 6A:
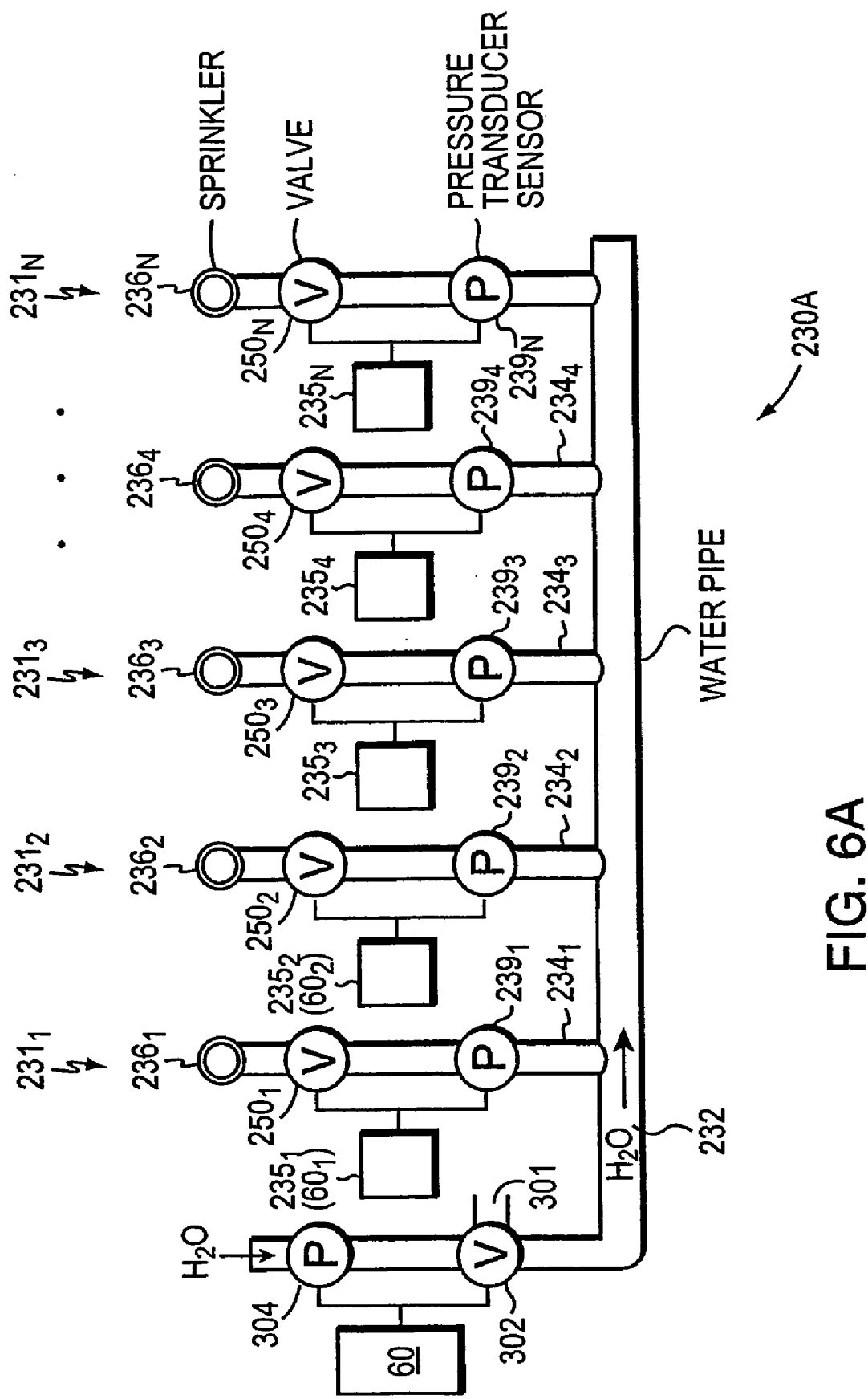
FIG. 6A shows schematically a multizone in ground irrigation system including a pressure communication system.
Figure 6B:
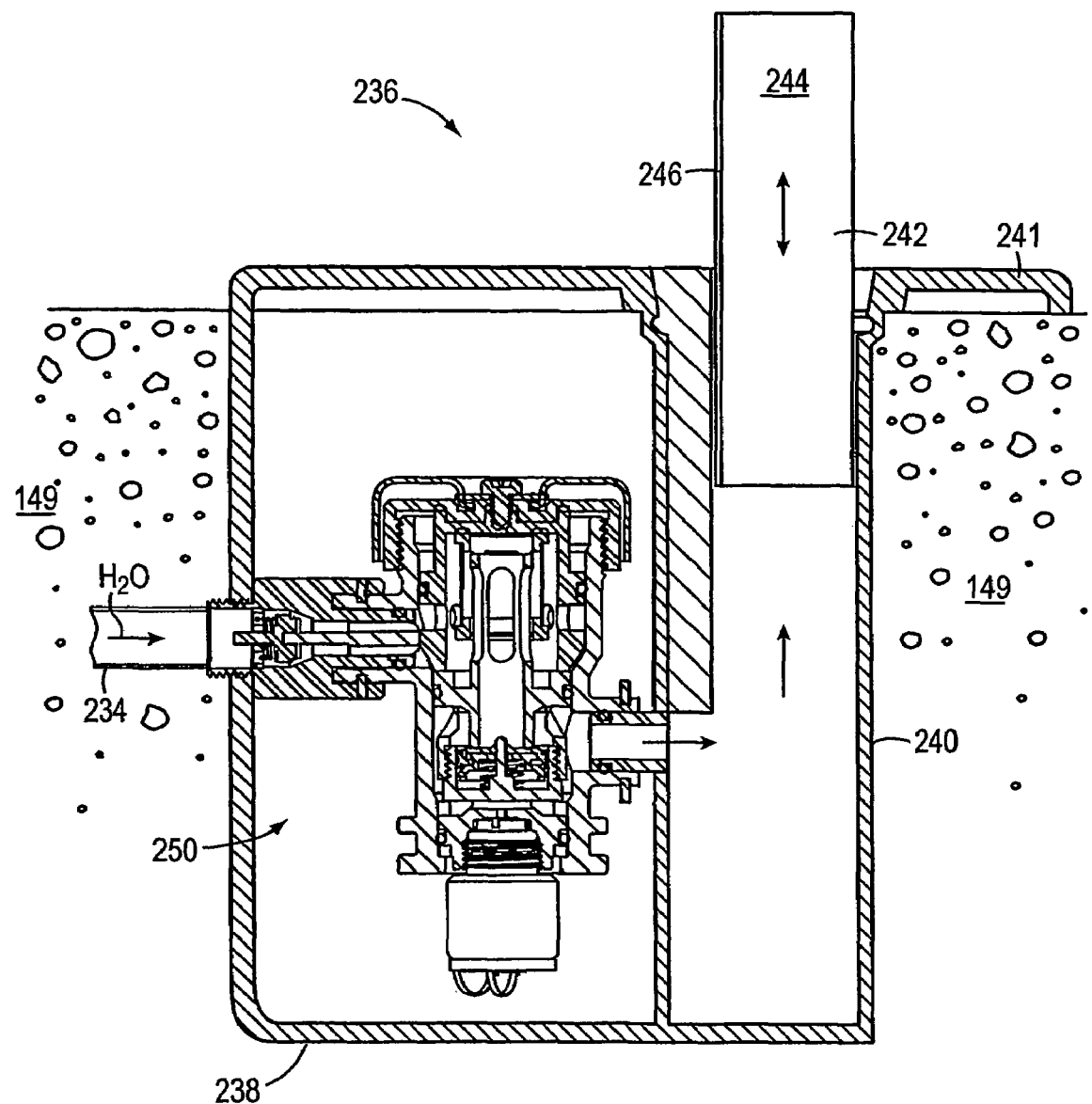
FIG. 6B shows schematically a single water delivery unit and an associated valve assembly for the multizone water delivery unit of FIG. 6 or 6A.

FIG. 6A illustrates an in-ground irrigation system 230A including a uni-directional or bi-directional communication system utilizing pressure pulses. Irrigation system 230A includes a central control unit 300 and sprinkler control units $231_1$, $231_2$, ... $236_N$. Central control unit 300 includes a central control system 60, a central valve 302 (e.g., a solenoid valve, a rotary valve or another motorized valve) and a central pressure transducer (sensor) 304 for measuring water pressure in the main input water line 301. One embodiment of the central control system 60 is described in connection with FIG. 2 and includes a central controller (processor) 62. Sprinkler control unit $231_1$ includes a local control system $235_1$, a sprinkler $236_1$, a local irrigation valve $250_1$ (e.g., a solenoid valve, a rotary valve or another motorized valve), and a local pressure transducer (sensor) $239_1$. All elements are powered by a battery. Similarly, sprinkler control unit $231_2$ includes a local control system $235_2$, a sprinkler $236_2$, a local irrigation valve $250_2$, and a local pressure transducer (sensor) $239_2$. Again, all these elements may be powered by a battery.

All N sprinkler control units $231_N$ include similar element elements though variation in the units is possible depending on the irrigation needs. The sprinkler control units have a modular design enabling field modification of the unit. That is, a technician installing or servicing the units can add or remove various sensors. For example, some local control systems 235 may include no soil or no humidity sensors, or other may include no sensors at all, but all include a central controller (i.e., a processor, memory and communication interface). According to one preferred embodiment, each sprinkler control unit 231 includes a self-contained power supply unit for recharging the batteries. The power supply unit includes a solar element utilizing the photovoltaic effect to provide power to the batteries. Alternatively, the power supply unit includes a miniature water turbine utilizing the water flow energy for generating and providing electrical power to the batteries.

Central control system 60 communicates with the sprinkler units $231_1$-$231_N$, utilizing changes in the water pressure as the signaling means. Central valve 302 is constructed to allow water to exit water pipe 232 via a port 301 and thus lower water pressure in pipes 234. Sprinkler units 231 include local controllers 235 that control valves 250 for sprinkling or for sending pressure signals by opening and closing and thus lowering and restoring water pressure in pipes 234. Pressure sensors 239 detect the changes in water pressure that constitute the communication signals and provide the corresponding electrical signal to local control systems 235.

Generally, each pressure sensor (transducer) 239 is made from high-strength, watertight, non-corrosive material such as stainless steel. The input pressure range is, for example, between 0-414 kPa (or 0-60 psi). The electrical output signal, between 4-20 mA, is then sent to the controller, which interprets the signal and uses it to determine the next action in the irrigation system, including determining amount of watering, and sending back signals by changing the water pressure. The pressure gauge should have good repeatability, and be able to reproduce an identical signal each time the same pressure is applied to it under the same conditions. It should also have a short response time, or length of time required for an output signal to be produced when the pressure is sensed.

The programmable controller of each sprinkler unit 231 has interfaces for receiving signals from pressure sensor 239, and for opening and closing sprinkler valves 250 for pressure signaling (i.e., data communication) and sprinkling. Each local controller can be programmed to both receive input from the pressure gauge (corresponding to communication signals from central control unit 300) and to send signals to central control unit 300, at particular time slots. The schedule for signals receiving and transmitting of communication at particular times is selected and designated for each sprinkler unit 231 to avoid crosstalk or communication errors.

The communication system uses a stipulated code of pressure changes, sending and decoding messages conveyed by each coded signal. Central control system 60 transmits messages to the sprinkler units utilizing pressure changes to convey amounts of irrigation based on the variables measured by the central system's sensors and/or preset values entered by a user using the system's controls. For example, central control system provides a set length of watering time one morning as based on rain the night before, and given the vegetation the sprinklers were set to water, etc. Each sprinkler unit also detects variables such as the wetness of the soil at the sprinkler's location. Based on these measurements, each sprinkler varies the amount of watering further refining the sensitivity of the system. If one sprinkler unit senses a higher amount of soil moisture than the general system, it could water 20% more than the instruction from the control system. If a sprinkler measures precipitation due to someone having watered the specific location with a hose, without having watered the entire property irrigated by the in ground watering system, the sprinkler unit's controller can also then reduce the amount it waters by a specific percentage. The magnitude of these changes is preset for each measurement involved.

Referring still to FIG. 6A, the communication signals are based on drops in water pressure. The water pressure drops are initiated by controller $235_n$ opening valve $250_n$ and letting water out of the water pipe. The water pressure goes up to its original value once the valve is closed again allowing pressure to rise to the average water pipe pressure once more. The rise in water pressure up to the main water pipe pressure occurs relatively quickly once the valve is closed again. These drops in pressure and rises to average pressure are used as code elements (i.e., each "low pressure" and "standard pressure," or L and S shown in Table 1 and 2), where a certain combination of rises and drops is detected by the pressure detectors, and is interpreted for irrigation purposes. The combination "LSLS," is executed by controller 235 opening the valve, closing it, opening it once more, and closing it again, each time for one second or another time interval sufficient for pressure recovery and detection.

Referring to Tables 1 and 2, each communication starts with a header ("LSLS"), so that any random change in water pressure is not read as a message by the pressure sensor. Each message transmission also ends with a footer, so that the system could ascertain end of transmission. In this example, a 5 sec. lowering of pressure (i.e., "LLLLL"), where the valve is open, allowing for water to exit the system, functions as a footer. (However, the unit interval may be shorter than 1 sec. And depends on the pressure recovery from "low" pressure to "standard" pressure.) Pressure detector $239_n$ detects changes in the water pressure and controller $235_n$ "translates" the messages, and determines what messages to transmit. Controller $235_n$ directs opening and closing of valve 250, therefore lowering or raising the water pressure and sending the communication signal. The communication message may include the following header, first coded term, spacer, second coded term, and footer (i.e., end of transmission string): LSLS/LSL/SSSSS/LSSL/LLLLL.

The code for each part of the message is selected depending on the amount of information being communicated, and how it is being communicated. For example, if only one type of information is being transmitted, the code can be simpler, and the spacer may not be necessary. If more information is being communicated, the code can be more complex, having more changes in pressure for each term. The same terms can also have more than one meaning depending on their location in the entire message. The controller and control unit can be made to distinguish each meaning as dependent upon the location of the term within the message.

Each sprinkler unit 231 may transmit a signal back to central control unit 300 at a predetermined time to prevent cross-talk, as shown in Tables 1 and 2. Local control system $235_1$ can transmit a signal including the header, the code for the amount the watering varied from the amount required by control system 60 ("0-20% less"), the spacer between the two signals, and the code giving the reason for the length of the watering period ("humidity level"). Then control system 60 transmits a message of its own to the sprinkler at the predetermined time. The reply message may include the header, and the code meaning "message received." Controller $235_1$ receives the signal via readings from pressure detector $239_n$, and does not attempt to send the signal once more.

This pattern continues for each sprinkler unit. In the example shown, other sprinklers in the system have watered different amounts, and for different reasons. For example, sprinkler $236_3$ has watered 40-60% less than required due to the type light levels measured in its area. Sprinkler $236_4$ has not varied the amount of watering required by control unit 60 because of precipitation levels at its location. In this last case, the control system did not receive the message, so that sprinkler $236_4$'s controller $235_4$ have to resend its message to the control system. It do so right away, within the two minutes allotted to the control unit to communicate with sprinkler $236_4$ to communicate, to make sure the message was received before the next sprinkler unit sent its message, and so that the control unit not confuse two sprinkler units' messages. This system has been used as an example only, and is by no means exclusive of embodiments, which can include new codes, meanings, times for communication, or message structures.

Figure 13:
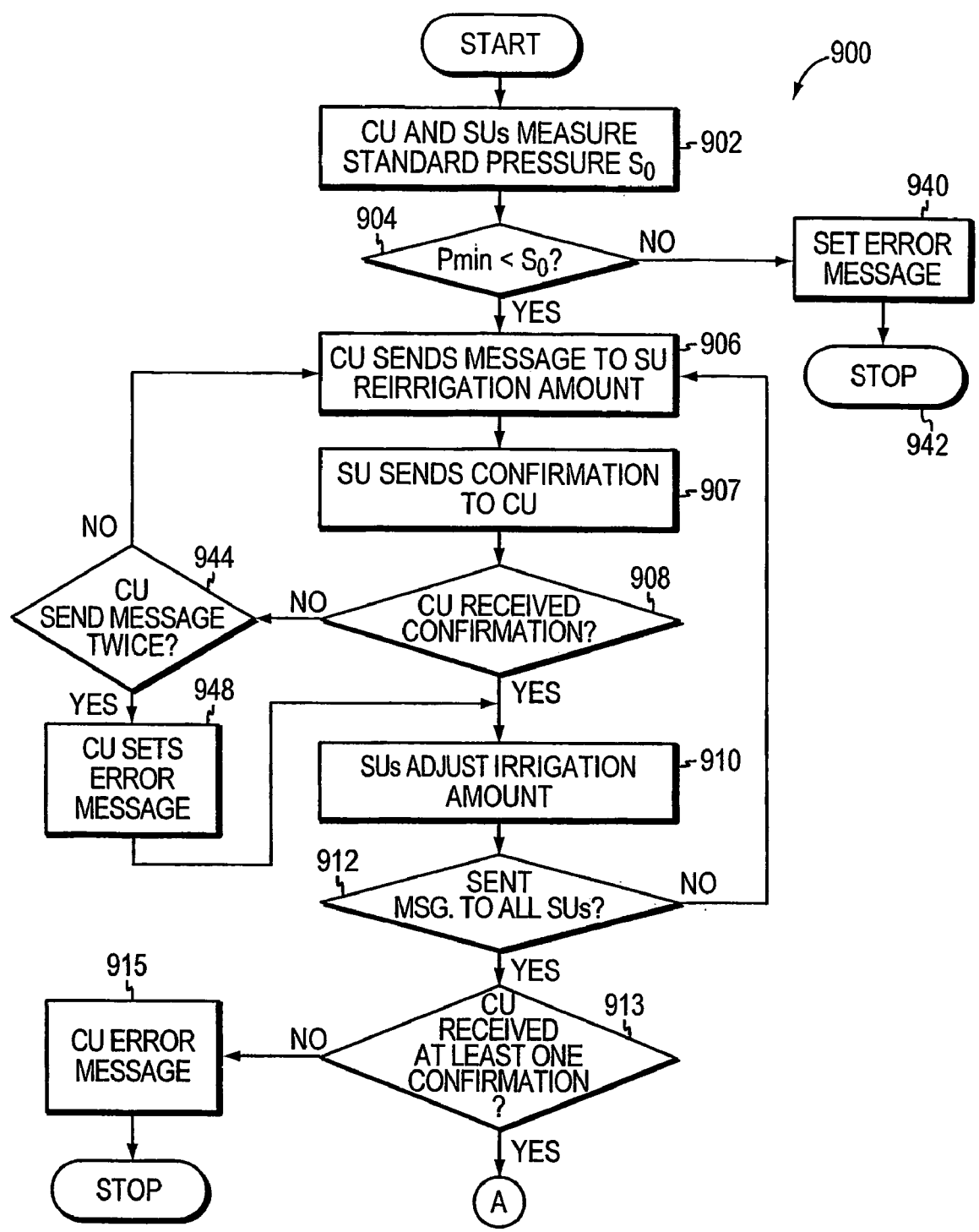
FIGS. 13 and 13A illustrate a pressure-based communication algorithm for the communication system shown in FIG. 6A.
Figure 13A:
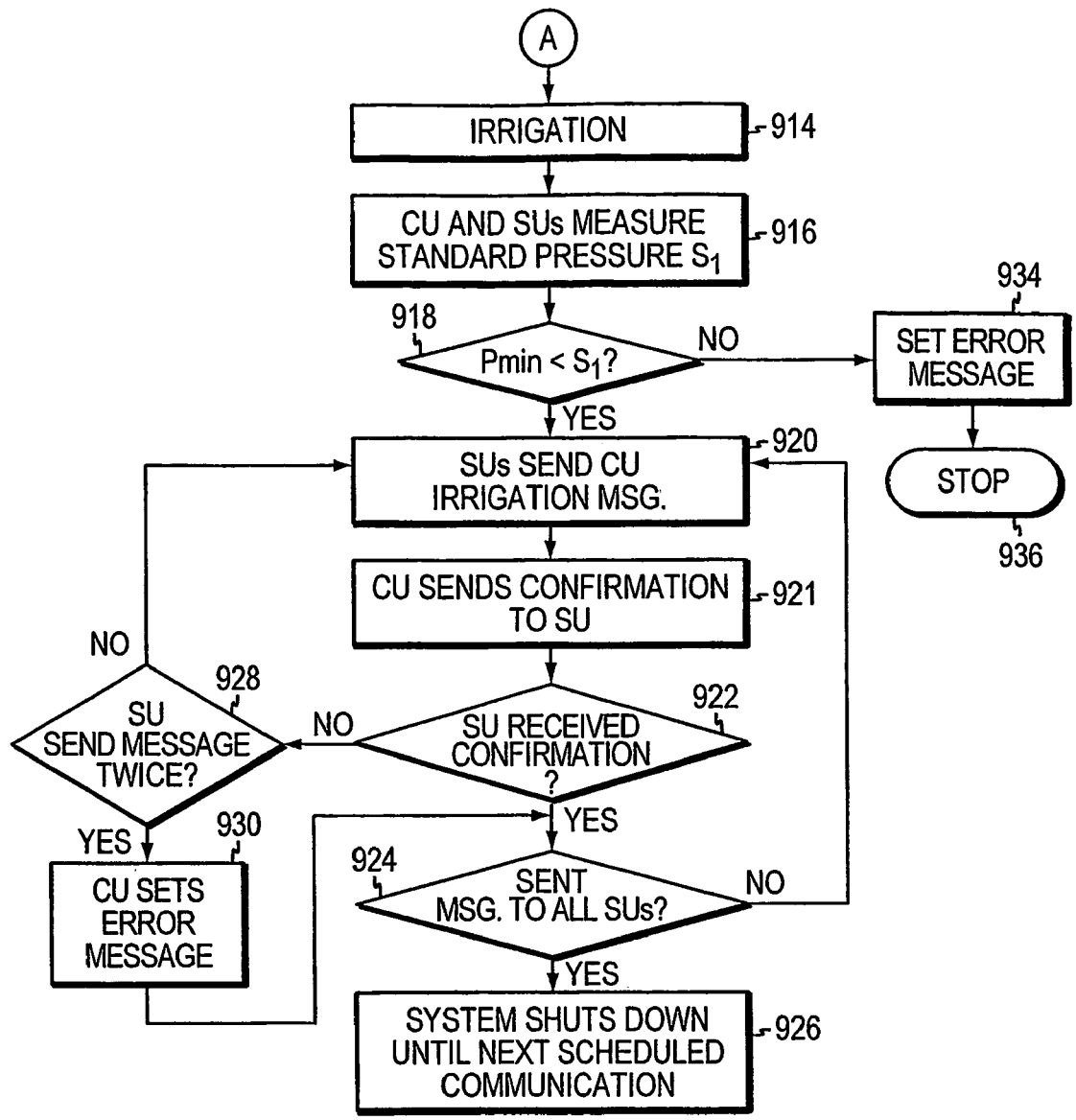

FIGS. 13A and 13B illustrate a communication algorithm for controlling irrigation system 230A (shown in FIG. 6A). Referring to FIG. 13A, initially each local control system performs a calibration of the standard pressure in water pipe 232 (step 902). During the calibration, each pressure sensor $239_n$ measures water pressure before any valve is opened, and provides the pressure to the associated local controller $235_n$. If no valves are open in the system, all the pressure readings ($S_{00}$ ... $S_{0n}$) in the system are substantially the same. If any measured pressure value for is lower than a pre-selected minimum at step 904, the system has a water leak, or a similar problem. $P_{min}$ is a specified percentage (40 or 50% or another value specific to the irrigation system) of a normal pressure in the irrigation system in kPa or psi. Upon detecting a low water pressure, central control system 60 records an error message (step 940) and stops the irrigation process (step 942). Minor leaks at some points in the system do not stop the watering process, but are registered; error signals are transmitted to central control system 60. Each sprinkler control unit 231 detecting a lower than normal pressure can separately shut down and not partake in the irrigation process. As explained below, if a sprinkler unit does not signal back to central control system 60, system 60 stores that information and indicates that the error exists, to point it out and have it serviced.

The value of having the standard pressure ($S_0$) calculated every time the system commences communication is twofold: any variances in water pressure are offset, and leaks can be detected. Once standard pressure is calculated, central control system 60 communicates to local control systems $235_n$ the amount of watering necessary for each sprinkler in the system (step 906), based on central control system 60's sensors and controls.

At the allocated time, central control system 60 sends pressure-based messages to each local control $235_n$ regarding the amount of watering necessary for the territory being irrigated (step 906). Once the message is received, the sprinkler unit confirms the receipt of the message in the time allotted for central control system-sprinkler unit communication (step 907).

Central control system 60 causes the sprinkler units to adjust their irrigation amounts by its messages according to the desires of the user, and the central control system's sensors (step 910). Each local control system $235_n$ executes irrigation based on two types of input: (A) the irrigation data received from central control system 60, and (B) readings from their local sensors 64, 66, 68, 70, and 72. Specifically, the input from local sensors 64, 66, 68, 70, and 72 is used to adjust the irrigation data received from central control system 60 at step 906.

As described in FIG. 14A, based on a soil humidity reading from soil sensor 68, local control system $235_3$ from sprinkler unit 3 reduces the watering by 20% less than the value transmitted from central control system 60. This is done, for example, for sprinkler systems located in a local valley that received more surface water. Alternatively, the irrigation amount is increased based on a soil humidity reading from soil sensor 68 by a local control system located on a hill where the soil has water loss.

If central control system 60 does not receive the sprinkler unit confirmation (step 908), and the control system 60 has not sent the message twice (step 944), it resends the message to the sprinkler unit in question (step 906). If central control system 60 transmits the irrigation message twice without return confirmation (step 944), it enters an error message for that sprinkler unit (step 948). If a message has not been sent to all sprinkler units, central control system 60 (step 912) initiates transmission of the irrigation message to the next sprinkler at the pre-selected time slot (step 908).

Table 1 (FIG. 14A) describes in further detail central control system 60 (CU) irrigation messages to the sprinkler units (SUs), following the flow diagram in FIG. 13A. The top half of the table describes the messages from central control system 60 to the sprinkler units (steps 902-906). The bottom half of the table describes the sprinkler units' confirmation messages to the central control system (steps 907, 948, 944).

The time allocation for communicating with the local control systems is pre-selected depending on the number of sprinkler units and complexity of the irrigation instructions. For example, central control system 60 transmits the irrigation instructions to local control system $235_1$ ten minute after 6 AM for a pre-selected period of ten minutes. This is a reserved time slot for local control system $235_1$, which system "wakes up" and "listens" for irrigation instructions, while the other local control systems $235_2$ through $235_n$ are inactive. Time slots of other lengths can be selected.

As an example, if the preset timing for the start of the communication algorithm is 2:00 AM, pressure will be calibrated at 2:00-2:01 AM. Central control unit 60 has a time allotted for communication with each sprinkler unit: in this case, the central control system 60 has allotted 7 minutes for transmitting the irrigation message to sprinkler unit 1, and is ready at 2:10 AM to send the message. Similarly, sprinkler unit 1's controller "listens" for the message at 2:10 AM. Central control unit 60's irrigation message to sprinkler unit 1 consists of a header ("LSLS"), instructions for the irrigation time ("LLS"), and a footer ("LLLLL"), indicating the end of the message. The meaning of the message is to water for one hour. Each message to the sprinkler units follows a similar format.

Sprinkler unit 1 transmits its confirmation message at 2:18, sprinkler unit 2 at 2:28, etc. Similarly, the central control unit is ready to receive these messages at these same times. The message follows the same format as above: a header ("LSLL"), a message received/not received signal ("LSLL" or "LLS"), and a footer ("LLLLL").

Referring again to FIG. 13A, central control system 60 checks if it received at least one confirmation (step 913). If not, it enters an error message (step 915) and stops the irrigation process. This confirms once more that the sprinkler units are sending the messages, and that the central control unit is properly detecting them.

Referring now to FIG. 13B, once irrigation (step 914) occurs, each sprinkler sends central control system 60 a message regarding how much it watered, and why. The standard pressure is remeasured ($S_{10}$–$S_{1n}$) for the central control unit and all sprinkler units. Again, if this measurement is not less than the set minimum (step 918), an error message is set (step 934) and the system stops (step 936).

If the pressure is set for signaling, the sprinkler units send central control system 60 the confirmation messages (step 920). The central control system sends back a confirmation to the sprinkler units at step 921. If the sprinkler units do not receive confirmation (step 922), and the sprinkler units have not sent the message twice already (step 928), the message is resent (step 920). However, if the message had already been sent (step 930), the central control unit sets an error message for future servicing (step 930).

These steps are further described in FIG. 14B, in which sprinkler unit 1 is about to transmit its irrigation report to the central control system. The top half of table 2 in FIG. 14B corresponds to the messages from the sprinkler units' messages to the central control system (steps 920, 928). The bottom half of the table describes the central control system's confirmation message to the sprinkler units (steps 921, 922). Transmittal for sprinkler unit 1 is set for 6:10-6:18 AM, so that central control system 60 is ready to receive at that time as well. The sprinkler units and the central control unit has transmit and receive times set up so that each is transmitting and receiving simultaneously, and can associate the messages with each other. Sprinkler unit 1 sends a message consisting of a header ("LSLS"), the signal for the amount it watered ("LLS"), a spacer ("SSSSS"), a signal for the reason ("LSLL"), and a footer ("LLLLL"). In this case the message means that the sprinkler unit watered 0-20% less than was required by the central control system due to local humidity levels. Sprinkler units 1-4 sent different messages, in the same format, giving different reasons for the way they irrigated. (See Table 2, FIG. 14B)

Central control system 60 then confirms the messages by each sprinkler unit. Again, there is a preset time that central control system 60 transmits, and that the sprinkler units receive: for sprinkler unit 1, that is 6:18-6:22 AM. For sprinkler unit 2, 6:28-6:32 AM, etc. The messages consist of a header, a received or not received message, and a footer (i.e., end of communication string).

At this point, if the central control system sent messages to all the sprinkler units (step 924), it shuts the system down until the next scheduled communication. The system will then turn on, recalibrate, and communicate in the same manner as that described above.

The parameters described can be changed, and are not inclusive: the time for communication, the number of times the message can be resent, the number of components (both for the sprinkler units and the central control system), and the nature of the messages, for example, can all be modified.

According to another embodiment, an ultrasonic communication system provides communication between the central control unit and the sprinkler units. While water is an ideal medium for transmitting mechanical sound waves, the irrigation pipes may "complicate" the propagation and detection of the signal. The system is similar to the system shown in FIG. 6A, but pressure detectors 239 are replaced by piezoelectric transducers, and the control units include a pulser providing electrical signals to the transducer. As known in the art, the transducers' piezoelectric elements convert the controllers' electrical signals into mechanical vibrations in the "transmit" mode. In the "receive" mode, the piezoelectric elements convert mechanical vibrations into electrical signals provided to the controllers.

In the ultrasonic communication system, the generated longitudinal sound waves travel through the water in the water pipes. However, the communication system is sensitive to changes in the generated waves. Therefore, the ultrasonic communication system is designed with smooth pipes generally free of blemishes and discontinuities, which cause energy reflections. The reflection sensitivity can, however, be used to provide orientation and distance which can be used to identify the transmitter. That is, once the control unit received a signal, the nature of the signal could be used to ascertain which sprinkler unit had sent it. This is a desirable quality when setting up communication codes, particularly in simpler irrigation systems. In the ultrasound communication system, the central control system communicates with the local control system using algorithms similar to flow diagram 900. However, since the ultrasound system enables a higher data transmission rate, the communication code may be much more elaborate that the code examples provided in Tables 1 and 2.

Depending on the size and materials of the irrigation system, the scattering of the signals and their absorption could become a concern, and it may be necessary to have some of the sprinkler units relay signals so they can more easily and clearly reach more remote parts of the system. Controllers at certain points along the system is programmed to resend signals to the control unit from sprinkler units further away, and vice-versa. The necessity for this relay could be reduced not only by optimizing the shape and size of the system, but also by generally using relay transmitters and strategic locations of ultrasonic transducers or selection of suitable arrays.

The above described communications systems increase their reliability by optionally using an error control algorithm. The system can use either a forward error correction strategy (FEC) or an automatic repeat request strategy (ARR). The FEC algorithm, such as the Hamming code) provides for error correction where a transmission error is detected. The ARQ algorithm initiates automatically re-transmission if a communication error or corrupted data are detected. The FEC protocol is generally not preferred for the irrigation communication system of FIG. 6A, since re-transmission of the signal is possible. The FEC protocol requires much more redundant information transmission than the ARQ protocol. The redundancy requires a larger data transfer due largely to the fact that the number of overhead bits needed to implement an error detection scheme is much less than the number of bits needed to correct the same error.

Figure 7:
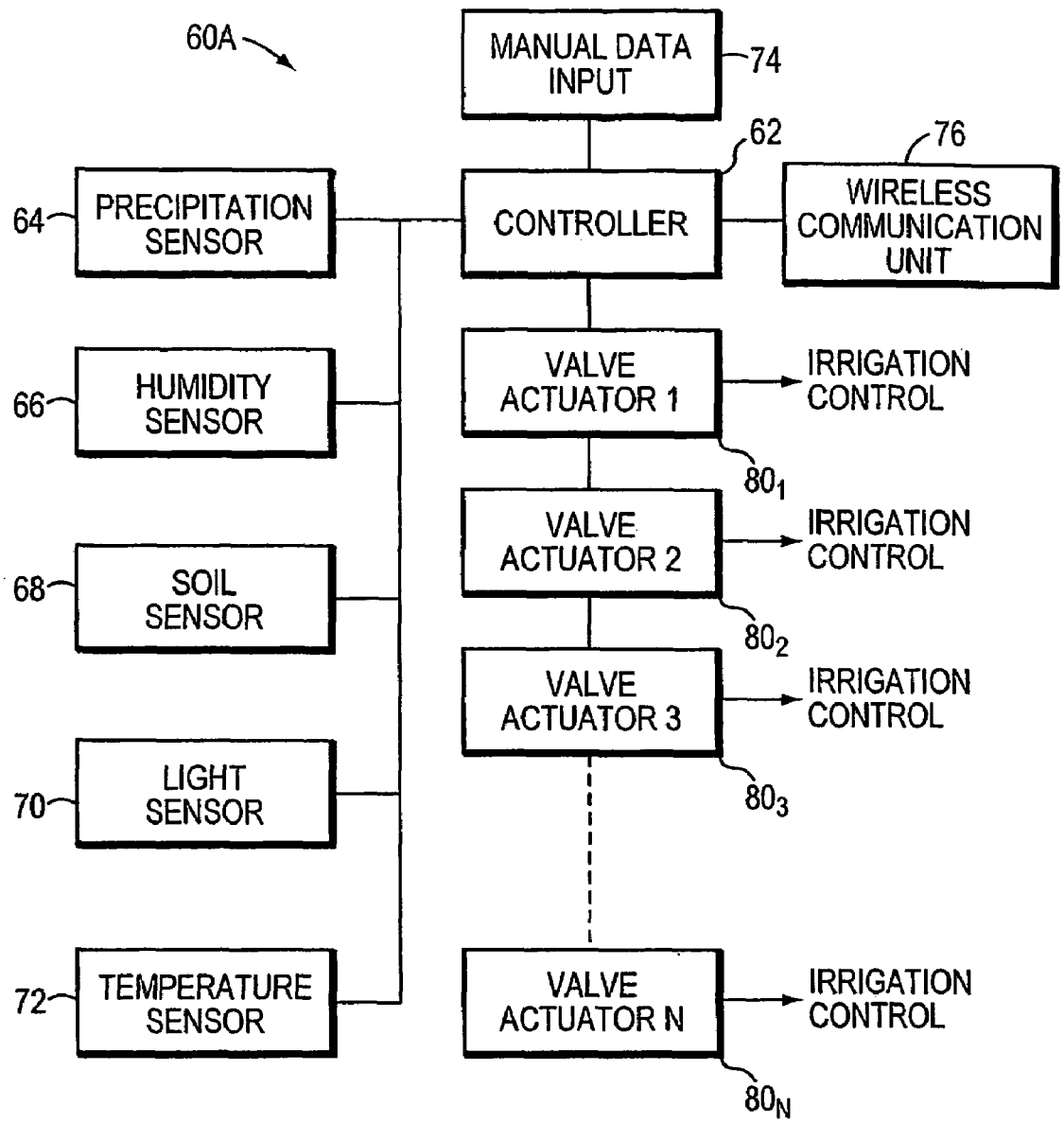
FIG. 7 is a block diagram of a sensor and control system for a multi-zone water delivery unit.

FIG. 7 illustrates diagrammatically a multi-zone irrigation control system 60A. Irrigation control system 60A includes controller 62 receiving data from one or several sensors 64 through 72, described above. Controller 62 provides drive ON or OFF signals to valve actuators $80_1, 80_2, 80_3 \ldots 80_N$. Valve actuators $80_1, 80_2, 80_3 \ldots 80_N$ actuate individual valve devices that in turn provide water to separate sprinklers (or any other irrigation units). Again, controller 62 may have an associated wireless communication unit 76 for sending data to, or receiving data from, a central communication unit, a remote sensor, or any other device.

Figure 8:
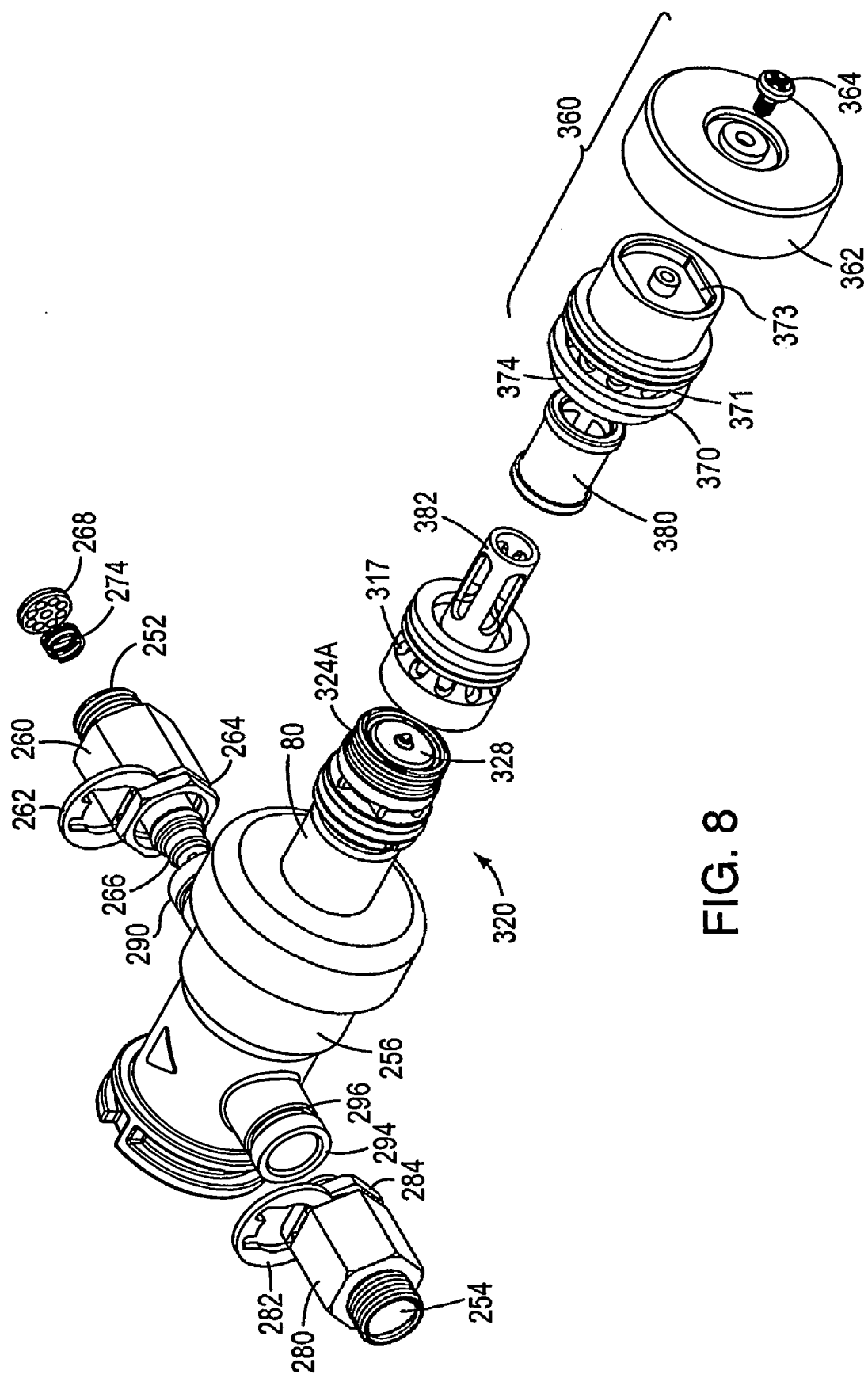
FIG. 8 is a perspective exploded view of a valve device used in the water delivery unit of FIG. 1.
Figure 8A:
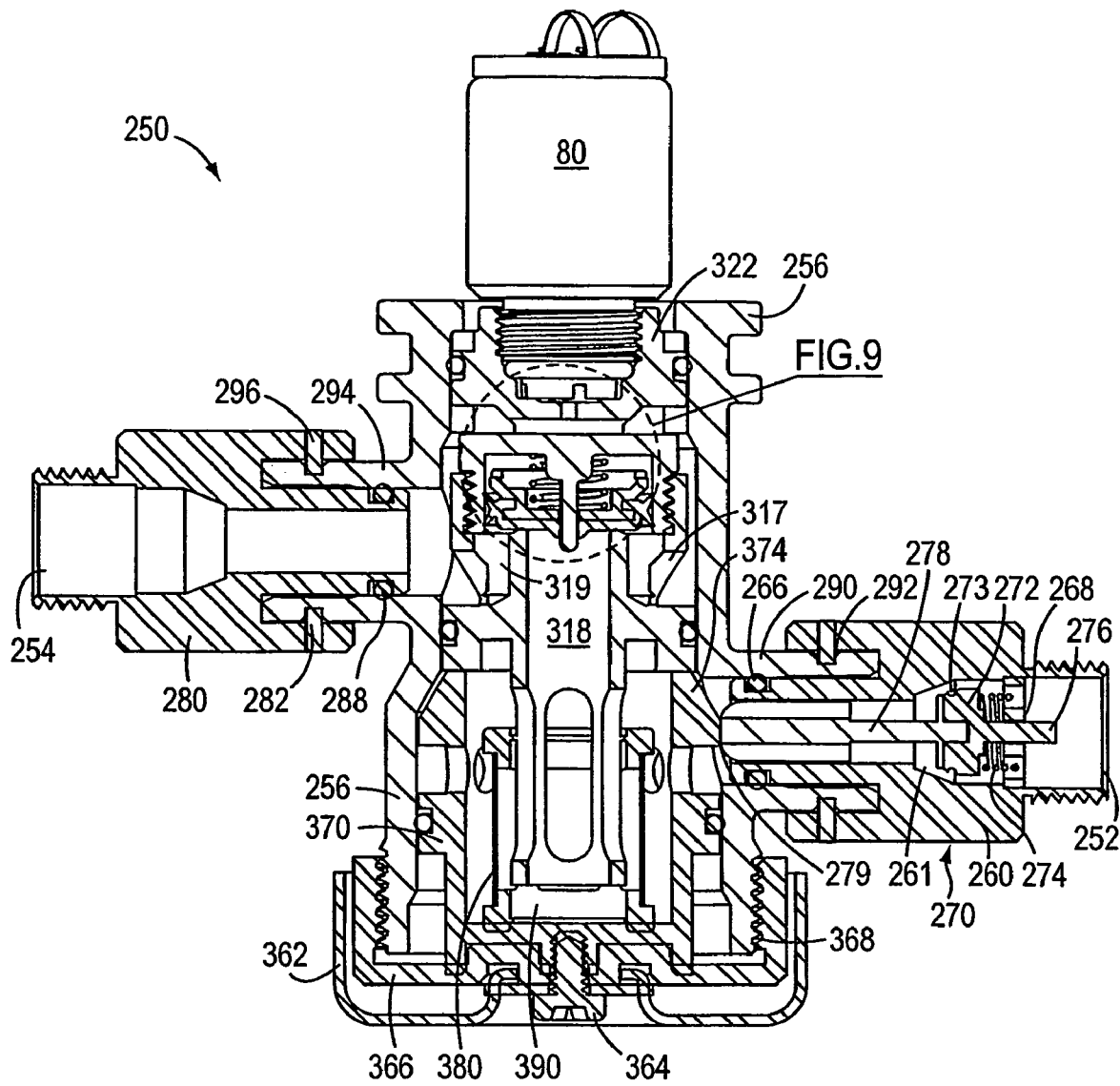
FIG. 8A is an enlarged cross-sectional view of the valve device shown in FIG. 8.
Figure 8B:
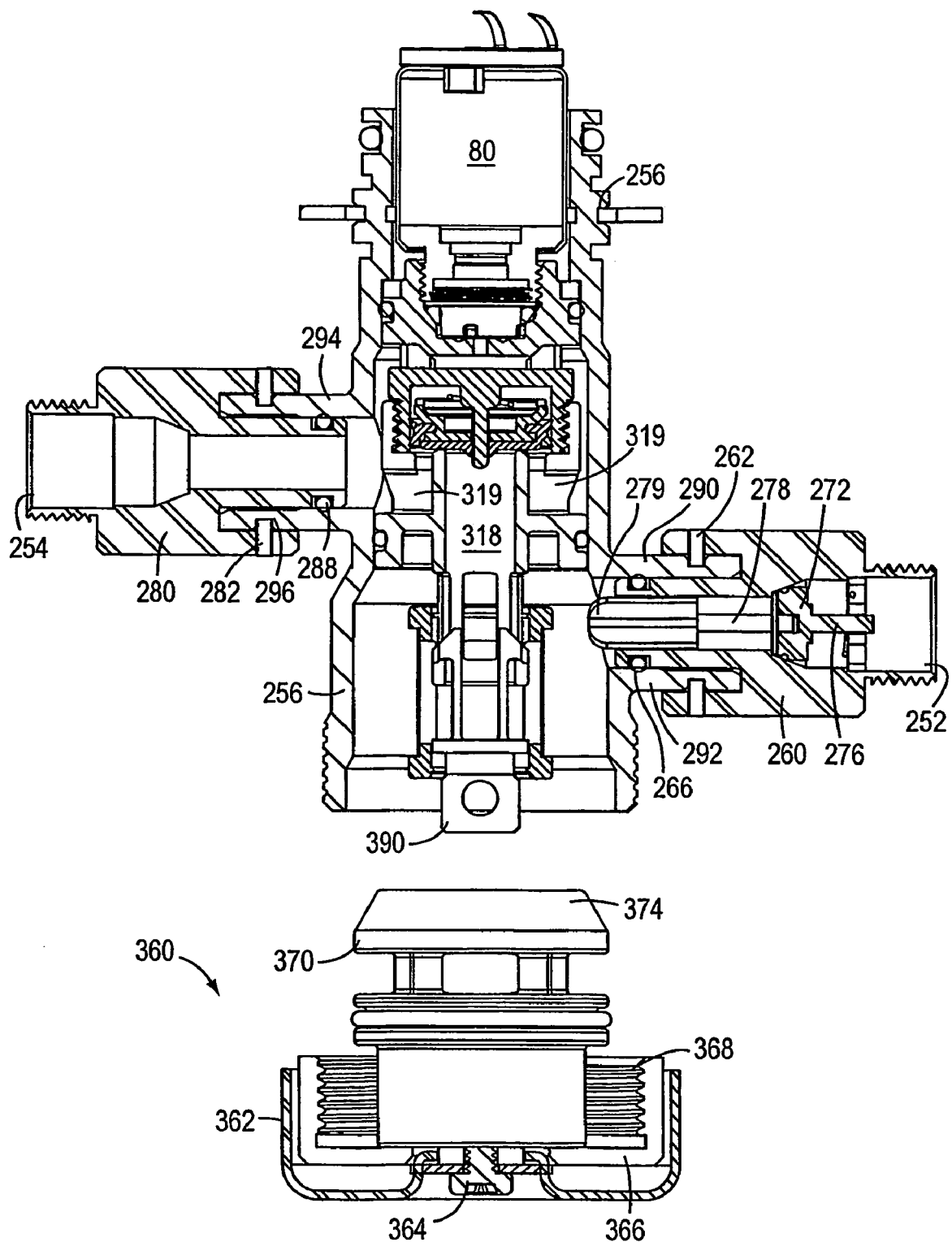
FIG. 8B is an enlarged cross-sectional view of the valve device shown in FIG. 8A, but partially disassembled for servicing.

FIGS. 8, 8A and 8B illustrate an automatic valve device 250 constructed and arranged for controlling water flow in water delivery unit 10, 40, or 236. Specifically, automatic valve device 250 receives water at a valve input port 252 and provides water from a valve output port 254, in the open state. Automatic valve device 250 includes a body 256 made of a durable plastic or metal. Preferably, valve body 256 is made of a plastic material but includes a metallic input coupler 260 and a metallic output coupler 280. Input and output couplers 260 and 280 are made of metal (such as brass, copper or steel) so that they can provide gripping surfaces for a wrench used to connect them to a water line inside water delivery unit 10 (or in ground unit 236). Valve body 256 includes a valve input port 290, and a valve output port 294.

Metallic input coupler 260 is rotatably attached to input port 290 using a C-clamp 262 that slides into a slit 264 inside input coupler 260 and also a slit 292 inside the body of input port 290. Metallic output coupler 280 is rotatably attached to output port 294 using a C-clamp 282 that slides into a slit 284 inside output coupler 280 and also a slit 296 inside the body of output port 294. When servicing delivery unit 10 (or in ground unit 236), this rotatable arrangement prevents tightening the water line connection to any of the two valve couplers unless attaching the wrench to the surface of couplers 260 and 280. (That is, a service person cannot tighten the water input and output lines by gripping on the valve body 256.) This protects the relatively softer plastic body 256 of automatic valve device 250. However, body 256 can be made of a metal in which case the above-described rotatable coupling is not needed. A sealing O-ring 266 seals input coupler 260 to input port 290, and a sealing O-ring 288 seals output coupler 280 to input port 294.

Referring to FIGS. 8, 8A, and 8B, metallic input coupler 260 includes an inflow adjuster 270 cooperatively arranged with a flow control mechanism 360. Inflow adjuster 270 includes an adjuster piston 272, a closing spring 274 arranged around an adjuster pin 276 and pressing against a pin retainer 268. Inflow adjuster 270 also includes an adjuster rod 278 coupled to and displacing adjuster piston 272. Flow control mechanism 360 includes a spin cap 362 coupled by screw 364 to an adjustment cap 366 in communication with a flow control cam 370. Flow control cam 370 slides linearly inside body 256 upon turning adjustment cap 366. Flow control cam 370 includes inlet flow openings 371, a locking mechanism 373 and a chamfered surface 374. Chamfered surface 374 is cooperatively arranged with a distal end 279 of adjuster rod 278. The linear movement of flow control cam 370, within valve body 256, displaces chamfered surface 374 and thus displaces adjuster rod 278. Adjuster piston 272 also includes an inner surface 273 cooperatively arranged with an inlet seat 261 of input coupler 260. The linear movement of adjuster rod 278 displaces adjuster piston 272 between a closed position and an open position. In the closed position, sealing surface 273 seals inner seat 261 by the force of closing spring 274. In the opened position, adjuster rod 278 displaces adjuster piston 272 against closing spring 274 thereby providing a selectively sized opening between inlet seat 261 and sealing surface 273. Thus, by turning adjustment cap 366, adjuster rod 278 opens and closes inflow adjuster 270. Inflow adjuster 270 controls the water input flow to sprinkler 24. The above-described manual adjustment can be replaced by an automatic motorized adjustment mechanism controlled by microcontroller 62.

Referring still to FIGS. 8, 8A and 8B, automatic valve device 250 also includes a removable inlet filter 380 removably located over an inlet filter holder 382, which is part of the lower valve housing. Inlet filter holder 382 also includes an O-ring and a set of outlet holes 317 shown in FIG. 9. The "fram" piston 326 is shown in detail in FIG. 9A. Water flows from input port 252 of input coupler 260 through inflow adjuster 270 and then through inlet flow openings 371, and through inlet filter 380 inside inlet filter holder 382. Water then arrives at an input chamber 318 inside a cylindrical input element 324 (FIG. 9) providing pressure against a pliable member 328.

Automatic valve device 250 also includes a service loop 390 (or a service rod) designed to pull the entire valve assembly, including attached actuator 80, out of body 256, after removing of plug 366. The removal of the entire valve assembly also removes the attached actuator 80 and piloting button 705 (shown in FIG. 10). To enable easy installation and servicing, there are rotational electrical contacts located on a PCB at the distal end of actuator 80. Specifically, actuator 80 includes, on its distal end, two annular contact regions that provide a contact surface for the corresponding pins, all of which can be gold plated for achieving high quality contacts. Alternatively, a stationary PCB can include the two annular contact regions and the actuator may be connected to movable contact pins. Such distal, actuator contact assembly achieves easy rotational contacts by just sliding actuator 80 located inside valve body 502.

Figure 8C:
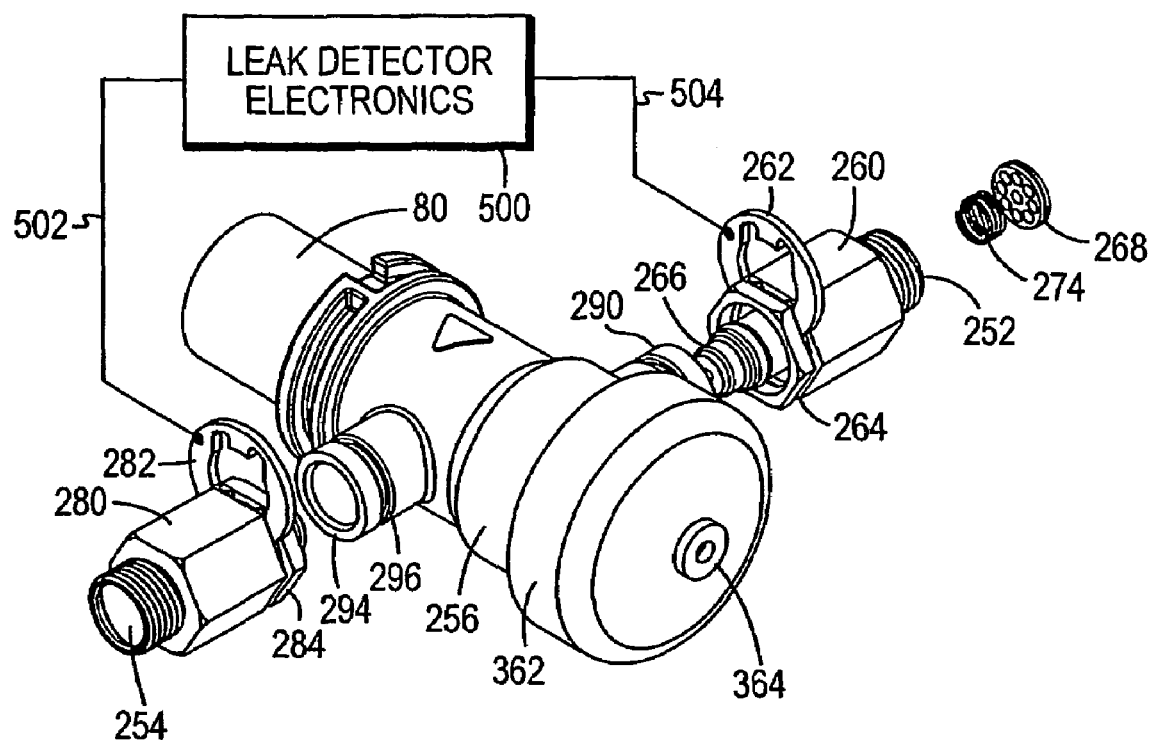
FIG. 8C is a perspective view of the valve device of FIG. 1 including a leak detector.

FIG. 8C illustrates automatic valve device 250 including leak detector 78 (FIG. 2) for indicating a water leak or water flow across valve device 250. Leak sensor 78 includes electronic measurement circuit 500 and at least two electrodes 502 and 504 coupled respectively to input coupler 260 and output coupler 280. (The leak sensor may also include four electrodes for a four-point resistivity measurement). Valve body 256 is made of plastic or another non-conductive material. In the closed state, when there is no water flow between input coupler 260 and output coupler 280, electronic circuit 500 measures a very high resistance value between the two electrodes. In the open state, the resistance value between input coupler 260 and output coupler 280 drops dramatically because the flowing water provides a conductive path.

There are various embodiments of electronics 500, which can provide a DC measurement, an AC measurement including eliminating noise using a lock-in amplifier (as known in the art). Alternatively, electronics 500 may include a bridge or another measurement circuit for a precise measurement of the resistivity. Electronic circuit 500 provides the resistivity value to microcontroller 62 and thus indicates when valve device 250 is in the open state. Furthermore, leak sensor 78 indicates when there is an undesired water leak between input coupler 260 and output coupler 280. The entire valve 250 is located in an isolating enclosure (e.g., enclosure 26 in FIG. 1, or enclosure 238 in FIG. 6A) to prevent any undesired ground paths that would affect the conductivity measurement. Furthermore, leak sensor 78 can indicate some other valve failures when water leaks into enclosure 26 or 238 from valve device 250. Thus, leak detector 78 can sense undesired water leaks that would be otherwise difficult to observe. Leak detector 78 is constructed to detect the open state of the irrigation system to confirm proper operation at a remote location.

Figure 9:
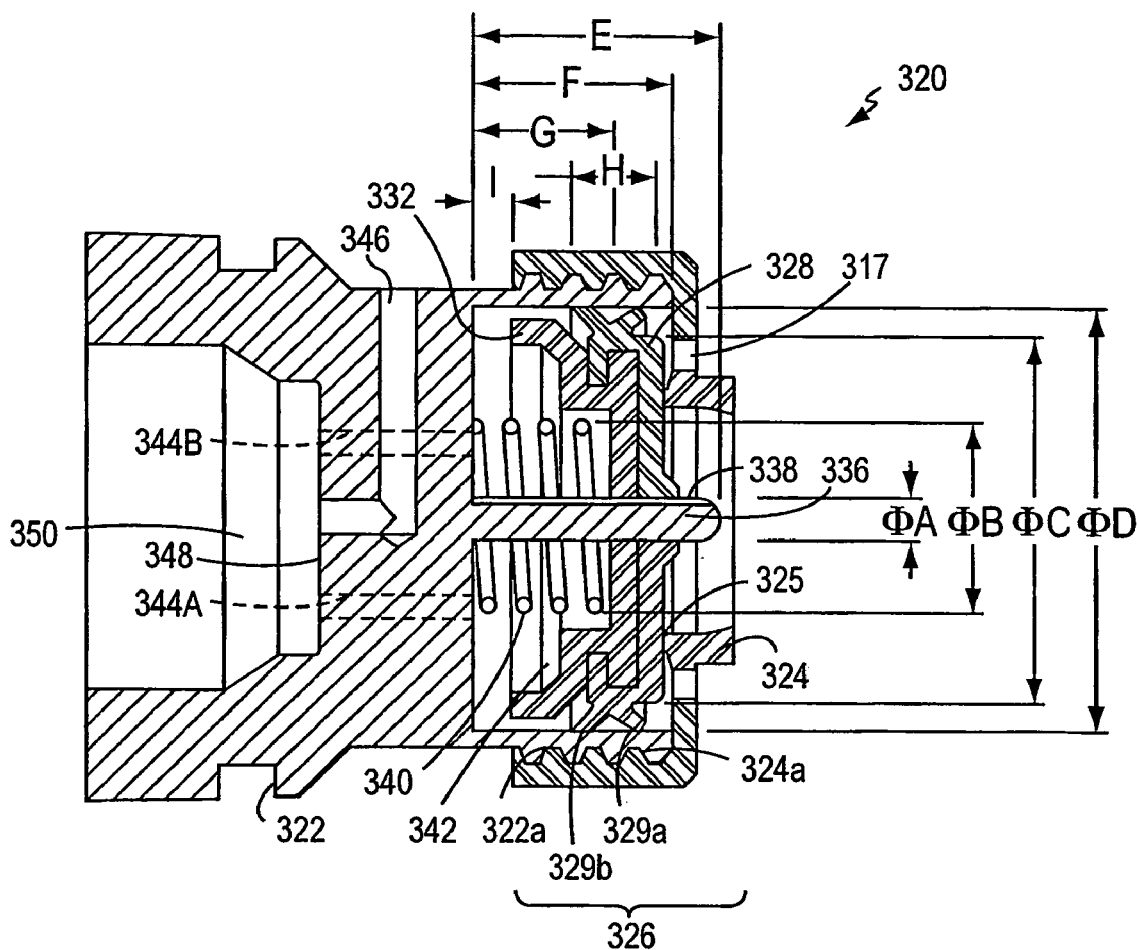
FIG. 9 is an enlarged cross-sectional view of a moving piston-like member used in the valve device shown in FIGS. 8, 8A, and 8B.

Automatic valve device 250 may include a standard diaphragm valve, a standard piston valve, or a novel "fram" piston valve 320 explained in detail in connection with FIGS. 9, 9A, and 9B. Referring to FIG. 9, valve 320 includes distal body 324, which includes an annular lip seal 325 arranged, together with pliable member 328 (FIG. 9A), to provide a seal between input port chamber 318 and output chamber 319. Distal body 324 also includes one or several flow channels 317 (also shown in FIG. 8) providing communication (in the open state) between input chamber 318 and output chamber 319. Pliable member 328 also includes sealing members 329A and 329B arranged to provide a sliding seal, with respect to valve body 322, between pilot chamber 342 and output chamber 319. There are various possible embodiments of seals 329a and 329b (FIG. 9). This seal may be a one-sided as seal or two-sided seal 329A and 329B shown in FIG. 9. Furthermore, there are various additional embodiments of the sliding seal including O-rings, etc.

The present invention envisions valve device 326 having various sizes. For example, the "full" size embodiment has the pin diameter A=0.070", the spring diameter B=0.360", the pliable member diameter C=0.730", the overall fram and seal's diameter D=0.812", the pin length E=0.450", the body height F=0.380", the pilot chamber height G=0.280", the fram member size H=0.160", and the fram excursion I=0.100". The overall height of the valve is about 1.39" and diameter is about 1.178".

The "half size" embodiment of the "fram piston" valve has the following dimensions provided with the same reference letters. In the "half size" valve A=0.070", B=0.30, C=0.560", D=0.650", E=0.38", F=0.310", G=0.215", H=0.125", and I=0.60". The overall length of the ½ embodiment is about 1.350" and the diameter is about 0.855". Different embodiments of the "fram piston" valve device may have various larger or smaller sizes.

Figure 9A:
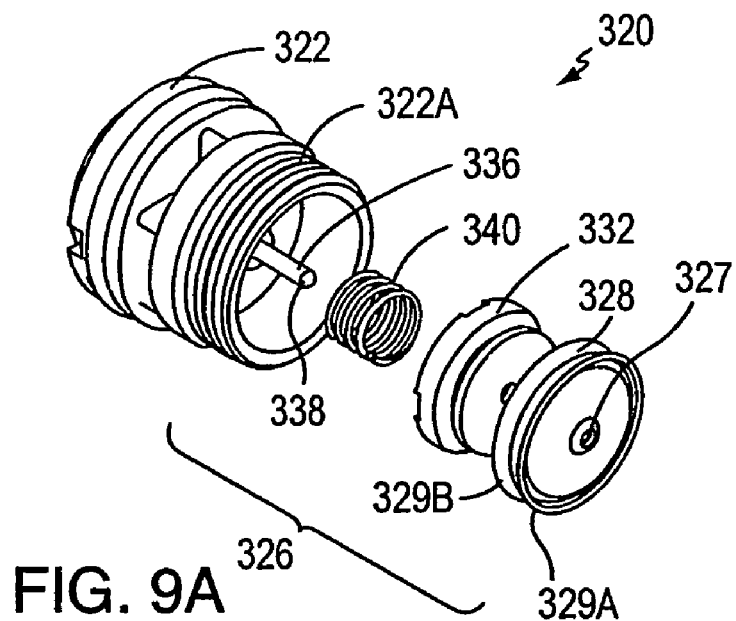
FIG. 9A is a detailed perspective view of the moving piston-like member shown in FIG. 9

Referring to FIGS. 9 and 9A, the fram piston valve 320 receives fluid at input port 318, which exerts pressure onto diaphragm-like member 328 providing a seal together with a lip member 325 in a closed state. Groove passage 338 provides pressure communication with pilot chamber 342, which is communicates with actuator cavity 350 via passages 344A and 344B. An actuator (shown in FIG. 10, 10A or 10B) provides a seal at surface 348 thereby sealing passages 344A and 344B and thus pilot chamber 342. When the plunger of actuator 80 or 81 moves away from surface 348, fluid flows via passages 344A and 344B to control passage 346 and to output chamber 319. This causes pressure reduction in pilot chamber 342. Therefore, diaphragm-like member 328 and piston-like member 332 move linearly within cavity 342, thereby providing a relatively large fluid opening at lip seal 325. A large volume of fluid can flow from input port 318 to output chamber 319.

When the plunger of actuator 80 seals control passages 344A and 344B, pressure builds up in pilot chamber 342 due to the fluid flow from input port 318 through "bleed" groove 338. The increased pressure in pilot chamber 342 together with the force of spring 340 displace linearly, in a sliding motion over guide pin 336, fram piston 326 toward sealing lip 325. When there is sufficient pressure in pilot chamber 342, diaphragm-like pliable member 328 seals input port chamber 318 at lip seal 325. The soft member 328 includes an inner opening that is designed with guiding pin 336 to clean groove 338 during the sliding motion. That is, groove 338 of guiding pin 336 is periodically cleaned. Therefore, fram piston 326 is uniquely designed for controlling flow of "unclean" water ("gray water") for irrigation.

The embodiment of FIG. 9 shows the valve having a central input chamber 318 (and guide pin 336) symmetrically arranged with respect to vent passages 344A and 344B (and the location of the plunger of actuator 80). However, the valve device may have input chamber 318 (and guide pin 336) non-symmetrically arranged with respect to passages 344A, 344B and output vent passage 346. That is, in such a design, this valve has input chamber 318 and guide pin 336 non-symmetrically arranged with respect to the location of the plunger of actuator 80. The symmetrical and non-symmetrical embodiments are equivalent.

Figure 9B:
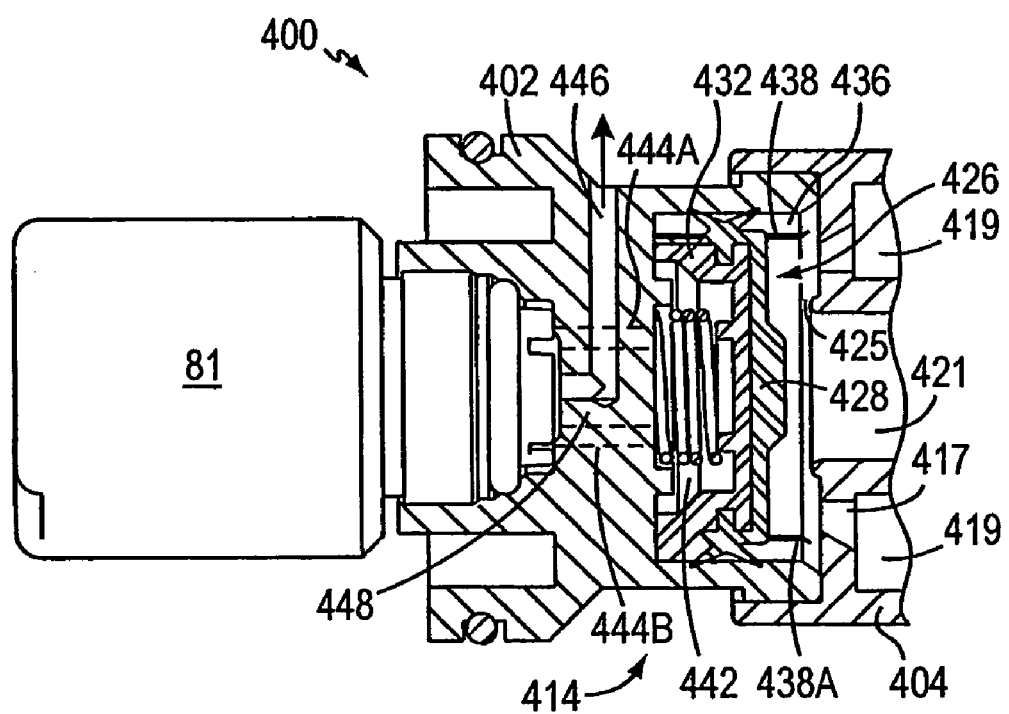
FIG. 9B is an enlarged cross-sectional view of another embodiment of the moving piston-like member that can be used in the valve shown in FIGS. 8, 8A, and 8B.

FIG. 9B illustrates another embodiment of the "fram piston" valve device. Valve device 400 includes a valve body providing a cavity for a valve assembly 414, an input port 419, and an output port 421. Valve assembly 414 includes a proximal body 402, a distal body 404, and a fram member or assembly 426. Fram member 426 includes a pliable member 428 and a support member 432. Pliable member 428 may be a diaphragm-like member with sliding seal lips 429A and B. Support member 432 may be plunger-like member or a piston like member, but having different structural and functional properties than a conventional plunger or piston. The valve body provides a guide surface 436 located on the inside wall that includes one or several grooves 438 and 438A. These are novel grooves constructed to provide fluid passages from input chamber located peripherally (unlike the central input chamber shown in FIG. 9).

Fram member 426 defines a pilot chamber 442 arranged in fluid communication with actuator cavity 450 via control passages 444A and 444B. Actuator cavity 450 is in fluid communication with output port 421 via a control passage 446. Groove 438 (or grooves 438 and 438A) provides a communication passage between input port 419 and pilot chamber 442. Distal body 404 includes an annular lip seal 425 co-operatively arranged with pliable member 428 to provide a seal between input port 419 and output port 421. Distal body 404 also includes flow channel 417 providing communication (in the open state) between input port 419 and output port 421 for a large amount of fluid flow. Pliable member 428 also includes sliding seal lips 429A and 429B (or one sided sealing member depending on the pressure conditions) arranged to provide a sliding seal with respect to valve body 422, between pilot chamber 442 and input port 419. (Of course, groove 438 enables a controlled flow of fluid from input port 419 to pilot chamber 442, as described above.) The entire operation of valve device 400 is controlled by a single solenoid actuator, such as the isolated actuator, 81.

FIGS. 10, 10A, 10B, and 10C illustrate several embodiments of the isolated actuator. Isolated actuator 80 includes solenoid windings 728 wound about solenoid bobbin 714 and magnet 723 located in a magnet recess 720. The actuator also includes a resiliently deformable O-ring 712 that forms a seal between solenoid bobbin 714 and actuator base 716, and includes a resiliently deformable O-ring 730 that forms a seal between solenoid bobbin 714 and pole piece 725. All of these components are held together by a solenoid housing 718 (i.e., can 718), which is crimped at actuator base 716 to hold magnet 723 and pole piece 725 against bobbin 714 and thereby secure windings 728 and actuator base 716 together.

Isolated actuator 81 also includes a resilient diaphragm membrane 764 that may have various embodiments shown and described in connection with FIGS. 10D and 10E. As shown in FIG. 10, resilient diaphragm membrane 764 is mounted between actuator base 716 and piloting button 705 to enclose armature fluid located in a fluid-tight armature chamber in communication with armature port 752. Resilient diaphragm membrane 764 includes a distal end 766, O-ring like portion 767 and a flexible portion 768. Distal end 766 comes in contact with the sealing surface in the region 708. Resilient diaphragm membrane 764 is exposed to the pressure of regulated fluid provided via conduit 706 in piloting button 705 and may therefore be subject to considerable external force. Furthermore, resilient diaphragm membrane 764 is constructed to have a relatively low permeability and high durability for thousands of openings and closings over many years of operation.

Figure 10:
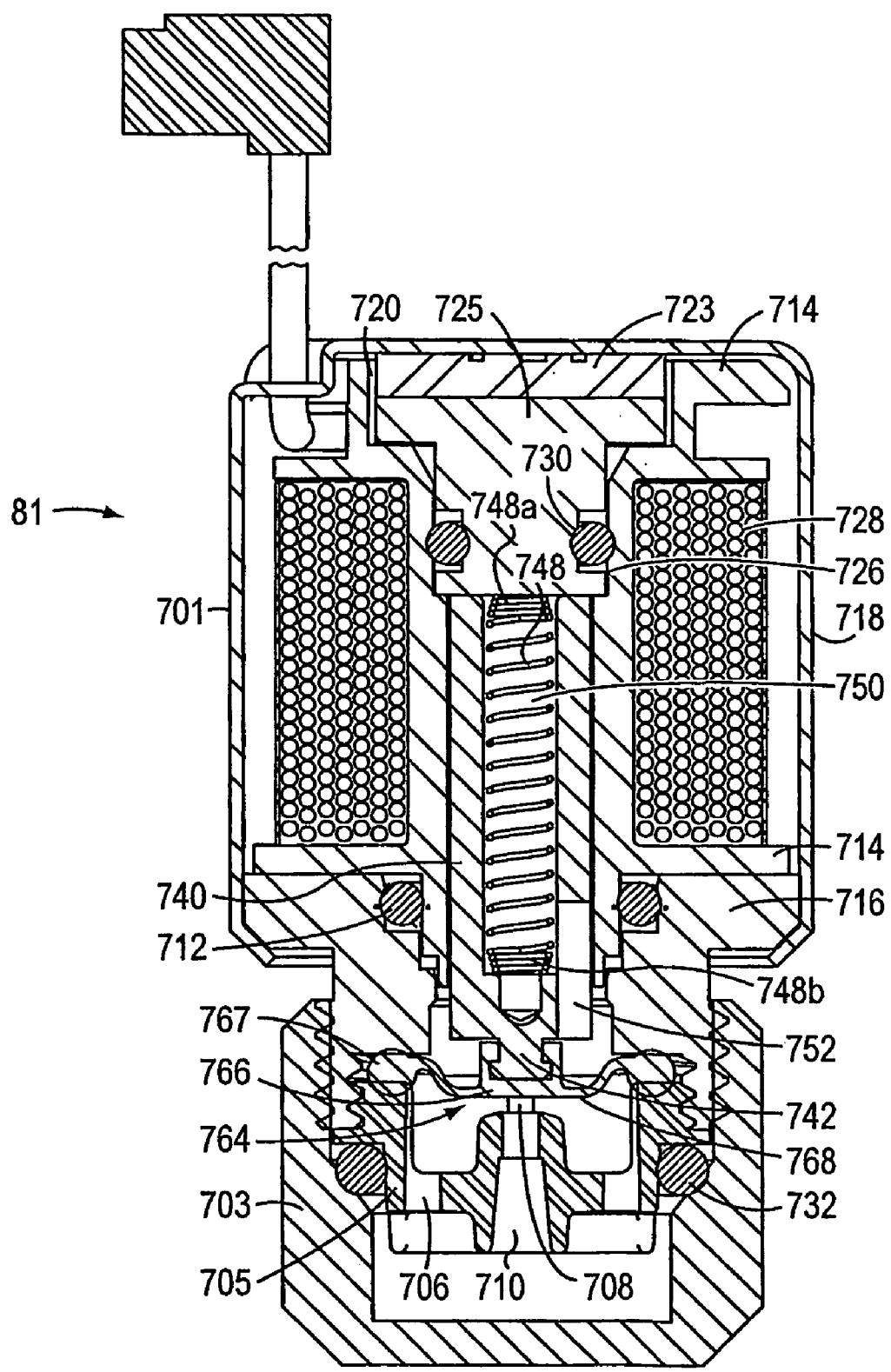
FIG. 10 is a cross-sectional view of a first embodiment of an electromechanical actuator used in the valve shown in FIGS. 8, 8A and 8B.
Figure 10A:
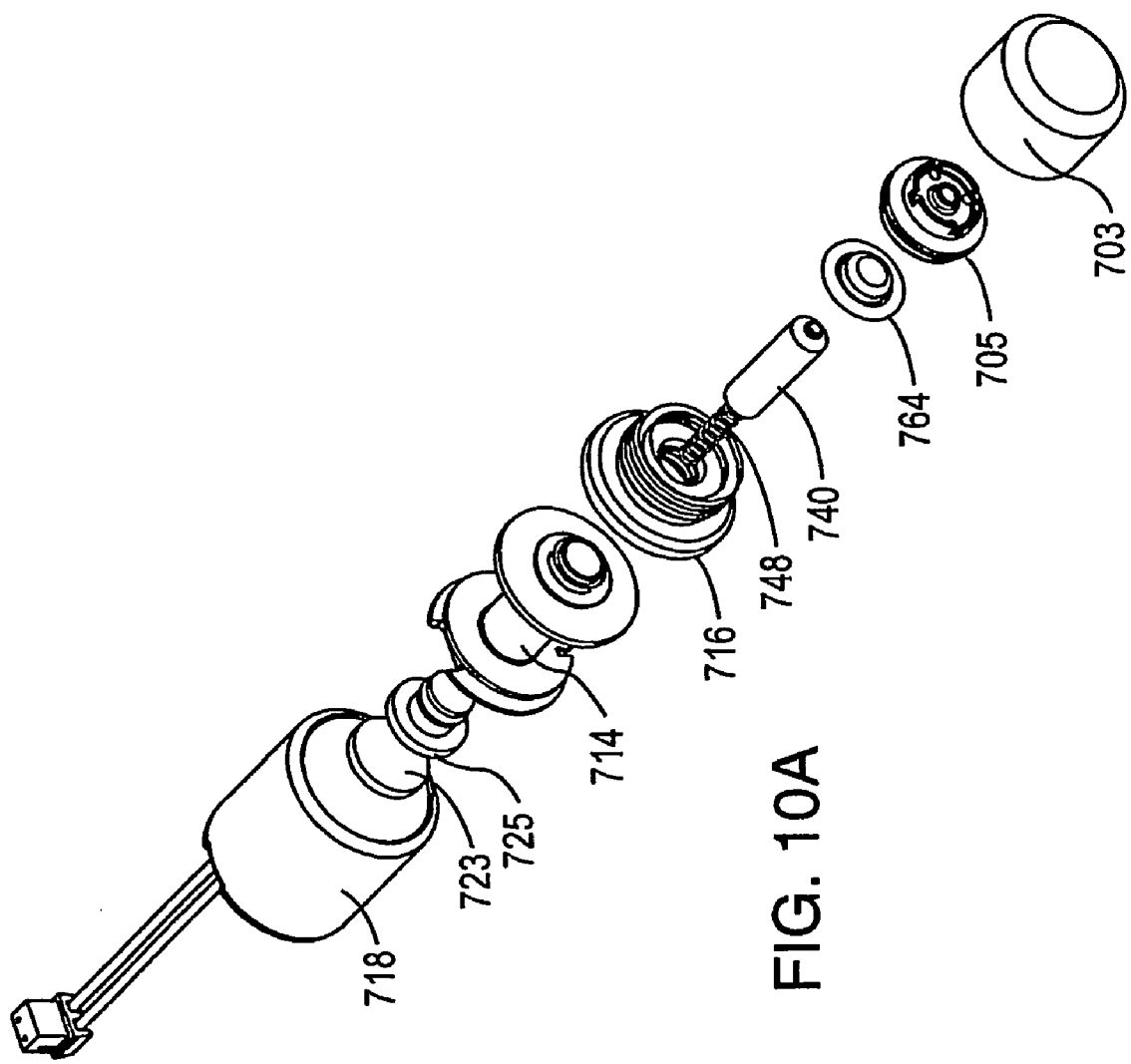
FIG. 10A is a perspective exploded view of the electromechanical actuator shown in FIG. 10
Figure 10B:
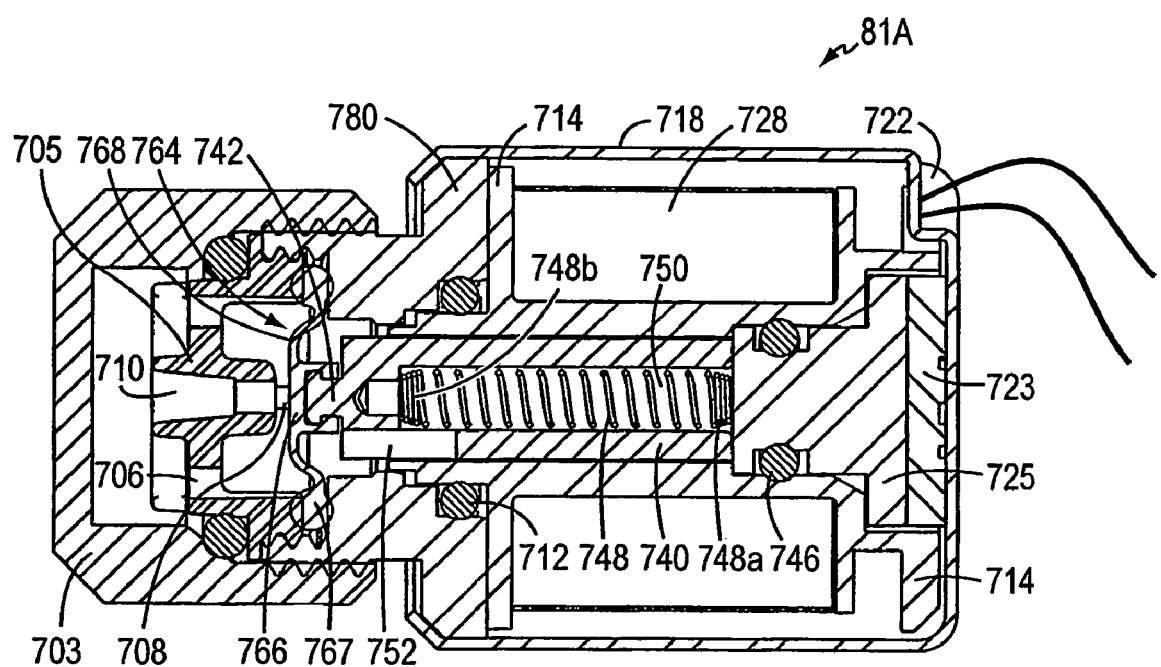
FIG. 10B is a cross-sectional view of a second embodiment of an electromechanical actuator used in the valve shown in FIGS. 8, 8A and 8B.

Referring to still to FIG. 10, isolated actuator 80 is provided, for storage and shipping purposes, with a cap 703 sealed with respect to the distal part of actuator base 716 and with respect to piloting button 705 using a resiliently deformable O-ring 732. Storage and shipping cap 703 includes usually water that counter-balances fluid contained by resilient diaphragm membrane 764; this significantly limits or eliminates diffusion of fluid through resilient diaphragm membrane 764.

Isolated actuator 81 may be constructed either as a latching actuator (shown in FIG. 10) or a non-latching actuator. The latching embodiment includes magnet 723 (as shown) providing magnetic field having orientation and force sufficient to overcome the force of coil spring 748 and thereby retain armature 740 in the open state even after there is no drive current flowing in the solenoid's windings 728.

In the non-latching embodiment, there is no permanent magnet (i.e., no magnet 723). Thus, to keep armature 740 in the open state, a drive current must continue to flow in windings 728 to provide the necessary magnetic field. Armature 740 moves to the closed state under the force of spring 748 if there is no drive current. On the other hand, in the latching embodiment, a drive current is applied to windings 728 in opposite directions to move armature 740 between the open and closed states, but no drive current is necessary to maintain either state.

Referring still to FIG. 10, actuator base 716 includes a wide base portion substantially located inside can 718 and a narrowed base extension threaded on its outer surface to receive cap 703. The inner surface of the base extension threadedly engages complementary threads provided on the outer surface of piloting button 705. Resilient diaphragm membrane 764 includes a thickened peripheral rim 767 located between the base extension lower face and piloting button 705. This creates a fluid-tight seal so that the membrane protects the armature from exposure to external fluid flowing in the main valve.

For example, the armature liquid may be water mixed with a corrosion inhibitor, e.g., a 20% mixture of polypropylene glycol and potassium phosphate. Alternatively, the armature fluid may include silicon-based fluid, polypropylene polyethylene glycol or another fluid having a large molecule. The armature liquid may in general be any substantially non-compressible liquid having low viscosity and preferably non-corrosive properties with respect to the armature. Alternatively, the armature liquid may be Fomblin or other liquid having low vapor pressure (but preferably high molecular size to prevent diffusion).

If there is anticorrosive protection, the armature material can be a low-carbon steel, iron or any soft magnetic material; corrosion resistance is not as important a factor as it would otherwise be. Other embodiments may employ armature materials such as the 420 or 430 series stainless steels. It is only necessary that the armature consist essentially of a ferromagnetic material, i.e., a material that the solenoid and magnet can attract. Even so, it may include parts, such as a flexible or other tip, that is not ferromagnetic.

Resilient diaphragm membrane 764 encloses armature fluid located in a fluid-tight armature chamber in communication with armature port 752 or 790 formed by the armature body. Furthermore, resilient diaphragm membrane 764 is exposed to the pressure of regulated fluid in the main valve and may therefore be subject to considerable external force. However, armature 740 and spring 748 do not have to overcome this force, because the conduit's pressure is transmitted through resilient diaphragm membrane 764 to the incompressible armature fluid within the armature chamber. The force that results from the pressure within the chamber therefore approximately balances the force that the conduit pressure exerts.

Referring still to FIGS. 10, 10A, 10B and 10C, armature 740 is free to move with respect to fluid pressures within the chamber between the retracted and extended positions. Armature port 752 or 790 enables the force-balancing fluid displaced from the armature chamber's lower well through the spring cavity 750 to the part of the armature chamber from which the armature's upper end (i.e. distal end) has been withdrawn upon actuation. Although armature fluid can also flow around the armature's sides, arrangements in which rapid armature motion is required should have a relatively low-flow-resistance path such as the one that port 752 or 790 helps form. Similar considerations favor use of an armature-chamber liquid that has relatively low viscosity. Therefore, the isolated operator (i.e., actuator 81) requires only low amounts of electrical energy for operation and is thus uniquely suitable for battery operation.

In the latching embodiment shown in FIG. 10, armature 740 is held in the retracted position by magnet 723 in the absence of a solenoid current. To drive the armature to the extended position therefore requires armature current of such a direction and magnitude that the resultant magnetic force counteracts that of the magnet by enough to allow the spring force to prevail. When it does so, the spring force moves armature 740 to its extended position, in which it causes the membrane's exterior surface to seal against the valve seat (e.g., the seat of piloting button 705). In this position, the armature is spaced enough from the magnet that the spring force can keep the armature extended without the solenoid's help.

To return the armature to the illustrated, retracted position and thereby permit fluid flow, current is driven through the solenoid in the direction that causes the resultant magnetic field to reinforce that of the magnet. As was explained above, the force that magnet 723 exerts on the armature in the retracted position is great enough to keep it there against the spring force. However, in the non-latching embodiment that doesn't include magnet 723, armature 740 remains in the retracted position only so long as the solenoid conducts enough current for the resultant magnetic force to exceed the spring force of spring 748.

Advantageously, resilient diaphragm membrane 764 protects armature 740 and creates a cavity that is filled with a sufficiently non-corrosive liquid, which in turn enables actuator designers to make more favorable choices between materials with high corrosion resistance and high magnetic permeability. Furthermore, diaphragm membrane 764 provides a barrier to metal ions and other debris that would tend to migrate into the cavity.

Resilient diaphragm membrane 764 includes a distal sealing surface 766, which is related to the seat opening area, both of which can be increased or decreased. The distal sealing surface 766 and the seat surface of piloting button 705 can be optimized for a pressure range at which the valve actuator is designed to operate. Reducing distal sealing surface 766 (and the corresponding tip of armature 740) reduces the plunger area involved in squeezing the membrane, and this in turn reduces the spring force required for a given upstream fluid-conduit pressure. On the other hand, making the plunger tip area too small tends to damage resilient diaphragm membrane 764 during valve closing over time. Preferable range of tip-contact area to seat-opening area is between 1.4 and 12.3. The present actuator is suitable for a variety of pressures of the controlled fluid including pressures of about 150 psi. Without any substantial modification, the valve actuator may be used in the range of about 30psi to 80 psi, or even water pressures of about 125 psi.

Referring still to FIGS. 10, 10A, 10B and 10C, piloting button 705 has an important novel function for achieving consistent long-term piloting of any solenoid valve. Solenoid actuator 81 together with piloting button 705 are installed together as one assembly into the electronic faucet; this minimizes the pilot-valve-stroke variability at the pilot seat in region 708 (FIGS. 10, 10B and 10C) with respect to the closing surface (shown in detail in FIG. 10E), which variability would otherwise affect the piloting operation. This installation is faster and simpler than prior art installations.

The assembly of operator 81 (or 81A, or 81B) and piloting button 705 is usually put together in a factory and is permanently connected thereby holding resilient diaphragm membrane 764 and the pressure loaded armature fluid (at pressures comparable to the pressure of the controlled fluid). Piloting button 705 is coupled to the narrow end of actuator base 716 using complementary threads or a sliding mechanism, both of which assure reproducible fixed distance between distal end 766 of diaphragm membrane 764 and the sealing surface of piloting button 705. The coupling of operator 80 and piloting button 705 can be made permanent (or rigid) using glue, a set screw or pin. Alternatively, one member may include an extending region that is used to crimp the two members together after screwing or sliding on piloting button 705.

It is possible to install solenoid actuator 81 (or 81A or 81B) without piloting button 705, but this process is somewhat more cumbersome. Without piloting button 705, the installation process requires first positioning the pilot-valve body with respect to the main valve and then securing the actuator assembly onto the main valve as to hold the pilot-valve body in place. If proper care is not taken, there is some variability in the position of the pilot body due to various piece-part tolerances and possible deformation. This variability creates variability in the pilot-valve member's stroke. In a low-power pilot valve, even relatively small variations can affect timing or possibly sealing force adversely and even prevent the pilot valve from opening or closing at all. Thus, it is important to reduce this variability during installation, field maintenance, or replacement. On the other hand, when assembling solenoid actuator 81 (81A or 81B) with piloting button 705, this variability is eliminated or substantially reduced during the manufacturing process, and thus there is no need to take particular care during field maintenance or replacement. In automatic valve 250, piloting button 705 is co-operatively constructed and arranged with the design of cavity 350 and sealing surface 348 to enable a novel way of assembling a pilot-valve-operated valve 250.

Figure 10C:
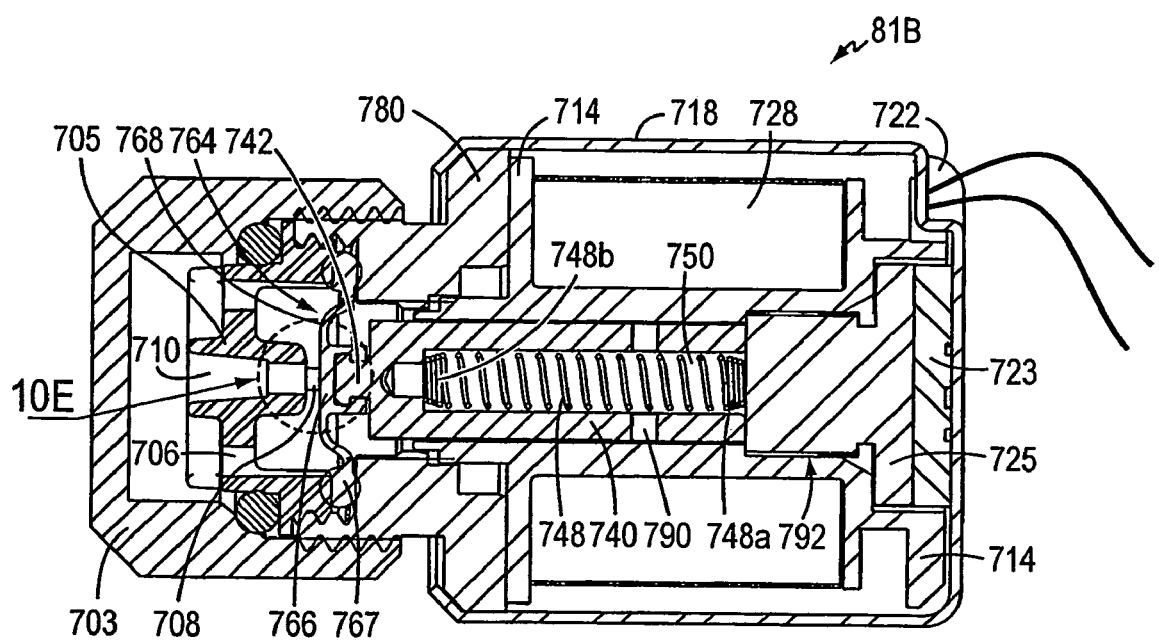
FIG. 10C is a cross-sectional view of a third embodiment of an electromechanical actuator for controlling the valve shown in FIGS. 8, 8A and 8B.
Figure 10D:
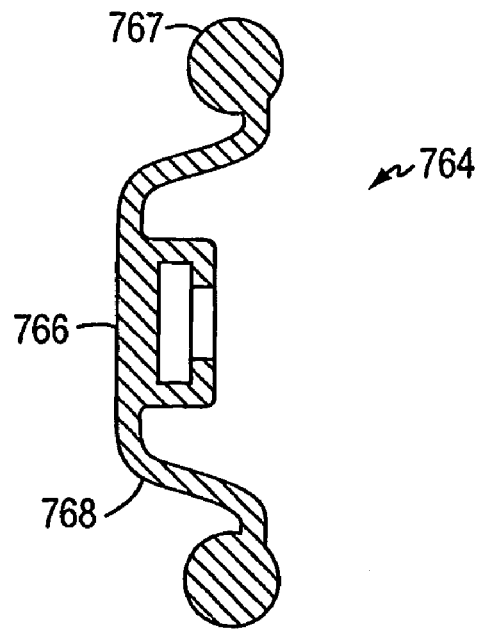
FIG. 10D is a cross-sectional view of another embodiment of a membrane used in the actuator shown in FIGS. 10, 10A, 10B and 10C.
Figure 10E:
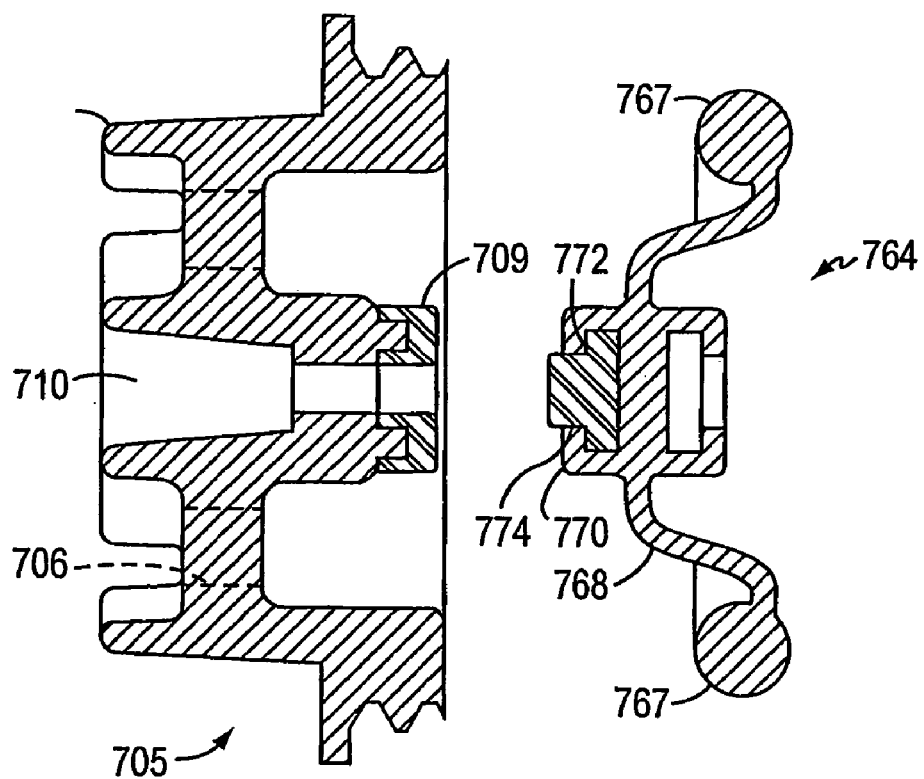
FIG. 10E is a cross-sectional view of another embodiment of the membrane and a piloting button used in the actuator shown in FIGS. 10, 10B and 10C.

Referring to FIGS. 10D and 10E, as described above, resilient diaphragm membrane 764 includes an outer ring 767, flex region 768 and tip or distal sealing region 766. The distal tip of the plunger is enclosed inside a pocket flange behind the distal sealing region 766. Preferably, diaphragm membrane 764 is made of EPDM due to its low durometer and compression set by NSF part 61 and relatively low diffusion rates. The low diffusion rate is important to prevent the encapsulated armature fluid from leaking out during transportation or installation process. Alternatively, resilient diaphragm membrane 764 can be made out of a flouro-elastomer, e.g., VITON, or a soft, low compression rubber, such as CRI-LINE® flouro-elastomer made by CRI-TECH SP-508. Alternatively, diaphragm membrane 764 can be made out of a Teflon-type elastomer, or just to include a Teflon coating. Alternatively, resilient diaphragm membrane 764 can be made out of NBR (natural rubber) having a hardness of 40-50 durometer as a means of reducing the influence of molding process variation yielding flow marks that can form micro leaks of the contained fluid into the surrounding environment. Alternatively, resilient membrane 764 can include a metallic coating that slows the diffusion through the diaphragm member when the other is dry and exposed to air during storage or shipping of the assembled actuator.

Preferably, resilient diaphragm membrane 764 has high elasticity and low compression (which is relatively difficult to achieve). Diaphragm membrane 764 may have some parts made of a low durometer material (i.e., parts 767 and 768) and other parts of high durometer material (front surface 766). The low compression of resilient diaphragm membrane 764 is important to minimize changes in the armature stroke over a long period of operation. Thus, contact part 766 is made of high durometer material. The high elasticity is needed for easy flexing of resilient diaphragm membrane 764 in regions 768. Furthermore, resilient membrane part 768 is relatively thin so that the diaphragm can deflect, and the plunger can move with very little force. This is important for long-term battery operation.

Referring to FIG. 10E, another embodiment of resilient diaphragm membrane 764 can be made to include a forward slug cavity 772 (in addition to the rear plunger cavity shaped to accommodate the plunger tip). The forward slug cavity 772 is filled with a plastic or metal slug 774. The forward surface 770 including the surface of slug 774 is cooperatively arranged with the sealing surface of piloting button 705. Specifically, the sealing surface of piloting button 705 may include a pilot seat 709 made of a different material with properties designed with respect to slug 774. For example, pilot seat 709 can be made of a high durometer material. Therefore, during the sealing action, resilient and relatively hard slug 774 comes in contact with a relatively soft pilot seat 709. This novel arrangement of resilient diaphragm membrane 764 and piloting button 705 provides for a long term, highly reproducible sealing action.

Resilient diaphragm membrane 764 can be made by a two stage molding process whereby the outer portion is molded of a softer material and the inner portion that is in contact with the pilot seat is molded of a harder elastomer or thermoplastic material using an over molding process. The forward facing insert 774 can be made of a hard injection molded plastic, such as acceptable co-polymer or a formed metal disc of a non-corrosive non-magnetic material such as 300 series stainless steel. In this arrangement, pilot seat 709 is further modified such that it contains geometry to retain pilot seat geometry made of a relatively high durometer elastomer such as EPDM 0 durometer. By employing this design that transfers the sealing surface compliant member onto the valve seat of piloting button 705 (rather than diaphragm member 764), several key benefits are derived. There are substantial improvements in the process related concerns of maintaining proper pilot seat geometry having no flow marks (that is a common phenomenon requiring careful process controls and continual quality control vigilance). This design enables the use of an elastomeric member with a hardness that is optimized for the application.

However, automatic valve device 250 may be used with other solenoid valves such as the bistable solenoid model no. AXB724 available from Arichell Technologies Inc., West Newton, Mass. Alternatively, actuator 80 may include a latching actuator (as described in U.S. Pat. No. 6,293,516, which is incorporated by reference), a non-latching actuator (as described in U.S. Pat. No. 6,305,662, which is incorporated by reference), or an isolated operator 81 as shown in FIGS. 10 through 10C or described in PCT Application PCT/US01/51098, which is incorporated by reference. In general, a number of solenoid valves may be used such as described in U.S. Pat. No. 4,225,111. An alternative bistable solenoid is described in U.S. Pat. No. 5,883,557 or 5,599,003.

Figure 11:
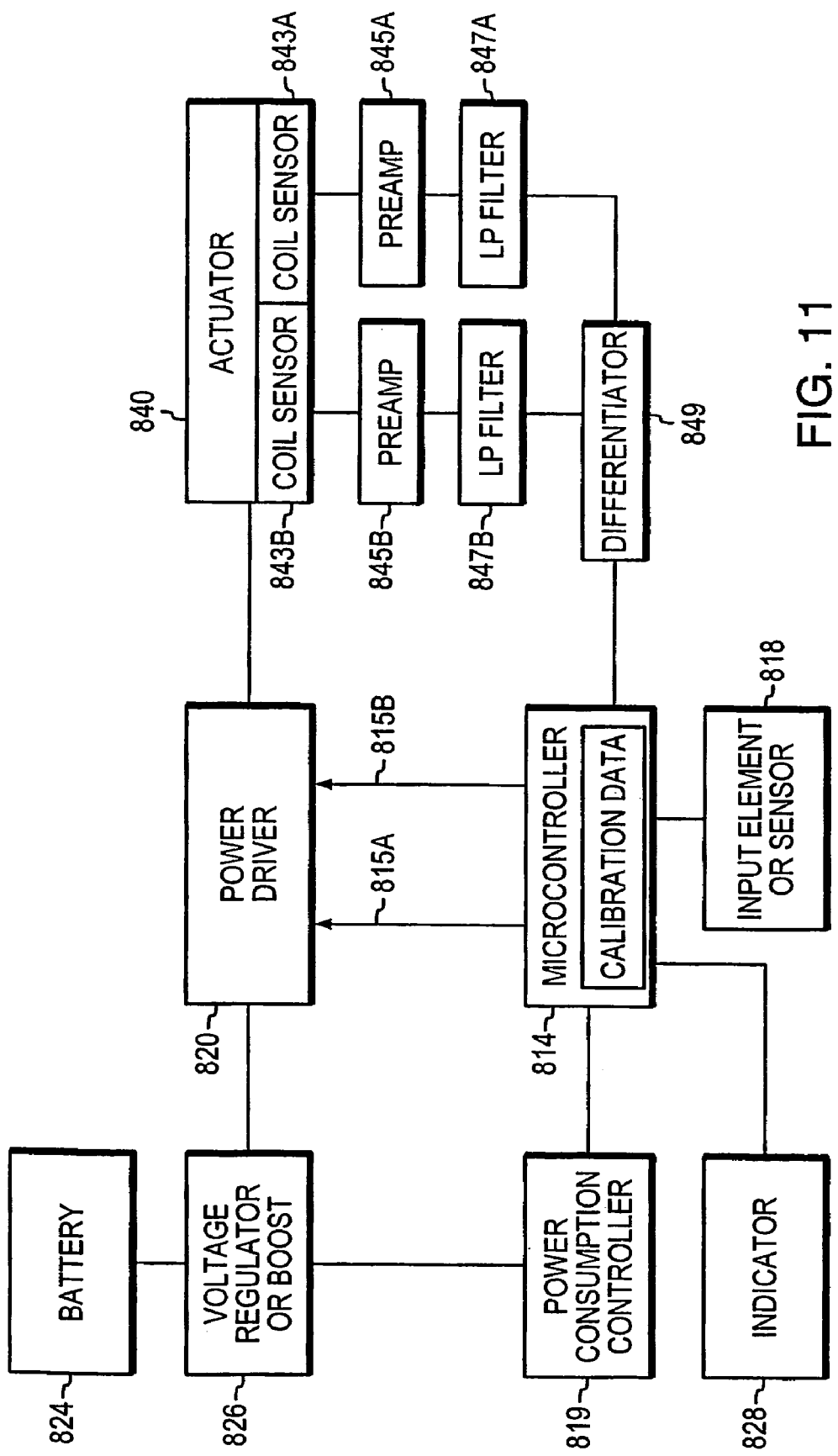
FIG. 11 is a block diagram of a control subsystem for controlling operation of the electromechanical actuator shown in FIG. 10, 10B or 10C.
Figure 12:
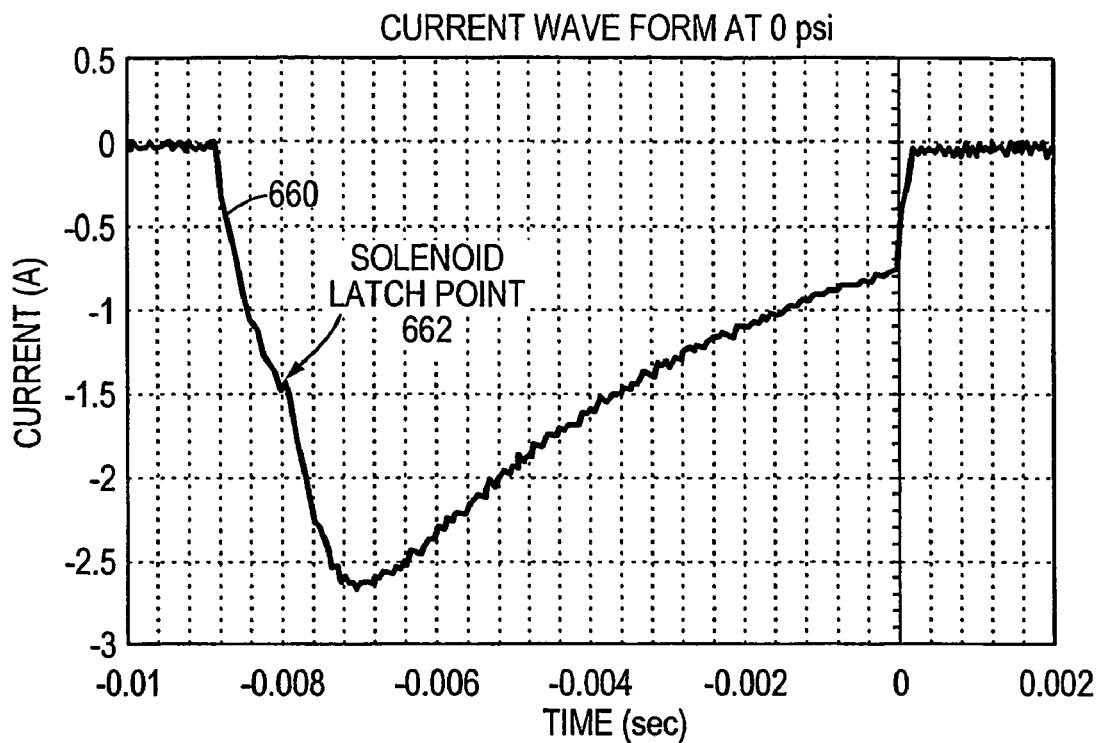
FIGS. 12 and 12A show the relationship of current and time for the valve actuator shown in FIG. 10, 10B or 10C connected to a water line at 0 psi and 120 psi in a reverse flow pressure arrangement, respectively.

FIG. 11 schematically illustrates a fluid flow control subsystem for a latching actuator 81. The flow control system includes again microcontroller 814, sensor or power switch 818, and solenoid driver 820. As shown in FIG. 10, latching actuator 81 includes at least one drive coil 728 wound on a bobbin and an armature that preferably is made of a permanent magnet. Microcontroller 814 provides control signals 815A and 815B to power driver 820, which drives solenoid 728 for moving armature 740. Solenoid driver 820 receives DC power from battery 824 and voltage regulator 826 regulates the battery power to provide a substantially constant voltage to current driver 820. Coil sensors 843A and 843B pick up induced voltage signal due to movement of armature 740 and provide this signal to a conditioning feedback loop that includes preamplifiers 845A, 845B and flow-pass filters 847A, 847B. That is, coil sensors 843A and 843B are used to monitor the armature position.

Microcontroller 814 is again designed for efficient power operation. Between actuations, microcontroller 814 goes automatically into a low frequency sleep mode and all other electronic elements (e.g., input element or sensor 818, power driver 820, voltage regulator or voltage boost 826) are powered down. Upon receiving an input signal from, for example, a motion sensor, microcontroller 814 turns on a power consumption controller 819. Power consumption controller 819 powers up signal conditioner that provides power to microcontroller 814.

Also referring to FIG. 10, to close the fluid passage 708, microcontroller 814 provides a CLOSE control signal 815A to solenoid driver 820, which applies a drive voltage to the coil terminals. Provided by microcontroller 814, the CLOSE control signal 815A initiates in solenoid driver 820 a drive voltage having a polarity that the resultant magnetic flux opposes the magnetic field provided by permanent magnet 723. This breaks magnet 723's hold on armature 740 and allows the return spring 748 to displace valve member 740 toward valve seat 708. In the closed position, spring 748 keeps resilient diaphragm membrane 764 pressed against the valve seat of piloting button 705. In the closed position, there is an increased distance between the distal end of armature 740 and pole piece 725. Therefore, magnet 723 provides a smaller magnetic force on the armature 740 than the force provided by return spring 748.

To open the fluid passage, microcontroller 814 provides an OPEN control signal 815B (i.e., latch signal) to solenoid driver 820. The OPEN control signal 815B initiates in solenoid driver 820 a drive voltage having a polarity such that the resultant magnetic flux opposes the force provided by bias spring 748. The resultant magnetic flux reinforces the flux provided by permanent magnet 723 and overcomes the force of spring 748. Permanent magnet 723 provides a force that is great enough to hold armature 740 in the open position, against the force of return spring 748, without any required magnetic force generated by coil 728.

Referring to FIG. 11, microcontroller 814 discontinues current flow, by proper control signal 815A or 815B applied to solenoid driver 820, after armature 740 has reached the desired open or closed state. Pickup coils 843A and 843B (or any sensor, in general) monitor the movement (or position) of armature 740 and determine whether armature 740 has reached its endpoint. Based on the coil sensor data from pickup coils 843A and 843B (or the sensor), microcontroller 814 stops applying the coil drive, increases the coil drive, or reduces the coil drive.

To open the fluid passage, microcontroller 814 sends OPEN signal 815B to power driver 820, which provides a drive current to coil 842 in the direction that will retract armature 740. At the same time, coils 843A and 843B provide induced signals to the conditioning feedback loop, which includes a preamplifier and a low-pass filter. If the output of a differentiator 849 indicates less than a selected threshold calibrated for armature 740 reaching a selected position (e.g., half distance between the extended and retracted positions, or fully retracted position, or another position), microcontroller 814 maintains OPEN signal 815B asserted. If no movement of armature 740 is detected, microcontroller 814 can apply a different level of OPEN signal 815B to increase the drive current (up to several times the normal drive current) provided by power driver 820. This way, the system can move armature 740, which is stuck due to mineral deposits or other problems.

Microcontroller 814 can detect armature displacement (or even monitor armature movement) using induced signals in coils 843A and 843B provided to the conditioning feedback loop. As the output from differentiator 849 changes in response to the displacement of armature 740, microcontroller 814 can apply a different level of OPEN signal 815B, or can turn off OPEN signal 815B, which in turn directs power driver 820 to apply a different level of drive current. The result usually is that the drive current is reduced, or the duration of the drive current is much shorter than the time required to open the fluid passage under worst-case conditions (that has to be used without an armature sensor). Therefore, the system of FIG. 8 saves considerable energy and thus extends the life of battery 824.

Advantageously, the arrangement of coil sensors 843A and 843B can detect latching and unlatching movements of armature 740 with great precision. (However, a single coil sensor, or multiple coil sensors, or capacitive sensors may also be used to detect movement of armature 740.) Microcontroller 814 can direct a selected profile of the drive current applied by power driver 820. Various profiles may be stored in microcontroller 814 and may be actuated based on the fluid type, fluid pressure, fluid temperature, the time actuator 840 has been in operation since installation or last maintenance, a battery level, input from an external sensor (e.g., a movement sensor or a presence sensor), or other factors.

Optionally, microcontroller 814 may include a communication interface for data transfer, for example, a serial port, a parallel port, a USB port, or a wireless communication interface (e.g., an RF interface). The communication interface is used for downloading data to microcontroller 814 (e.g., drive curve profiles, calibration data) or for reprogramming microcontroller 814 to control a different type of actuation or calculation.

Figure 12A:
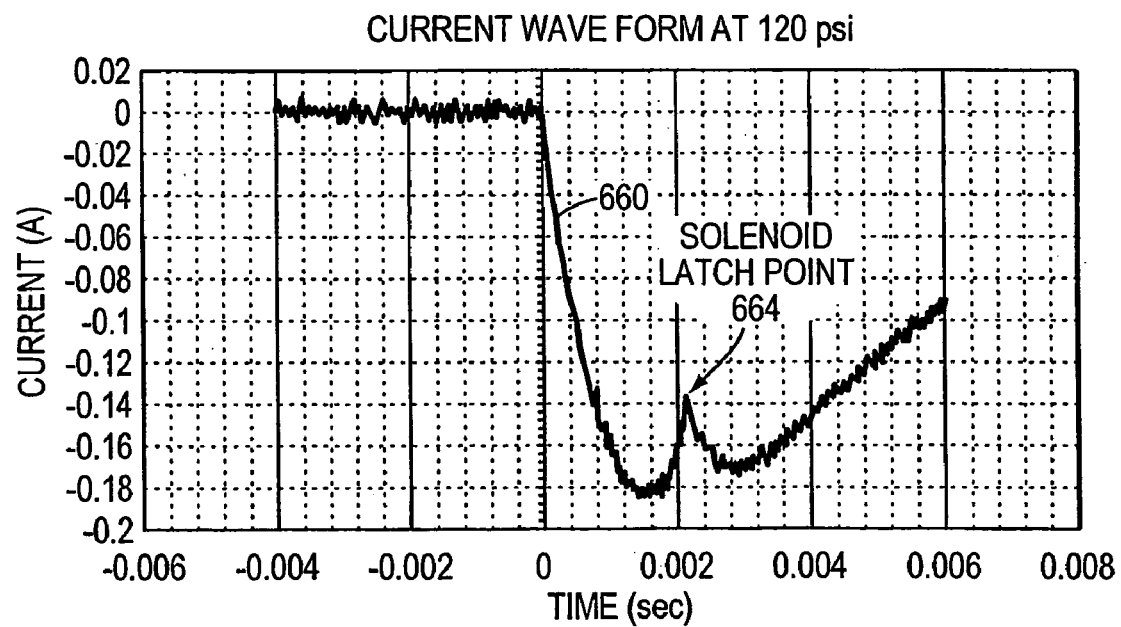
Figure 12B:
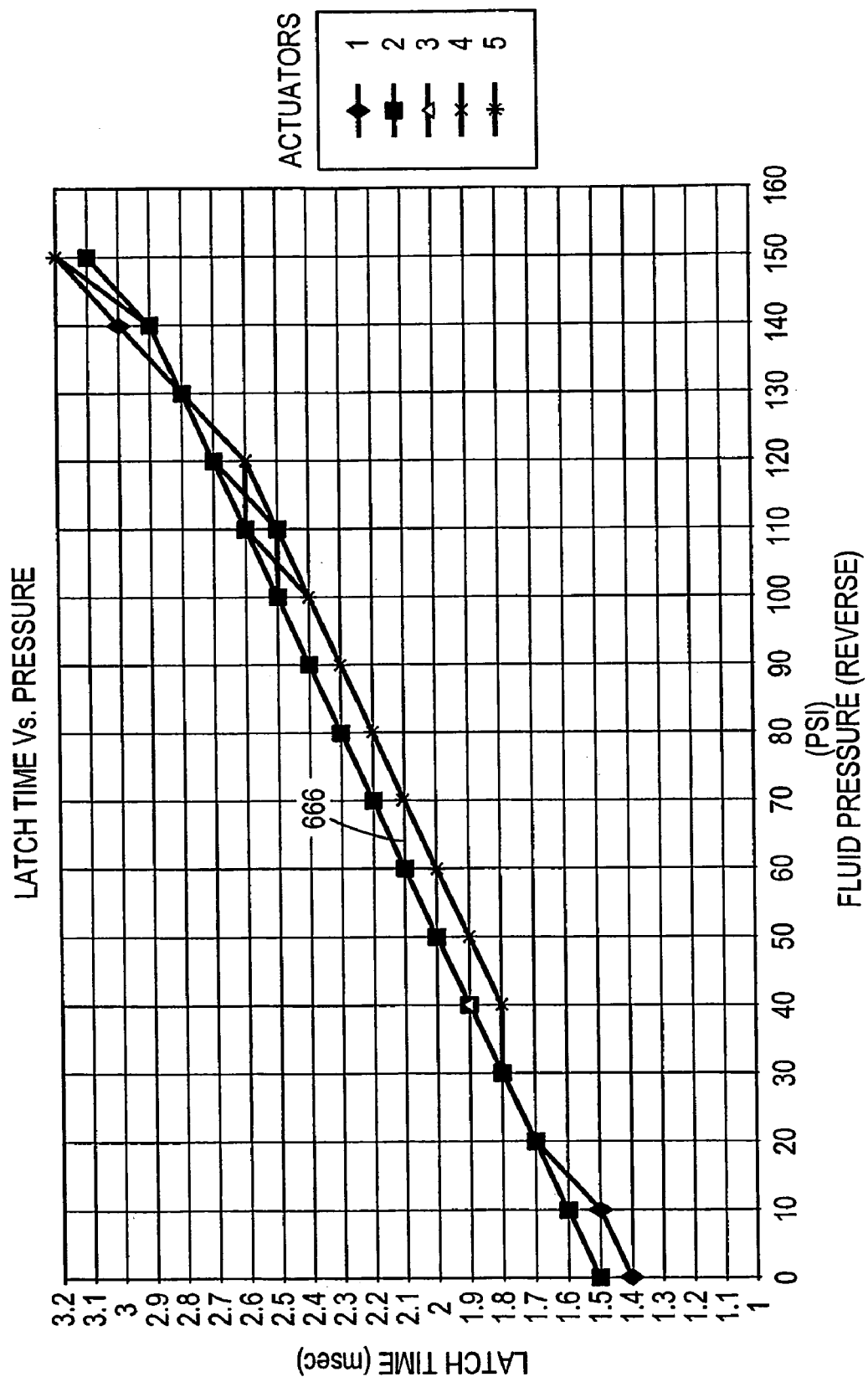
FIG. 12B shows the dependence of the latch time on water pressure (in a reverse flow pressure arrangement) for various actuators.

Referring to FIG. 10, electromagnetic actuator 81 is connected in a reverse flow arrangement when the water input is provided via passage 706 of piloting button 705. Alternatively, electromagnetic actuator 81 is connected in a forward flow arrangement when the water input is provided via passage 710 of piloting button 705 and exits via passage 706. In the forward flow arrangement, the plunger "faces directly" the pressure of the controlled fluid delivered by passage 710. That is, the corresponding fluid force acts against spring 748. In both forward and reverse flow arrangements, the latch or unlatch times depend on the fluid pressure, but the actual latch time dependence is different. In the reverse flow arrangement, the latch time (i.e., time it takes to retract plunger 740) increases with the fluid pressure substantially linearly, as shown in FIG. 12B. On the other hand, in the forward flow arrangement, the latch time decreases with the fluid pressure. Based on this latch time dependence, microcontroller 814 can calculate the actual water pressure and thus control the water amount delivery.

Figure 11A:
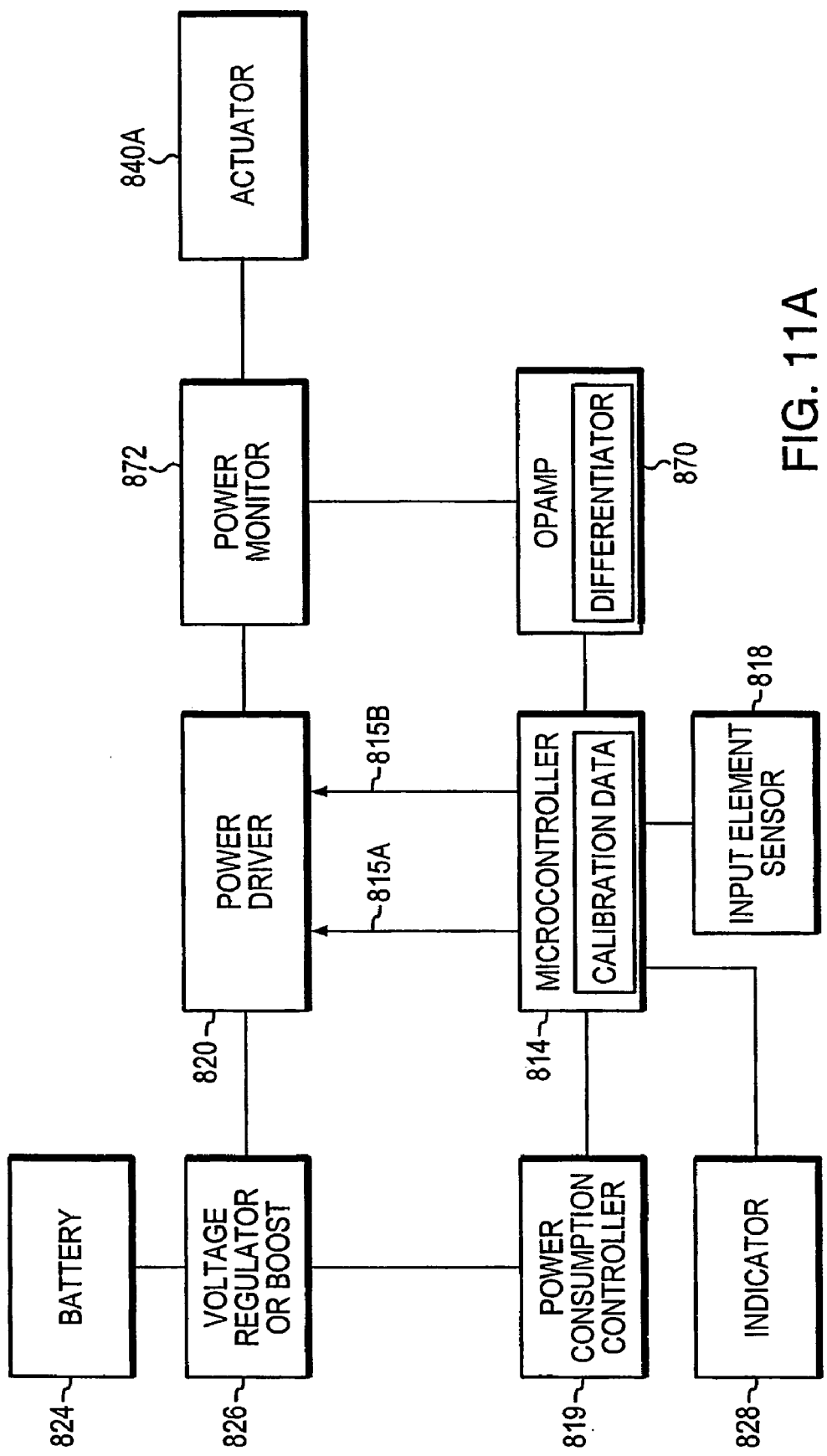
FIG. 11A is a block diagram of another embodiment of a control subsystem for controlling operation of the electromechanical actuator shown in FIG. 10, 10B or 10C.
Figure 11B:
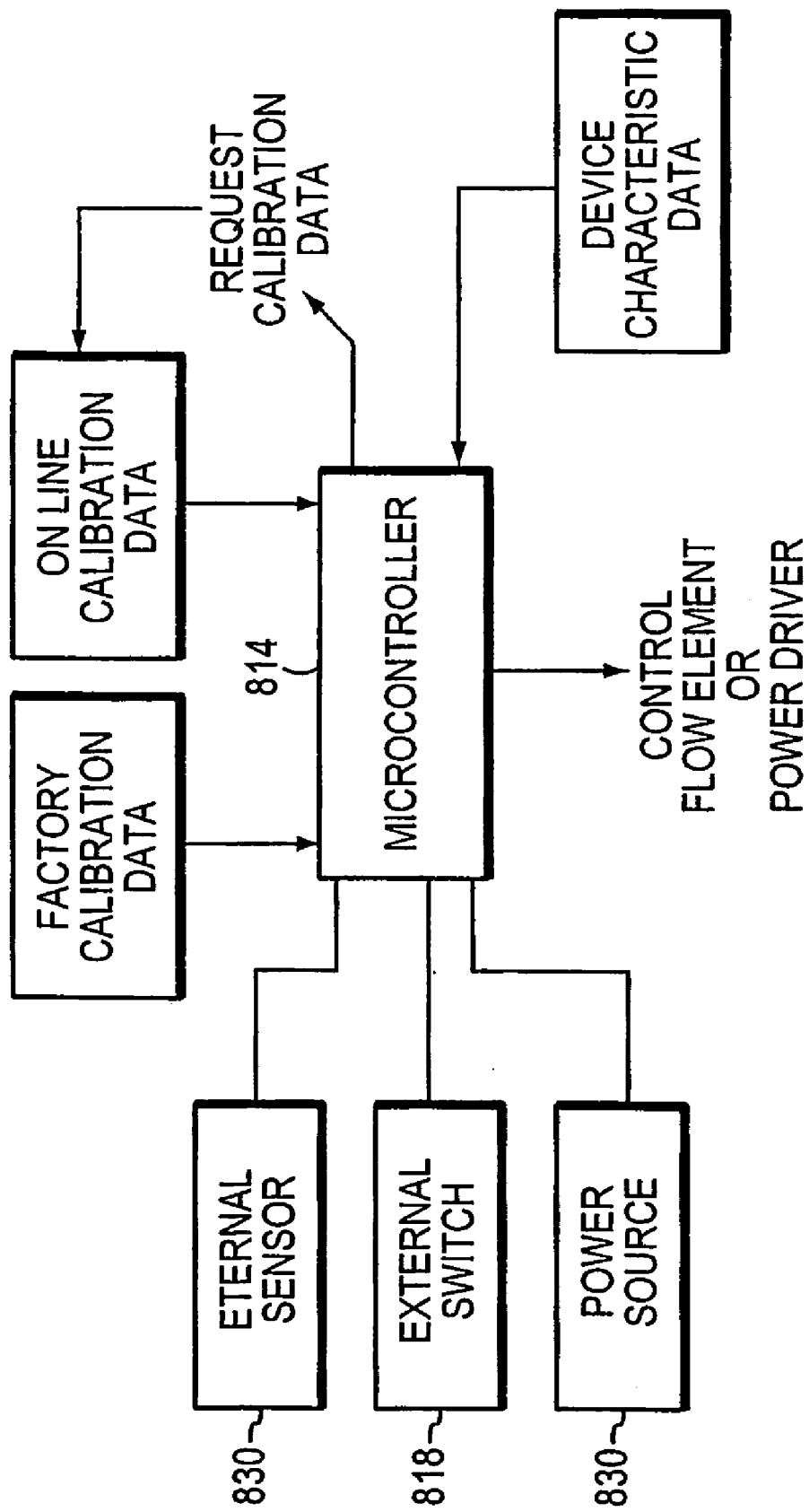
FIG. 11B is a block diagram of data flow to a microcontroller used in the control subsystem of FIG. 11 or 11A.

FIG. 11A schematically illustrates a fluid flow control system for another embodiment of the latching actuator. The flow control system includes again microcontroller 814, power consumption controller 819, solenoid driver 820 receiving power from a battery 824 or voltage booster 826, and an indicator 828. Microcontroller 814 operates in both sleep mode and operation mode, as described above. Microcontroller 814 receives an input signal from an input element 818 (or any sensor) and provides control signals 815A and 815B to current driver 820, which drives the solenoid of a latching valve actuator 81. Solenoid driver 820 receives DC power from battery 824 and voltage regulator 826 regulates the battery power. A power monitor 872 monitors power signal delivered to the drive coil of actuator 81 and provides a power monitoring signal to microcontroller 814 in a feedback arrangement having operational amplifier 870. Microcontroller 814 and power consumption controller 819 are designed for efficient power operation, as described above.

Also referring to FIG. 11A, to close the fluid passage, microcontroller 814 provides a CLOSE control signal 815A to solenoid driver 820, which applies a drive voltage to the actuator terminals and thus drives current through coil 728. Power monitor 872 may be a resistor connected for applied drive current to flow through (or a portion of the drive current). Power monitor 872 may alternatively be a coil or another element. The output from power monitor 872 is provided to the differentiator of signal conditioner 870. The differentiator is used to determine a latch point, as shown in FIG. 12A.

Similarly, as described in connection with FIG. 11, to open the fluid passage, microcontroller 814 sends CLOSE signal 815A or OPEN signal 815B to valve driver 820, which provides a drive current to coil 728 in the direction that will extend or retract armature 740 (and close or open passage 708). At the same time, power monitor 872 provides a signal to opamp 870. Microcontroller 814 determines if armature 740 reached the desired state using the power monitor signal.

For example, if the output of opamp 870 initially indicates no latch state for armature 740, microcontroller 814 maintains OPEN signal 815B, or applies a higher level of OPEN signal, as described above, to apply a higher drive current. On the other hand, if armature 740 reached the desired state (e.g., latch state shown in FIG. 12 as point 662, and shown in FIG. 12A as point 664), microcontroller 814 applies a lower level of OPEN signal 815B, or turns off OPEN signal 815B. This usually reduces the duration of drive current or the level of the drive current as compared to the time or current level required to open the fluid passage under worst-case conditions. Therefore, the system of FIG. 12A saves considerable energy and thus extends life of battery 824.

FIG. 12B shows the pressure dependence of the latch time in the reverse flow arrangement. The measured dependence shows increasing latch time with increasing pressure. Based on curve 666, the microcontroller can calculate the input water pressure at membrane 764. Specifically, after the solenoid of the actuator is activated, microcontroller 814 searches for the latching point 662 in FIG. 12 or point 664 in FIG. 12A. When the timer reaches the latching point, microcontroller 814 deactivates the solenoid. Based on the latch time, microcontroller 814 calculates the corresponding water pressure, using stored calibration data. Based on the water pressure and the size of the orifices, the controller directs the irrigation system to deliver a known amount of water discharged by the sprinkler (or another water delivery unit).

While the invention has been described with reference to the above embodiments, the present invention is by no means limited to the particular constructions described and/or shown in the drawings. In any additional equivalent embodiment, any one of the above-described elements may be replaced by one or more equivalent elements, or similarly any two or more of the above-described elements may be replaced by one equivalent element. The present invention also comprises any modifications or equivalents within the scope of the following claims.

What is claimed is:

1. A leak detector, comprising:
   an input port constructed to be coupled to a conduit for receiving at least partially conductive liquid from a source;
   a valve device including an actuator constructed to receive open and close signals for opening and closing said valve device; said valve device being coupled to said input port and being coupled to an output port;
   two electrodes located on opposite sides of said valve device and being electrically isolated from each other in absence of said liquid flowing between said input port and said output port; and
   an electrical circuit for measuring an electrical property between said electrodes and thereby detecting fluid flow between said input port and said output port.

2. The leak detector of claim 1 including a battery for providing electrical power.

3. The leak detector of claim 1, wherein said actuator is a latching actuator.

4. The leak detector of claim 1, wherein said actuator is a non-latching actuator.

5. The leak detector of claim 1, wherein said actuator is an isolated latching actuator.

6. The leak detector of claim 1, wherein said electrical circuit includes a bridge for measuring said electrical property.

7. The leak detector of claim 1, including a controller constructed to initiate said open and close signals provided to said actuator; said controller being constructed and connected to receive signals regarding said electrical property from said electrical circuit.

8. The leak detector of claim 1, wherein said valve device is connected to an irrigation system.

9. The leak detector of claim 1, wherein said electrical property is resistance.

10. The leak detector of claim 9, further including two additional electrodes located on said opposite sides of said valve device, wherein a first of said additional electrodes is in electrical contact with fluid at said input port, and a second of said additional electrodes is in electrical contact with fluid at said output port, all said electrodes being coupled to said electrical circuit constructed designed for a four point resistivity measurement.

11. A method for detecting a leak in a valve device, comprising:
   providing a valve device including an input port constructed to be coupled to a conduit for receiving at least partially conductive liquid from a source, and an output port, said valve device including an actuator constructed to receive open and close signals for opening and closing said valve device and thereby enabling fluid flow between said input port and said output port in an open state of said valve and preventing fluid flow between said input port and said output port in a closed state of said valve during normal operation of said valve device;
   providing two electrodes located on opposite sides of said valve device and being electrically isolated from each other in absence of said liquid flowing between said input port and said output port, and providing an electrical circuit for measuring an electrical property between said electrodes;
   delivering said close signal to said actuator and thereby closing said valve device; and
   measuring said electrical property between said electrodes and thereby detecting fluid flow between said input port and said output port.

12. The method for detecting a leak in a valve device according to claim 11 further comprising:
   providing to a controller said electrical property measured between said electrodes, and indicating a leak between said input port and said output port while said valve being closed.

13. The method for detecting a leak in a valve device according to claim 11, wherein said measuring said electrical property includes performing an four electrode measurement.

14. The method for detecting a leak in a valve device according to claim 11, wherein said measuring said electrical property includes performing an AC measurement.

15. The method for detecting a leak in a valve device according to claim 11, wherein said measuring said electrical property includes performing an DC measurement.

16. The method for detecting a leak in a valve device according to claim 11 further including indicating a leak between said input port and said output port while said valve being closed.

17. The method for detecting a leak in a valve device according to claim 11 wherein said valve device is connected to an irrigation system.

* * * * *